(12) United States Patent
Nissenbaum et al.

(10) Patent No.: US 11,007,758 B2
(45) Date of Patent: May 18, 2021

(54) BIODEGRADABLE SHEET

(71) Applicant: Tipa Corp. LTD, Hod Hasharon (IL)

(72) Inventors: Daphna Nissenbaum, Ramot Ha'shavim (IL); Tal Neuman, Ramot Ha'shavim (IL); Dori Pelled, Hod HaSharon (IL); Shai Garty, Rehovot (IL); Nili Konieczny, Tel Aviv (IL)

(73) Assignee: Tipa Corp. Ltd, Hod-Hasharon (IL)

( * ) Notice: Subject to any disclaimer, the term of this patent is extended or adjusted under 35 U.S.C. 154(b) by 0 days.

(21) Appl. No.: 16/858,738

(22) Filed: Apr. 27, 2020

(65) Prior Publication Data
US 2020/0290327 A1 Sep. 17, 2020

Related U.S. Application Data

(63) Continuation of application No. 16/260,138, filed on Jan. 29, 2019, now Pat. No. 10,647,093, which is a
(Continued)

(51) Int. Cl.
*C08L 101/16* (2006.01)
*B32B 27/08* (2006.01)
(Continued)

(52) U.S. Cl.
CPC ............... *B32B 27/08* (2013.01); *B32B 7/12* (2013.01); *B32B 27/22* (2013.01); *B32B 27/28* (2013.01);
(Continued)

(58) Field of Classification Search
None
See application file for complete search history.

(56) References Cited

U.S. PATENT DOCUMENTS

| 5,391,423 A | 2/1995 | Wnuk et al. |
| 5,756,194 A | 5/1998 | Shogren et al. |

(Continued)

FOREIGN PATENT DOCUMENTS

| CN | 101205356 | * 6/2008 | ............. C08L 67/04 |
| CN | 102993654 | 3/2013 | |

(Continued)

OTHER PUBLICATIONS

Semba et al. "The Effect of Crosslinking on the Mechanical Properties of Polylactic Acid/Polycaprolactone Blends" Journal of Applied Polymer Science 2006, 101, 1816-1825. (Year: 2006).*

(Continued)

*Primary Examiner* — Robert S Loewe
(74) *Attorney, Agent, or Firm* — Pearl Cohen Zedek Latzer Baratz LLP

(57) ABSTRACT

Disclosed is a biodegradable sheet comprising at least one layer which is a direct contact layer, intended to successfully contact materials, such as liquids, while maintaining the mechanical properties of the sheet and to extend the biodegradable sheet shelf life. The direct contact layer may comprise a hydrophobic polymer selected from poly(epsilon-caprolactone) (PCL) polyhydroxybutyrate (PHB), Polydioxanone (PDO) polyglycolic acid (PGA), polybutylene succinate (PBS), polybutylene succinate adipate (PBSA), poly lactic acid (PLA), polybutylene adipate terphtalate (PBAT), polyhydroxyalkanoates (PHA), such as polyhydroxybutyrates (PHB), polyhydroxyvalerates (PHV), and polyhydroxybutyrate-hydroxyvalerate copolymers (PHBV) or any mixture thereof. The biodegradable sheet may further comprise surface treated nanoclay particles, PVOH grafted with a crosslinker and PBS or PBSA The first hydrophobic polymer is present in said at least one layer in an amount of about 30% w/w.

11 Claims, 4 Drawing Sheets

Related U.S. Application Data continuation of application No. 15/030,613, filed as application No. PCT/IL2014/050927 on Oct. 27, 2014, now Pat. No. 10,239,292.

(60) Provisional application No. 61/896,087, filed on Oct. 27, 2013.

(51) Int. Cl.

| | |
|---|---|
| *B65D 65/46* | (2006.01) |
| *C08J 5/18* | (2006.01) |
| *C08J 7/04* | (2020.01) |
| *B32B 7/12* | (2006.01) |
| *B32B 27/30* | (2006.01) |
| *B32B 27/36* | (2006.01) |
| *B32B 27/28* | (2006.01) |
| *B32B 27/22* | (2006.01) |

(52) U.S. Cl.
CPC ............ *B32B 27/306* (2013.01); *B32B 27/36* (2013.01); *B32B 27/365* (2013.01); *B65D 65/46* (2013.01); *B65D 65/466* (2013.01); *C08J 5/18* (2013.01); *C08J 7/042* (2013.01); *C08L 101/16* (2013.01); *B32B 2250/02* (2013.01); *B32B 2250/03* (2013.01); *B32B 2250/04* (2013.01); *B32B 2250/05* (2013.01); *B32B 2250/40* (2013.01); *B32B 2255/10* (2013.01); *B32B 2255/205* (2013.01); *B32B 2262/06* (2013.01); *B32B 2262/062* (2013.01); *B32B 2262/065* (2013.01); *B32B 2262/067* (2013.01); *B32B 2262/10* (2013.01); *B32B 2262/101* (2013.01); *B32B 2262/105* (2013.01); *B32B 2262/106* (2013.01); *B32B 2262/108* (2013.01); *B32B 2264/06* (2013.01); *B32B 2264/067* (2013.01); *B32B 2264/10* (2013.01); *B32B 2264/104* (2013.01); *B32B 2264/105* (2013.01); *B32B 2264/107* (2013.01); *B32B 2270/00* (2013.01); *B32B 2307/31* (2013.01); *B32B 2307/54* (2013.01); *B32B 2307/546* (2013.01); *B32B 2307/704* (2013.01); *B32B 2307/7163* (2013.01); *B32B 2307/7244* (2013.01); *B32B 2307/7246* (2013.01); *B32B 2307/7265* (2013.01); *B32B 2307/73* (2013.01); *B32B 2307/732* (2013.01); *B32B 2439/00* (2013.01); *B32B 2439/70* (2013.01); *C08J 2300/16* (2013.01); *C08J 2367/02* (2013.01); *C08J 2367/04* (2013.01); *C08J 2400/16* (2013.01); *C08J 2467/04* (2013.01)

(56) References Cited

U.S. PATENT DOCUMENTS

| | | |
|---|---|---|
| 6,350,530 B1 | 2/2002 | Morikawa et al. |
| 6,422,753 B1 | 7/2002 | Thomas |
| 7,956,101 B2 | 6/2011 | Grossman |
| 8,513,144 B2 | 8/2013 | Ting et al. |
| 2002/0143136 A1* | 10/2002 | Noda ............... B32B 27/08 528/272 |
| 2005/0192410 A1 | 9/2005 | Scheer et al. |
| 2007/0037912 A1* | 2/2007 | Mohanty ............ C08L 2666/18 524/445 |
| 2010/0249332 A1 | 9/2010 | Ferguson |
| 2012/0034444 A1 | 2/2012 | Chen et al. |

FOREIGN PATENT DOCUMENTS

| | | | |
|---|---|---|---|
| EP | 1 008 629 | 6/2000 | |
| JP | 9194702 A | 7/1997 | |
| JP | 9267585 A | 10/1997 | |
| JP | 10316784 | * 10/1998 | ............... C08K 9/04 |
| JP | 2004-268372 A | 9/2004 | |
| JP | 2004-536897 A | 12/2004 | |
| WO | WO 02/077080 | 10/2002 | |
| WO | WO 2010/151798 | 12/2010 | |
| WO | WO 2011/123682 | 10/2011 | |
| WO | WO 2011/146484 | 11/2011 | |
| WO | WO 2011/158240 | 12/2011 | |
| WO | WO 2013/088443 | 6/2013 | |

OTHER PUBLICATIONS

Machine translation of JP-10316784, translation generated Aug. 2020, 8 pages. (Year: 2020).*

Machine translation of CN-101205356, translation generated Aug. 2020, 7 pages. (Year: 2020).*

Abdelwahab et al. "Thermal, mechanical and morphological characterization of plasticized PLA-PHB blends. Polymer Degradation and Stability", vol. 97, No. 9, 2012, pp. 1820-1828, available online Jun. 4, 2012.

Chen, Chien-Chung, et al. "Preparation and characterization of biodegradable PLA polymeric blends." Biomaterials 24.7 (2003): 1167-1173.

Zhang, K. et al. "Fully biodegradable and biorenewable ternary blends from polylactide, poly (3-hydroxybutyrate-co-hydroxyvalerate) and poly (butylene succinate) with balanced properties." ACS applied materials & interfaces 4.6 (2012): 3091-3101.

* cited by examiner

BIODEGRADABLE SHEET

RELATED APPLICATION

This application is a continuation of U.S. patent application Ser. No. 16/260,138 filed Jan. 29, 2019, which is a continuation of U.S. patent application Ser. No. 15/030,613, filed Apr. 20, 2016, now U.S. Pat. No. 10,239,292 issued on Mar. 29, 2020 which claims the benefits of International Patent Application No. PCT/IL2014/050927, filed Oct. 27, 2014, which claims the benefit of U.S. Provisional Application Ser. No. 61/896,087 filed Oct. 27, 2013 entitled "BIODEGRADABLE SHEET", which is incorporated herein by reference in its entirety and for all purposes.

FIELD OF THE INVENTION

This invention is directed to compositions for biodegradable sheets comprising at least one hydrophobic polymer, such as polycaprolactone (PCL) and/or a polyhydroxyalkanoates (PHA). Particularly, the invention is directed to the use of PCL and/or a PHA for prolonging the shelf life of the biodegradable sheets and for serving in direct contact with liquids, semi-solids and solids, while maintaining the required mechanical and stability properties of the biodegradable sheet.

BACKGROUND OF THE INVENTION

The use of biodegradable materials has grown over the past years due to the biodegradable materials' environmentally friendly properties. The use of such materials is widespread and includes various types of plastic bags, diapers, balloons and even sunscreen. In response to the demand for more environmentally friendly packaging materials, a number of new biopolymers have been developed that have been shown to biodegrade when discarded into the environment. Some of the larger players in the biodegradable plastics market include such well-known chemical companies as DuPont, BASF, Cargill-Dow Polymers, Union Carbide, Bayer, Monsanto, Mitsui and Eastman Chemical. Each of these companies has developed one or more classes or types of biopolymers. For example, both BASF and Eastman Chemical have developed biopolymers known as "aliphatic-aromatic" copolymers, sold under the trade names ECO-FLEX® and EASTAR BIO®, respectively. Bayer has developed polyesteramide (PEA) under the trade name BAK®. Du Pont has developed BIOMAX®, a modified polyethylene terephthalate (PET). Cargill-Dow has sold a variety of biopolymers based on polylactic acid (PLA). Monsanto developed a class of polymers known as polyhydroxyalkanoates (PHA), which include polyhydroxybutyrate (PHB), polyhydroxyvalerate (PHV) and polyhydroxybutyrate-hydroxyvalerate copolymer (PHBV). Union Carbide (Dow Chemicals) manufactures poly (epsilon-caprolactone) (PCL) under the trade name TONE®.

Each of the foregoing biopolymers has unique properties, benefits and weaknesses. For example, biopolymers such as BIOMAX, BAK, PHB and PLA tend to be strong but are also quite rigid or even brittle. This makes them poor candidates when flexible sheets or films are desired, such as for use in making wraps, bags and other packaging materials requiring good bend and folding capability. In the case of BIOMAX, DuPont does not presently provide specifications or conditions suitable for blowing films therefrom, thus indicating that it may not be presently believed that films can be blown from BIOMAX and similar polymers.

On the other hand, biopolymers such as PHBV (e.g. Biomer®) and PBAT (eg, ECOFLEX® and EASTARBIO®)) are many times more flexible than the biopolymers discussed above. However, they have relatively low melting points such that they tend to be self adhering and unstable when newly processed and/or exposed to heat. To prevent self-adhesion (or "blocking") of such films, it is typically necessary to incorporate a small amount (e.g. 0.15% by weight) of silica, talc or other fillers.

Further, due to the limited number of biodegradable polymers, it is often difficult, or even impossible, to identify a single polymer or copolymer that meets all, or even most, of the desired performance criteria for a given application. For these and other reasons, biodegradable polymers are not as widely used in the area of food packaging materials, particularly in the field of liquid receptacles, as desired for ecological reasons.

In addition, the biodegradable sheets known today are mostly opaque, having low light transmittance and high haze. Further, the known biodegradable sheets either do not include barriers or include amounts and types of barriers that cause the sheets to be generally highly permeable to gases, having both a high oxygen transmission rate and a high water vapor transmission rate, and thus they cannot serve as long term food or drink receptacles. Additionally, the physical strength of known biodegradable sheets, measured by parameters such as stress at maximum load, strain at break and Young's Modulus, is lacking and, therefore, is deficient when used as packaging, particularly when it is desirable to package liquids.

Further, although many liquid receptacles are used in the food and drink industry, biodegradable receptacles are not widely used. U.S. Pat. No. 6,422,753 discloses a separable beverage receptacle packaging for potable and freezable liquids, wherein the packaging comprises a plurality of individual beverage receptacle units aligned in a side by side fashion relative to one another. Each beverage receptacle unit has an interior fluid chamber defined by a lower heat weld, an upper heat weld and two vertical heat welds that are formed on opposed sheets of plastic. The heat welds between the intermediate beverage receptacle units are provided with perforated strips and the upper end of each receptacle unit is provided with an upper horizontal heat weld disposed above a tapered crimp with a gap that defines an integral drinking solubility spout when the tear strip above the perforated line is removed from the individual beverage receptacle units. However, this packaging is not environmental friendly.

U.S. Pat. No. 5,756,194 discloses water-resistant starch products useful in the food industry that comprise an inner core of gelatinized starch, an intermediate layer of natural resin and an outer layer of water resistant biodegradable polyester. The gelatinized starch can be made water-resistant by coating with biodegradable polyesters such as poly(beta-hydroxybutyrate-co-valerate) (PHBV), poly(lactic acid) (PLA), and poly(epsilon-caprolactone) (PCL). Adherence of the two dissimilar materials is achieved through the use of an intervening layer of a resinous material such as shellac or rosin which possesses a solubility parameter (hydrophobicity) intermediate to that of the starch and the polyesters. Coating is achieved by spraying an alcoholic solution of the shellac or rosin onto the starch-based article and subsequently coating with a solution of the polyester in an appropriate solvent. However, these products are not optimally designed for allowing a user to carry them easily while being in a physical activity. In addition, they are not designed to provide different liquid volumes that can be consumed according to instant needs.

Therefore, there is a need in the art for a biodegradable sheet that is physically strong, though flexible, and further, has low gas permeability, a high light transmittance, a long shelf life and low haze. Such a biodegradable sheet could be used as a long term receptacle.

SUMMARY OF THE INVENTION

The present disclosure is based in part on the discovery that a single layered or multilayered biodegradable sheet comprising PCL or PHA in combination with one or more hydrophobic biodegradable polymers exhibits surprising properties, including reduced water vapor transmission rate (WVTR) and oxygen transmission rate (OTR) and improved heat sealing, while maintaining the mechanistic features of flexible sheets. These properties cannot be explained by the properties of the individual polymers making up the sheet.

In one aspect provided herein is a biodegradable sheet, having at least one layer that is a contact layer for direct contact with a material and optionally one or more additional layers, wherein the contact layer comprises a first hydrophobic polymer selected from the group consisting of poly(epsilon-caprolactone) (PCL), a polyhydroxyalkanoate (PHA) and a mixture thereof, and a second hydrophobic polymer selected from the group consisting of polybutylene succinate (PBS), polybutylene succinate adipate (PBSA), poly lactic acid (PLA), polybutylene adipate terphtalate (PBAT), polydioxanone (PDO), polyglycolic acid (PGA) and any mixture thereof. In some embodiments, the first hydrophobic polymer is PCL, a PHA or a mixture of PCL and a PHA. In some embodiments the first hydrophobic polymer is PCL. In some embodiments, the first hydrophobic polymer is PHA. The PHA may be selected from any PHA known in the art, including but not limited tonpolyhydroxybutyrate (PHB), polyhydroxyvalerate (PHV), polyhydroxybutyrate-hydroxyvalerate copolymers (PHBV); and any derivative or mixture thereof. In some embodiments, the first hydrophobic polymer is a mixture of PCL and a PHA, for example a mixture of PCL and one or more of polyhydroxybutyrate (PHB), polyhydroxyvalerate (PHV), polyhydroxybutyrate-hydroxyvalerate copolymers (PHBV); or any derivative thereof.

In some embodiments, the biodegradable sheet according has a degradation time in the range of 4 to 24 months. In some embodiments, the biodegradable sheet according has a shelf life of up to about 6 months up to about 18 months or about 6 months to about 12 months, or about 9 to about 15 months. In some embodiments, the biodegradable sheet according has a degradation time of about 6 months, 7 months, 8 months, 9 months, 10 months, 11 months, 12 months, 13 months, 14 months, 15 months, 16 months, 17 months, or 18 months. In some embodiments, the amount of the first hydrophobic polymer is present in an amount of about 5% w/w to about 45% w/w of the contact layer, or about 20% w/w to about 45% w/w or about 25% to about 40%. The first hydrophobic polymer, PCL, PHA or a mixture thereof is present in an amount of about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, or about 45% w/w.

Polymer degradation is any change in the properties of a polymer, e.g. tensile strength, color, shape, of a polymer or polymer-based product under the influence of one or more environmental factors, such as, heat, light, chemicals such as acids, alkalis and some salts. These changes are desirable in the case of disposable packaging, as in biodegradation, or deliberately lowering the molecular weight of a polymer for recycling. The polymer degradation time is controlled by its composition and the environment it is in. These conditions can be of industrial compost site, with high ventilation and controlled humidity, or in an uncontrolled environment such as landfill, or ambient conditions. Polyester degradation is initially by hydrolysis, to break the polymer into short oligomers, and later by microbial degradation, of microbial digestion. In order to withstand the degradation regulations, the polymer should be eliminated within 180 days, in a controlled environment of industrial compost facility. In home compost, where the ventilation is lacking, the requirements are identical for degradation time of up to 180 days.

In some embodiments, the second hydrophobic polymer is selected from the group consisting of PBS, PBSA, PLA, PBAT and any mixture thereof. In some embodiments, the second hydrophobic polymer is PLA. In some embodiments, the second hydrophobic polymer is PBAT. In some embodiments, the second hydrophobic polymer is PBS. In some embodiments, the second hydrophobic polymer is PBSA.

In some embodiments, the second hydrophobic polymer comprises a mixture selected from the group consisting of a mixture of PBS and PBSA, a mixture of PBS and PLA, a mixture of PBSA and PLA and a mixture of PBAT and PLA. In some embodiments, the second hydrophobic polymer is a mixture of PBS and PBSA. In some embodiments, the second hydrophobic polymer is a mixture of a PBS and PLA. In some embodiments, the second hydrophobic polymer is a mixture of PBSA and PLA. In some embodiments, the second hydrophobic polymer is a mixture of PBAT and PLA. The second hydrophobic polymer or hydrophobic polymer mixture is present in an amount of about 55% w/w to about 95% w/w, about 60% to about 90%, about 60% to about 80%, or about 60% to about 75%.

In some embodiments, the sheet is a single layered sheet. In some embodiments, the sheet is a multi-layered sheet. A multi-layered sheet consists of 2, 3, 4, 5, 6, 7 or more layers. A first layer is also referred to as "Layer 1", a second layer is also referred to as Layer 2; a third layer is also referred to as "Layer 3" and so on.

In some embodiments, the sheet is a two-layered sheet. In some embodiments, the two-layered sheet comprises a first layer comprising about 70%-80% w/w PBS or PBSA and about 20%-30% PLA and a second layer comprising about 15%-25% w/w PLA, about 50%-60% w/w PBS or PBSA and about 20%-30% w/w PCL. In other embodiments, the two-layered sheet comprises a first layer comprising about 75% w/w PBS or PBSA and about 25% PLA and a second layer comprising about 19%-20% w/w PLA, about 55%-56% w/w PBS and about 25% w/w PCL. In yet other embodiments, the two-layered sheet comprises a first layer comprising about 75% w/w PBS or PBSA and about 25% PLA and a second layer comprising about 19%-20% w/w PLA, about 55%-56% w/w PBSA and about 25% w/w PCL. The second layer is the contact layer.

In some embodiments, the biodegradable sheet is a three-layered sheet.

In some embodiments, the three layered sheet comprises a first layer comprising about 70%-80% w/w PBS or PBSA and about 20%-30% PLA; a second layer comprising about 70%-80% w/w PBS or PBSA and about 20%-30% PLA; and a third layer comprising about 20%-45% w/w PCL or PHA and about 55% to about 65% w/w PLA, PBS, PBSA, PBAT or a mixture thereof, wherein the second layer is an internal layer and the third layer is the contact layer. In some embodiments, the three layered sheet comprises a first layer comprising about 100% w/w PBS or PBSA.

In some embodiments, the three layered sheet comprises a second layer comprising about 100% PBS or PBSA.

In some embodiments, the three layered sheet comprises a third layer comprising about 15%-25% w/w PBS or PLA, about 50%-60% w/w PBAT or PBSA and about 20%-30% PCL.

In other embodiments, the three layered sheet comprises a third layer comprising about 15%-25% w/w PBSA, about 50%-60% w/w PBS and about 20%-30% PCL.

A first layer is also referred to as "Layer 1", a second layer is also referred to as Layer 2; a third layer is also referred to as "layer 3". In such a sheet, layer 2 is the internal layer and layer 1 and 3 are the outer layers. The three-layered sheet disclosed herein includes, in a non-limiting manner, the following sheets:

A sheet having Layer 1 (about 15 microns thick) consisting about 75% w/w PBSA and about 25% w/w PLA;
Layer 2 (about 15 microns thick thick): consisting about 75% w/w PBSA and about 25% w/w PLA; and
Layer 3 (about 30 microns thick thick): consisting about 60% w/w PLA and about 40% w/w PCL.

A sheet having Layer 1 (about 15 microns thick): consisting about 75% w/w PBSA and about 25% w/w PLA;
Layer 2 (about 15 microns thick): consisting about 75% w/w PBSA and about 25% w/w PLA; and
Layer 3 (about 30 microns thick): consisting about 60% w/w PBAT and about 40% w/w PCL.

A sheet having Layer 1 (about 15 microns thick): consisting about 75% w/w PBSA and about 25% w/w PLA;
Layer 2 (about 15 microns thick): consisting about 75% w/w PBSA and about 25% w/w PLA; and
Layer 3 (about 30 microns thick): consisting about 60% w/w PBSA and about 40% w/w PCL.

A sheet having Layer 1 (about 15 microns thick): consisting about 75% w/w PBSA and about 25% w/w PLA;
Layer 2 (about 15 microns thick): consisting about 75% w/w PBSA and about 25% w/w PLA; and
Layer 3 (about 30 microns thick): consisting about 60% w/w PBS and about 40% w/w PCL.

A sheet having Layer 1 (about 15 microns thick): consisting about 100% w/w PBS;
Layer 2 (about 15 microns thick): consisting about 100% w/w PBS; and
Layer 3 (about 30 microns thick): consisting about 19% w/w PLA, 56% w/w PBS and about 25% w/w PCL.

A sheet having Layer 1 (about 15 microns thick): consisting about 100% w/w PBS;
Layer 2 (about 15 microns thick): consisting about 100% w/w PBS; and
Layer 3 (about 30 microns thick): consisting about 19% w/w PBSA, 56% w/w PBS and about 25% w/w PCL.

A sheet having Layer 1 (about 15 microns thick): consisting about 100% w/w PBS;
Layer 2 (about 15 microns thick): consisting about 100% w/w PBS; and
Layer 3 (about 30 microns thick): consisting about 19% w/w PLA, 56% w/w PBAT and about 25% w/w PCL.

A sheet having Layer 1 (about 15 microns thick): consisting about 100% w/w PBS;
Layer 2 (about 15 microns thick): consisting about 100% w/w PBS; and
Layer 3 (about 30 microns thick): consisting about 60% w/w PLA and about 40% w/w PCL.

A sheet having Layer 1 (about 15 microns thick): consisting about 100% w/w PBS;
Layer 2 (about 15 microns thick): consisting about 100% w/w PBS; and
Layer 3 (about 30 microns thick): consisting about 60% w/w PBAT and about 40% w/w PCL.

A sheet having Layer 1 (about 15 microns thick): consisting about 100% w/w PBS;
Layer 2 (about 15 microns thick): consisting about 100% w/w PBS; and
Layer 3 (about 30 microns thick): consisting about 60% w/w PBSA and about 40% w/w PCL.

A sheet having Layer 1 (about 15 microns thick): consisting about 100% w/w PBS;
Layer 2 (about 15 microns thick): consisting about 100% w/w PBS; and
Layer 3 (30 microns thick): consisting about 60% w/w PBS and about 40% w/w PCL.

In some embodiments, the biodegradable sheet is a five-layered sheet.

In some embodiments, the five-layered sheet is a symmetric sheet or an asymmetric sheet. For example, the sheet is a symmetric sheet when the two outer layers, the first layer and the fifth layer comprise the same composition; and the second layer and the fourth layer comprise the same composition. The third layer is the most internal layer. In some embodiments, the second and fourth layer are each a "tie layer", which is defined herein as a layer of adhesive material adhering the first layer to the third layer on one side and the fifth layer to the third layer on the opposing side. Without wishing to be bound to theory, the tie layer adheres polymers having different thermal profiles, including, for example, different melting temperatures. The third layer, which is the internal most layer may comprise the same compositions as any of the other layers or may comprise a different composition. In some embodiments the third layer is a barrier layer. In some embodiments, the first or the fifth layer is the contact layer. Accordingly, in some embodiments, the five layered sheet comprises a first layer and a fifth layer comprising about 25% w/w of a first hydrophobic polymer and about 75% of a mixture of a second hydrophobic polymer the mixture selected from the group consisting of a mixture of PBS and PBSA, a mixture of PBS and PLA, a mixture of PBSA and PLA or a mixture of PBAT and PLA; and wherein the first layer and/or the fifth layer is the contact layer.

In some embodiments, the five-layered sheet comprises a first layer and a fifth layer comprising about 40% w/w of a first hydrophobic polymer and about 60% of a second hydrophobic polymer selected from the group consisting of PBS, PBSA, PLA and PBAT and wherein the first layer and/or the fifth layer is the contact layer.

In some embodiments, the five-layered sheet comprises a third layer comprising about 100% PVOH, 100% EVOH, 100% PHA or a mixture thereof. In some embodiments, the internal most layer (i.e. third layer in a five layered sheet, fourth layer in a seven layered sheet, etc) comprises a hydrophobic polymer, for example PVOH and/or EVOH.

In some embodiments, the five-layered sheet further comprises a second layer and a fourth layer each such layer comprising a biodegradable adhesive adhering to the third layer.

The five-layered sheet disclosed herein includes, in a non-limiting manner, the following sheets:

A biodegradable sheet having Layer 1: consisting of about 19% w/w PLA, 56% w/w PBS and about 25% w/w PCL;
Layer 2: consisting of about 100% tie layer; and
Layer 3: consisting of about 100% w/w PVOH; and
Layer 4: consisting of about 100% tie layer; and Layer 5: consisting of about 19% w/w PLA, 56% w/w PBS and about 25% w/w PCL.

A biodegradable sheet having Layer 1: consisting of about 19% w/w PBSA, 56% w/w PBS and about 25% w/w PCL;
Layer 2: consisting of about 100% tie layer; and
Layer 3: consisting of about 100% w/w PVOH; and
Layer 4: consisting of about 100% tie layer; and
Layer 5: consisting of about 19% w/w PBSA, 56% w/w PBS and about 25% w/w PCL.

A biodegradable sheet having Layer 1: consisting of about 19% w/w PLA, 56% w/w PBAT and about 25% w/w;
Layer 2: consisting of about 100% tie layer; and
Layer 3: consisting of about 100% w/w PVOH; and
Layer 4: consisting of about 100% tie layer; and
Layer 5: consisting of about 19% w/w PLA, 56% w/w PBAT and about 25% w/w PCL.

A biodegradable sheet having Layer 1: consisting of about 60% w/w PLA and about 40% w/w PCL;
Layer 2: consisting of about 100% tie layer; and
Layer 3: consisting of about 100% w/w PVOH; and
Layer 4: consisting of about 100% tie layer; and
Layer 5: consisting of about 60% w/w PLA and about 40% w/w PCL.

A biodegradable sheet having Layer 1: consisting of about 60% w/w PBSA and about 40% w/w PCL;
Layer 2: consisting of about 100% tie layer; and
Layer 3: consisting of about 100% w/w PVOH; and
Layer 4: consisting of about 100% tie layer; and
Layer 5: consisting of about 60% w/w PBSA and about 40% w/w PCL.

A biodegradable sheet having Layer 1: consisting of about 60% w/w PBAT and about 40% w/w PCL;
Layer 2: consisting of about 100% tie layer; and
Layer 3: consisting of about 100% w/w PVOH; and
Layer 4: consisting of about 100% tie layer; and
Layer 5: consisting of about 60% w/w PBAT and about 40% w/w PCL.

A biodegradable sheet having Layer 1: consisting of about 60% w/w PBS and about 40% w/w PCL;
Layer 2: consisting of about 100% tie layer; and
Layer 3: consisting of about 100% w/w PVOH; and
Layer 4: consisting of about 100% tie layer; and
Layer 5: consisting of about 60% w/w PBS and about 40% w/w PCL.

A biodegradable sheet having Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 19% w/w PLA, 56% w/w PBS and about 25% w/w PCL;

A biodegradable sheet having Layer 1: consisting of about 75% w/w PBSA and about 25% w/w PLA;
Layer 2: consisting of about 100% w/w PBAT;
Layer 3: consisting of about 100% w/w PHA;
Layer 4: consisting of about 100% w/w PBAT;
Layer 5: consisting of about 19% w/w PLA, 56% w/w PBS and about 25% w/w PCL.

In some embodiments of all the biodegradable sheets, the material comprises liquid, semi-solid or solid matter. Preferably the material is a liquid or comprises a liquid.

In some embodiments, the biodegradable sheets are useful in packaging a material, preferably a liquid or semi-solid material or a material comprising s liquid or semi-solid. In some embodiments, the material is a food stuff or a liquid for animal consumption. The animal may be a mammal, for example a human.

In a second aspect, provided herein is a method of reducing the WVTR and/or OTR of a biodegradable sheet, comprising the step of manufacturing the sheet with a contact layer comprising about 5% w/w to about 45% w/w, about 20% w/w to about 45% w/w or about 25% to about 40% of a first hydrophobic polymer selected from the group consisting of PCL, PHA and a mixture thereof and a second hydrophobic polymer selected from the group consisting of polybutylene succinate (PBS), polybutylene succinate adipate (PBSA), poly lactic acid (PLA), polybutylene adipate terphtalate (PBAT), polydioxanone (PDO), polyglycolic acid (PGA) and any mixture thereof.

Embodiments of the method are directed to a biodegradable sheet, having at least one layer that is a direct contact layer and optionally one or more additional layers, In some embodiments, the direct contact layer comprises polycaprolactone (PCL) and/or a PHA. In some embodiments, the direct contact layer comprises mixture of PCL and PBAT, PCL and PBS, PCL and PBSA, or PCL and PLA.

Provided herein is a biodegradable sheet comprising at least one layer comprising about 0-20% w/w PLA, 45.0-80.0% w/w PBS, PBSA or a mixture of PBS and PBSA and 20.0%-30.0% w/w PCL. In some embodiments the sheet is a single layered sheet. In some embodiment, the sheet is a multilayered sheet.

Some embodiments are directed to a single layered biodegradable sheet comprising at least one layer comprising about 18-%-20% w/w PLA, 50.0-75.0% w/w PBS, PBSA or a mixture of PBS and PBSA and 20.0%-30.0% w/w PCL. Some embodiments are directed to a multi layered biodegradable sheet comprising at least one layer comprising about 18-%-20% w/w PLA, 50.0-75.0% w/w PBS, PBSA or a mixture of PBS and PBSA and 20.0%-30.0% w/w PCL. Some embodiments are directed to a multi layered biodegradable sheet comprising at least one layer comprising about 18%-20% w/w PLA, 75.0% w/w PBS, PBSA or a mixture of PBS and PBSA and 25.0% w/w PCL.

In some embodiments, the sheet further comprises a layer comprising PVOH. In some embodiments, the sheet further comprises a layer comprising an adhesive, for example a "tie layer". Provided herein is a five layered biodegradable sheet comprising two layers, Layers 1 and 5, each 35% of the total thickness and comprising 18%-20% w/w PLA 45%-65% w/w PBS, PBSA or a mixture of PBS and PBSA and 20%-30% w/w PCL; Layers 2 and 4, each 8% of the total thickness and comprising 90%-100% w/w tie layer; Layer 3 is 13% of the total thickness and comprises 70%-100% w/w PVOH. In some embodiments, the five layered biodegradable sheet comprises two layers, Layers 1 and 5, each 35% of the total thickness and consisting of: 20% w/w PLA, 55% w/w PBS and 25% w/w PCL; Layers 2 and 4, each 8% of the total thickness and consisting of 100% w/w tie layer; Layer 3 is 13% of the total thickness and consists of 100% w/w PVOH. In some embodiments, the internal layer comprises about 70%-99% PVOH and 1%-30% PBS or PBSA or PLA or PBAT or PCL.

In another aspect, the biodegradable sheets disclosed above are useful for contact with a material, preferably a liquid or semi-solid material, for example water, carbonated water, sweetened liquid, carbonated sweetened liquid, fruit or vegetable liquid such a juice, a jelled material.

In another aspect, provided is a method for reducing the WVTR and/or OTR of a biodegradable sheet to a value of less than 1 g/(m$^2$×d) and 1 cm$^3$/(m$^2$×d×bar), respectively, comprising the step of manufacturing the sheet with at least one layer comprising about 5% w/w to about 45% w/w, about 20% w/w to about 45% w/w or about 25% to about 40% of a first hydrophobic polymer selected from the group consisting of PCL, PHA and a mixture thereof. In some embodiments, the biodegradable sheet comprises two or more layers. In some embodiments, the contact layer comprises PCL. In some embodiments, the contact layer comprises about 5% w/w to about 45% w/w, about 20% w/w to about 45% w/w or about 25% to about 40% of a first hydrophobic polymer selected from the group consisting of PCL, PHA and a mixture thereof.

The first ($1^{st}$) hydrophobic polymers are super hydrophobic polymer, referring to the tendency of non-polar composition to exclude water from its surface. The hydrophobic interaction is mostly an entropic effect originating from the disruption of highly dynamic hydrogen bonds between molecules of liquid water by the nonpolar surface (The Real Reason Why Oil and Water Don't Mix Todd P. Silverstein, J. Chem. Educ. 1998, 75 (1), p 116). A hydrocarbon chain or a similar nonpolar region or a large molecule is incapable of forming hydrogen bonds with water. Hydrophobicity can be calculated by the ratio of non-polar groups such as pure hydrocarbon molecule to polar groups such as hydroxyl, carbonyl, or ester groups. Super hydrophobic polymers shows high non-polar to polar ratio (higher than 60%; see Table with PCL and PHA examples), and low hydrophobic polymers shows low non-polar to polar ratio (lower than 60%; See table with PLA example).

(PBAT); a polyhydroxyalkanoate (PHA) such as polyhydroxybutyrate (PHB), polyhydroxyvalerate (PHV) and polyhydroxybutyrate-hydroxyvalerate copolymer (PHBV); or any mixture thereof.

In some embodiments, the contact layer comprises polycaprolactone (PCL). In some embodiments, the direct contact layer comprises mixture of polymers which include PCL and a second polymer, for example, PCL and PBAT, or PCL and PBS, or PCL and PBSA, or PCL and PLA or PCL and PBS and PBSA.

Further embodiments of the invention are directed to a multilayered biodegradable polymer comprising:
Layer 1: about 5-40% w/w PCL and the remaining 60-95% comprising a mixture of PBS or PBSA with PLA at about 75% w/w PBS or PBSA and 25% w/w PLA;
Layer 2: about 100% w/w PBSA; and
Layer 3: about 25% w/w PLA and about 75% w/w PBSA.

Further embodiments of the invention are directed to a multilayered biodegradable polymer comprising:
Layer 1: about 5-40% w/w PCL and the remaining 60-95% comprising a mixture of PBS or PBSA with PLA about 75% w/w PBS or PBSA and 25% w/w PLA;
Layer 2: about 25% w/w PLA and about 75% w/w PBSA.
Layer 3: about 40% w/w PVOH grafted with about 60% PBSA;

| | | #elements | | | element weight | | | Hydrophobic elements | polar elements | non-polar to total mass ratio |
|---|---|---|---|---|---|---|---|---|---|---|
| | formula | C | H | O | C | H | O | | | |
| PCL | $C_6H_{10}O_2$ | 6 | 10 | 2 | 72.06 | 10.1 | 31.98 | 82.16 | 31.98 | 72% |
| PHV | $C_5H_8O_2$ | 5 | 8 | 2 | 60.05 | 8.08 | 31.98 | 68.13 | 31.98 | 68% |
| PHB | $C_4H_6O_2$ | 4 | 6 | 2 | 48.04 | 6.06 | 31.98 | 54.10 | 31.98 | 63% |
| PLA | $C_3H_4O_2$ | 3 | 4 | 2 | 36.03 | 4.04 | 31.98 | 40.07 | 31.98 | 56% |

In another aspect, provided herein is a biodegradable sheet that has a sealing window in a range of about 20-50° C., 20-30° C., 30-40° C., 40-50° C., comprising at least one layer comprising about 5% w/w to about 45% w/w, about 20% w/w to about 45% w/w or about 25% to about 40% of a first hydrophobic polymer selected from the group consisting of PCL, PHA and a mixture thereof. In some embodiments, the biodegradable sheet comprises two or more layers. In some embodiments, the contact layer comprises PCL. In some embodiments, the contact layer comprises about 5% w/w to about 45% w/w, about 20% w/w to about 45% w/w or about 25% to about 40% of a first hydrophobic polymer selected from the group consisting of PCL, PHA and a mixture thereof.

Tie layer resins used in multilayer structures are usually anhydride-modified polymers that bond dissimilar polymers together, primarily in multilayer, co-extruded structures.

In some embodiments, the biodegradable sheet has a compostability time up to 6 months when placed into an approved compost facility, as hereinafter defined.

Embodiments of the invention are directed to a biodegradable sheet, having at least one layer that is a contact layer and optionally one or more additional layers, wherein the direct contact layer comprises a hydrophobic polymer selected from poly(epsilon-caprolactone) (PCL); polydioxanone (PDO); polyglycolic acid (PGA); polybutylene succinate (PBS); polybutylene succinate adipate (PBSA); poly lactic acid (PLA); polybutylene adipate terphtalate Layer 4: about 25% w/w PLA and about 75% w/w PBSA.
Further embodiments of the invention are directed to a multilayered biodegradable sheet comprising;
Layer 1: about 5-40% w/w PCL and the remaining 60-95% comprising about a mixture of PBS or PBSA with PLA at about 75% w/w PBS or PBSA and 25% w/w PLA;
Layer 2: about 90-95% w/w PVOH or EVOH grafted with maleic anhydride (MAH) and compounded with 5-10% w/w PBSA or PBS
Layer 3: about 98-85% PBSA and about 2-15% w/w nanoclays;
Layer 4: consisting of about 90-95% w/w PVOH or EVOH grafted with maleic anhydride (MAH) and compounded with 5-10% w/w PBSA or PBS
Layer 5: about 5-40% w/w PCL and the remaining 60-95% comprising a mixture of PBS or PBSA with PLA at about 75% w/w PBS or PBSA and 25% w/w PLA.

Further embodiments of the invention are directed to a single layer biodegradable sheet comprising about 20.0% w/w PLA, 60.0% w/w PBS and 20.0% w/w PCL.

Further embodiments of the invention are directed to a single layered biodegradable sheet comprising about 17.5% w/w PLA and 52.5% w/w PBS and 30.0% w/w PCL.

Further embodiments of the invention are directed to a single layer biodegradable sheet comprising about 20.0% w/w PLA, 60.0% w/w PBS and 20.0% w/w PCL with 0.5% w/w maleic anhydride (MAH) and 0.2% azobisisobutyronitrile (AIBN).

Further embodiments of the invention are directed to a single layered biodegradable sheet comprising about 17.5% w/w PLA and 52.5% w/w PBS, 30.0% w/w PCL with 0.5% w/w MAH and 0.2% AIBN.

Further embodiments of the invention are directed to a single layered biodegradable sheet comprising about 15.0% w/w PLA and 45.0% w/w PBS, 40.0% w/w PCL with 0.5% w/w MAH and 0.2% AIBN.

Further embodiments of the invention are directed to a single layered biodegradable sheet comprising about 31% w/w PBS, 35% w/w PBSA, 12% w/w PLA, 20% w/w PCL and 2% w/w polyvinyl alcohol (PVOH).

Further embodiments of the invention are directed to a multilayered biodegradable sheet comprising:
Layer 1: about 31% w/w PBS, 35% w/w PBSA, 12% w/w PLA, 20% w/w PCL and 2% w/w polyvinyl alcohol (PVOH);
Layer 2: about 99.5% PVOH cross linked using 0.5% w/w of a crosslinker and
Layer 3: about 31% w/w PBS, 35% w/w PBSA, 12% w/w PLA, 20% w/w PCL and 2% w/w PVOH.

Further embodiments of the invention are directed to a multilayered biodegradable sheet comprising two or more layers wherein one layer comprises about 31% w/w PBS, 35% w/w PBSA, 12% w/w PLA, 20% w/w PCL and 2% w/w polyvinyl alcohol (PVOH).

Further embodiments of the invention are directed to a biodegradable sheet comprising at least one layer comprising about 40% PVOH, 20% PCL, 20% PBS and 20% PBSA.

Further embodiments of the invention are directed to a five layers biodegradable sheet, wherein the layers 1 and 5 were prepared as compounds of about 75% PBSA and 25% PLA, layers 2 and 4 were prepared from a compound of about 31% w/w PBS, 35% w/w PBSA, 12% w/w PLA, 20% w/w PCL and 2% w/w polyvinyl alcohol (PVOH) and layer 3 is prepared from about 99.5% w/w PVOH cross linked using 0.5% w/w of a cross-linker.

Embodiments of the invention are directed to a biodegradable sheet, having at least one layer, wherein the layer comprises a first hydrophobic polymer selected from the group consisting of poly(epsilon-caprolactone) (PCL), a polyhydroxyalkanoate (PHA) and a mixture thereof, and a second hydrophobic polymer selected from the group consisting of polybutylene succinate (PBS), polybutylene succinate adipate (PBSA), poly lactic acid (PLA), polybutylene adipate terphtalate (PBAT), polydioxanone (PDO), polyglycolic acid (PGA) and any mixture thereof.

According to some embodiments the first hydrophobic polymer is PCL. According to further embodiments, the first hydrophobic polymer is a PHA. According to some embodiments, the PHA is selected from the group consisting of polyhydroxybutyrate (PHB), polyhydroxyvalerate (PHV), polyhydroxybutyrate-hydroxyvalerate copolymers (PHBV); and any derivative or mixture thereof.

According to some embodiments, the biodegradable sheet has a degradation time in the range of 4 to 24 months. According to further embodiments, the biodegradable sheet has a shelf life of about 6 months up to about 18 months.

According to some embodiments, the amount of the highly hydrophobic polymer is about 5% w/w to about 45% w/w of the contact layer, about 20% w/w to about 45% w/w or about 25% to about 40%. According to some embodiments, the second hydrophobic polymer is present in at least one layer and is selected from the group consisting of PLA, PBS, PBSA and PBAT.

According to some embodiments, the second hydrophobic polymer is present in at least one layer and is a mixture of PBS and PBSA, a mixture of PBS and PLA, a mixture of PBSA and PLA or a mixture of PBAT and PLA. According to some embodiments, the second hydrophobic polymer is present in the layer in an amount of about 55% w/w to about 95% w/w of the weight of the layer.

According to some embodiments, the sheet is a single layered sheet. According to other embodiments, the sheet is a multi-layered sheet. According to some embodiments, the multi-layered sheet consists of 2, 3, 4, 5, 6 or 7 layers. According to some embodiments, the sheet is a two-layered sheet.

According to some embodiments, the two-layered sheet comprises a first layer comprising about 70%-80% w/w PBS or PBSA and about 20%-30% PLA and a second layer comprising about 15%-25% w/w PLA, about 50%-60% w/w PBS or PBSA and about 5%-30% w/w PCL.

According to some embodiments, the sheet is a three-layered sheet. According to some embodiments, the three layered sheet comprises a first layer comprising about 70%-80% w/w PBS or PBSA and about 20%-30% PLA; a second layer comprising about 70%-80% w/w PBS or PBSA and about 20%-30% PLA; and a third layer comprising about 5%-45% w/w PCL or PHA and about 55% to about 80% w/w PLA, PBS, PBSA, PBAT or a mixture thereof, wherein the second layer is an internal layer and the third layer is the contact layer.

According to some embodiments, the three layered sheet comprises a first or third layer comprising about 100% w/w PBS or PBSA. According to some embodiments, the three layered sheet comprises a second layer comprising about 100% PBS or PBSA. According to some embodiments, the three layered sheet comprises a third layer comprising about 15%-25% w/w PBSA or PLA, about 50%-60% w/w PBAT or PBS and about 5%-30% PCL. According to some embodiments, the three layered sheet comprises a first layer comprising about 15%-25% w/w PBSA, about 50%-60% w/w PBS and about 20%-30% PCL.

According to some embodiments, the sheet is a five-layered sheet. According to some embodiments, the five-layered sheet comprises a first layer and a fifth layer comprising about 25% w/w of a first hydrophobic polymer and about 75% of a mixture of a second hydrophobic polymer selected from the group of a mixture of PBS and PBSA, a mixture of PBS and PLA, a mixture of PBSA and PLA or a mixture of PBAT and PLA; and wherein the first layer or fifth layer is the contact layer. According to some embodiments, the five-layered sheet comprises of first layer and a fifth layer comprising about 40% w/w of a first hydrophobic polymer and about 60% of a second hydrophobic polymer selected from the group PBS, PBSA, PLA and PBAT and wherein the first of fifth layer is the contact layer. According to some embodiments, the five layer sheet further comprises a hydrophilic polymer selected from PVOH and EVOH or any mixtures thereof.

According to some embodiments, the biodegradable sheet comprises at least two layers attached one to another by a tie layer. According to some embodiments, the biodegradable sheet comprises an internal layer comprising about 70%-99% PVOH and 1%-30% PBS or PBSA or PLA or PBAT or PCL.

Some embodiments of the invention are directed to a biodegradable sheet having a WVTR of below about 1-100 g/(m²×d) and/or OTR of below about 1-200 cm³/(m²×d× bar), wherein the biodegradable sheet comprises a contact layer comprising about between about 5% w/w to about 45% w/w, of a hydrophobic polymer selected from the group consisting of PCL, PHA and a mixture thereof; and a mixture of PBS and PBSA, a mixture of PBS and PLA, a mixture of PBSA and PLA, or a mixture of PBAT and PLA, in an amount of about 95% w/w to about 55% w/w Some embodiments of the invention are directed to a biodegradable sheet having a sealing strength > of about 20-30 (25 mm/N) and a sealing window of about 20-60° C., wherein the biodegradable sheet comprises a contact layer comprising about between 5% w/w to about 45% w/w PCL or PHA or a mixture thereof; and a mixture of PBS and PBSA, a mixture of PBS and PLA, a mixture of PBSA and PLA, or a mixture of PBAT and PLA, in an amount of about 95% w/w to about 55% w/w.

Some embodiments of the invention are directed to a biodegradable sheet has a compostability time of up to 6 months under standard industrial conditions. According to some embodiments, at least one layer of the biodegradable sheet is a direct contact layer.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
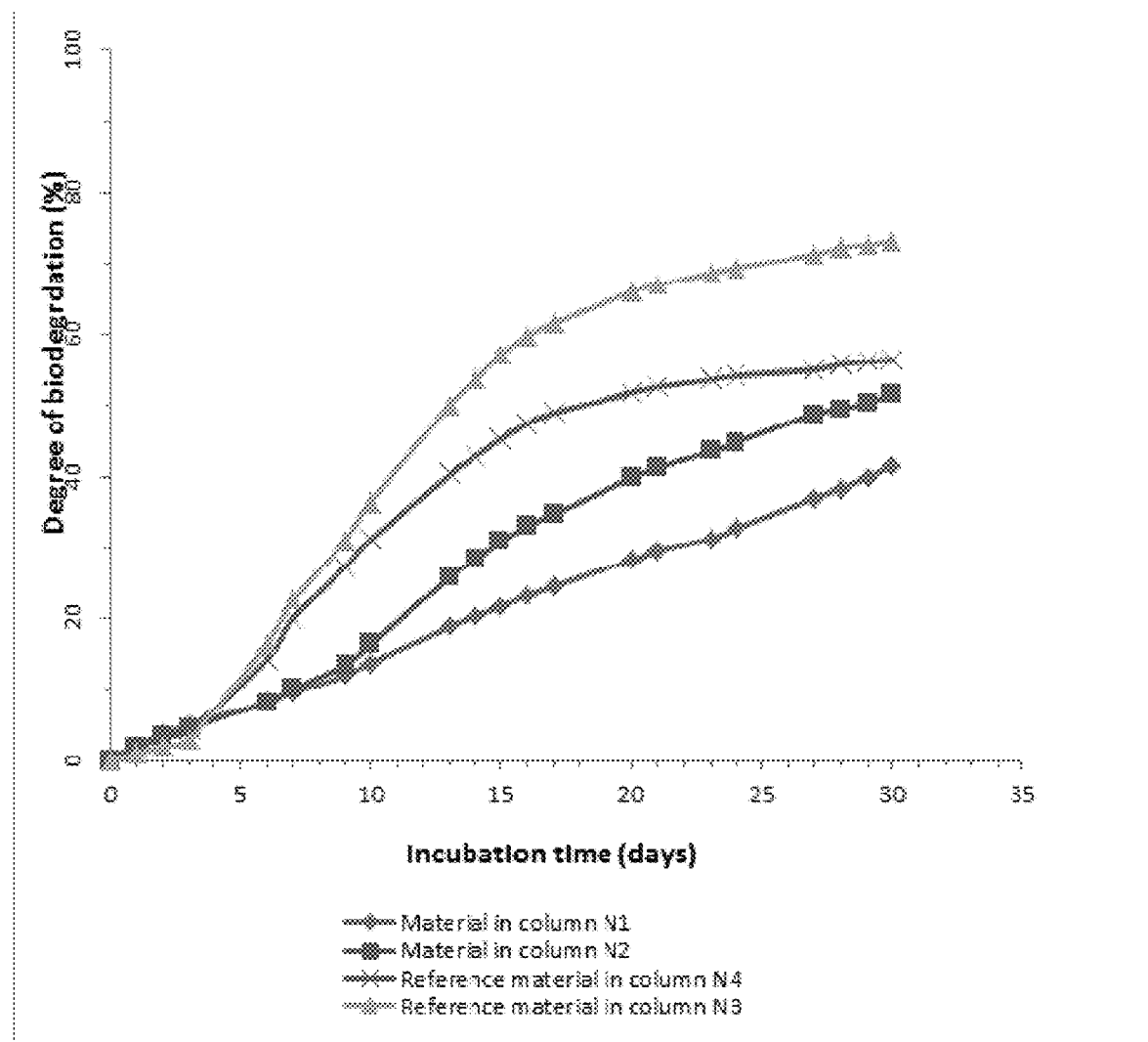
FIG. 1 is a graph showing the biodegradability of a three layered sheet prepared according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It is to be noted that, as used herein, the singular forms "a", "an" and "the" include plural forms unless the content clearly dictates otherwise. Where aspects or embodiments are described in terms of Markush groups or other grouping of alternatives, those skilled in the art will recognize that the invention is also thereby described in terms of any individual member or subgroup of members of the group.

As used herein, the terms "comprising", "including", "having" and grammatical variants thereof are to be taken as specifying the stated features, steps or components but do not preclude the addition of one or more additional features, steps, components or groups thereof.

The term "biodegradable" as used herein is to be understood to include any material, including a polymer, polymer mixture, metal that degrades through the action of living organisms, light, air, water or any combinations thereof. Such biodegradable polymers include various synthetic polymers, such as polyesters, polyester amides, polycarbonates, etc. Naturally-derived semi-synthetic polyesters (e.g., from fermentation) may also be included in the term "biodegradable". Biodegradation reactions are typically enzyme-catalyzed and generally occur in the presence of moisture. Natural macromolecules containing hydrolyzable linkages, such as protein, cellulose and starch, are generally susceptible to biodegradation by the hydrolytic enzymes of microorganisms. A few man-made polymers, however, are also biodegradable. The hydrophilic/hydrophobic character of polymers greatly affects their biodegradability, with more polar polymers being more readily biodegradable as a general rule. Other important polymer characteristics that affect biodegradability include crystallinity, chain flexibility and chain length. The sheets disclosed herein include biodegradable polymers. The sheets may include a small amount of a non-biodegradable material, e.g., less than 10% w/w. or In an embodiment of the invention less than about 5% wherein if more than one non-biodegradable component is present then each non-biodegradable component is present in an amount less than or equal to 1% w/w non-biodegradable material.

A "compostable" sheet refers to a single layer or multilayer sheet that will break down and become part of compost upon exposure to physical, chemical, thermal, and/or biological degradation. Composting may take place in, for example, a composting facility, a site with specific conditions dependent on sunlight, drainage and other factors (for example, compost sites with one of the following approvals EN 13432, DIN EN 14995, ISO 17088, ASTM D6400). Composting may also take place at a home compost, with organic waste and sufficient level of humidity, or for another example, in a landfill, unexposed to sunlight or oxygen, but only sufficient level of humidity.

The term "sheet" as used herein is to be understood as having its customary meanings as used in the thermoplastic and packaging arts. The biodegradable compositions according to the invention can be used to manufacture a wide variety of articles of manufacture, including articles useful to package solid and liquid substances, including food substances. Thus, the sheets according to this invention include sheets having a wide variety of thicknesses (both measured and calculated) and layers, for example 1, 2, 3, 4, 5 or more layers. A sheet may be generated by e.g co-extrusion casting, and blow molding.

A sheet may be a laminate generated from two or more sheets. A "laminate" as used herein is to be understood as having its customary meanings as used in the thermoplastic and packaging arts and refers to a sheet comprising two or more layers that have been assembled by, for example, heat, pressure and or adhesive.

The term "layer" as used herein is to be understood as having its customary meanings as used in the thermoplastic and packaging arts. As used herein, a layer is a film of a biodegradable composition having a thickness, of, for example, about 15 to about 100 of the overall microns thickness. One or more layers form a sheet A "tie layer" refers to an adhesive layer, for example, a commercially available adhesive resin capable of binding two layers of polar and non-polar layers together. In multi-layered polymer sheet, an internal layer is one that is not in direct contact with outer or inner environment of the packaging sheet. For example, in a three layered sheet of structure A/B/C, B is the internal and middle layer. In symmetrical five layered sheet, A/B/C/B/A both B and C are internal and C only is the middle layer. In symmetrical seven layered sheet, A/B/C/D/C/B/A, B-D are internal layers, and D is also the middle layer.

The term "about" as used herein is to be understood to refer to a 10% deviation in the value related to.

The terms "particle" or "particulate filler" should be interpreted broadly to include filler particles having any of a variety of different shapes and aspect ratios. In general, "particles" are those solids having an aspect ratio (i.e., the ratio of length to thickness) of less than about 10:1. Solids having an aspect ratio greater than about 10:1 may be better understood as "fibers", as that term will be defined and discussed herein below.

The term "fibers" should be interpreted as a solid having an aspect ratio greater than at least about 10:1. Therefore, fibers are better able to impart strength and toughness than particulate fillers. As used herein, the terms "fibers" and "fibrous material" include both inorganic fibers and organic fibers.

According to some embodiments, the biodegradable sheets described herein include a direct contact layer, e.g., a layer which is in contact with food or drink or any other dry or wet substances. According to some embodiments the direct contact layer may include poly(epsilon-caprolactone) (PCL), polydioxanone (PDO), polyglycolic acid (PGA), polybutylene succinate (PBS), polybutylene succinate adipate (PBSA), polybutylene adipate terphtalate (PBAT), poly (lactic acid) (PLA), a polyhydroxyalkanoate (PHA) such as polyhydroxybutyrate (PHB), polyhydroxyvalerate (PHV), or polyhydroxybutyrate-hydroxyvalerate copolymer (PHBV); or any mixture thereof. According to one embodiment, the hydrophobic polymer is PCL. According to some embodiments, the hydrophobic polymer is a mixture of PCL and another hydrophobic polymer, for example PBS, PBSA, or PLA. According to some embodiments, any of the biodegradable sheets detailed herein may include a direct contact layer.

Each of the polymers disclosed herein may have alternate nomenclature or spelling. For example, poly(epsilon-caprolactone), poly(caprolactone) and polycaprolactone are synonymous and the three terms may be used interchangeably. Likewise for polylactic acid and poly(lactic acid) and others.

According to some embodiments, the biodegradable sheet comprises at least one metalized, biodegradable layer, which may be an aluminum dioxide metalized layer. The biodegradable layer may be metalized using direct metallization and may optionally be a laminated layer Besides being able to biodegrade, it is often important for a polymer or polymer blend to exhibit certain physical properties. The intended application of a particular polymer blend will often dictate which properties are necessary in order for a particular polymer blend, or article manufactured there from, to exhibit the desired performance criteria. When relating to biodegradable sheets for use as packaging materials, particularly as liquid receptacles, desired performance criteria may include strain at break, Young's modulus and stress at maximum load. Other performance criteria may include one or more of sealability, water transmission and oxygen transmission.

In order to define the physical properties of the biodegradable sheets of this invention, several measurements were used. Stress at maximum load, Young's Modulus and the strain at break were measured using the ASTM D882-10 Standard Test Method for Tensile Properties of Thin Plastic Sheeting. The light transmittance and the haze were measured using the ASTM D1003-07e1 Standard Test Method for Haze and Luminous Transmittance of Transparent Plastics. The oxygen permeability of the biodegradable sheets was measured using the ASTM D3985-05(2010)e1 Standard Test Method for Oxygen Gas Transmission Rate Through Plastic Film and Sheeting Using a Coulometric Sensor. The water vapor permeability of the biodegradable sheets of the invention was measured using the ASTM E398-03(2009)e1 Standard Test Method for Water Vapor Transmission Rate of Sheet Materials Using Dynamic Relative Humidity Measurement.

In an embodiment of the invention, this invention provides a biodegradable sheet having a stress at maximum load of at least 15 Mpa. According to other embodiments, this invention provides a biodegradable sheet having a stress at maximum load of at least 30 Mpa. According to some embodiments of the invention, the stress at maximum load is in the range of 15-50 Mpa. According to some embodiments of the invention, the stress at maximum load is in the range of 15-20 Mpa. According to some embodiments of the invention, the stress at maximum load is in the range of 20-25 Mpa. According to some embodiments of the invention, the stress at maximum load is in the range of 25-30 Mpa. According to some embodiments of the invention, the stress at maximum load is in the range of 30-35 Mpa. According to some embodiments of the invention, the stress at maximum load is in the range of 35-40 Mpa. According to some embodiments of the invention, the stress at maximum load is in the range of 40-45 Mpa. According to some embodiments of the invention, the stress at maximum load is in the range of 45-50 Mpa. According to further embodiments of the invention, the stress at maximum load is in the range of 24-26 Mpa. According to further embodiments of the invention, the stress at maximum load is in the range of 46-48 Mpa. According to further embodiments of the invention, the stress at maximum load is in the range of 32-34 Mpa. According to some embodiments of the invention, the stress at maximum load is in the range of 19-21 Mpa. According to some embodiments of the invention, the stress at maximum load is in the range of 29-31 Mpa.

The biodegradable sheet of this invention has a strain at break of at least 5-10%. According to further embodiments, the strain at break is at least 300%. According to some embodiments, the strain at break is in the range of 400-600%. According to some embodiments, the strain at break is in the range of 280-850%. According to some embodiments, the strain at break is in the range of 280-350%. According to further embodiments, the strain at break is in the range of 350-450%. According to further embodiments, the strain at break is in the range of 450-550%. According to further embodiments, the strain at break is in the range of 550-650%. According to further embodiments, the strain at break is in the range of 650-750%. According to further embodiments, the strain at break is in the range of 750-850%. According to further embodiments, the strain at break is in the range of 410-420%. According to further embodiments, the strain at break is in the range of 725-735%. According to further embodiments, the strain at break is in the range of 575-585%. According to further embodiments, the strain at break is in the range of 555-565%. According to further embodiments, the strain at break is in the range of 615-625%.

The Young's Modulus of the biodegradable sheet of this invention is at least 200 Mpa. According to some embodiments of the invention, Young's Modulus is in the range of 200-800 Mpa. According to further embodiments of the invention, Young's Modulus is in the range of 400-600 Mpa. According to further embodiments, Young's Modulus is in the range of 300-350 Mpa. According to further embodiments, Young's Modulus is in the range of 350-400 Mpa. According to further embodiments, Young's Modulus is in the range of 400-450 Mpa. According to further embodiments, Young's Modulus is in the range of 450-500 Mpa. According to further embodiments, Young's Modulus is in the range of 500-550 Mpa. According to further embodiments, Young's Modulus is in the range of 550-600 Mpa. According to further embodiments, Young's Modulus is in the range of 600-650 Mpa. According to further embodiments, Young's Modulus is in the range of 650-700 Mpa. According to further embodiments, Young's Modulus is in the range of 700-750 Mpa. According to further embodiments, Young's Modulus is in the range of 750-800 Mpa. According to further embodiments, Young's Modulus is in the range of 675-685 Mpa. According to further embodiments, Young's Modulus is in the range of 565-575 Mpa. According to further embodiments, Young's Modulus is in the range of 600-610 Mpa. According to further embodiments, Young's Modulus is in the range of 670-680 Mpa. According to further embodiments, Young's Modulus is in the range of 385-395 Mpa. According to some embodiments of the invention, the light transmittance of the biodegradable sheet of the invention is at least 75%. According to further embodiments, the light transmittance is in the range of 75-95%. According to further embodiments, the light transmittance is in the range of 75-80%. According to further embodiments, the light transmittance is in the range of 80-85%. According to further embodiments, the light transmittance is in the range of 85-90%. According to further embodiments, the light transmittance is in the range of 90-95%. According to further embodiments, the light transmittance is above 95%.

According to some embodiments of the invention, the oxygen transmission rate of the biodegradable sheet of the invention is lower than 8500 cc/m2/24 hours. According to further embodiments, the oxygen transmission rate is in the range of 100-130 cc/m2/24 hours. According to further embodiments, the oxygen transmission rate is in the range of 100-1000 cc/m2/24 hours. According to further embodiments, the oxygen transmission rate is in the range of 1000-2000 cc/m2/24 hours. According to further embodiments, the oxygen transmission rate is in the range of 2000-3000 cc/m2/24 hours. According to further embodiments, the oxygen transmission rate is in the range of 3000-4000 cc/m2/24 hours. According to further embodiments, the oxygen transmission rate is in the range of 4000-5000 cc/m2/24 hours. According to further embodiments, the oxygen transmission rate is in the range of 5000-6000 cc/m2/24 hours. According to further embodiments, the oxygen transmission rate is in the range of 6000-7000 cc/m2/24 hours. According to further embodiments, the oxygen transmission rate is in the range of 7000-8000 cc/m2/24 hours.

According to some embodiments of the invention, the water vapor transmission rate of the biodegradable sheet of the invention is lower than 30 gr/m2/day. According to further embodiments of the invention, the water vapor transmission rate is lower than 20 gr/m2/day. According to further embodiments, the water vapor transmission rate is in the range of 15-20 gr/m2/day. According to further embodiments, the water vapor transmission rate is in the range of 20-25 gr/m2/day. According to further embodiments, the water vapor transmission rate is in the range of 25-30 gr/m2/day.

The invention is further directed to biodegradable sheets comprising a biodegradable polymer, capable of providing the biodegradable sheet with the desired physical properties, as detailed above. According to some embodiments, the biodegradable sheet of the invention is recyclable, i.e., the material from which it is prepared may be reused (after appropriate treatment, i.e., cleaning when necessary, grinding, heating, etc.) to prepare additional articles of manufacture.

According to further embodiments, the biodegradable sheet of the invention is compostable.

According to some embodiments, the biodegradable sheet comprises one or more synthetic polyesters, semi-synthetic polyesters made by fermentation (e.g., PHB and PHBV), polyester amides, polycarbonates, and polyester urethanes. In other embodiments the biodegradable sheet of the invention includes at least one of a variety of natural polymers and their derivatives, such as polymers comprising or derived from starch, cellulose, other polysaccharides and proteins.

According to some embodiments, the biodegradable sheet comprises a polymer Including, for example, a polylactic acid (PLA) or a derivative thereof such as crystallized PLA (CPLA); and/or polybutylene succinate (PBS), polybutylene succinate adipate (PBSA), oly(butylene adipate-co-terephthalate (PBAT), polyhydroxyalkanoates (PHA), which include polyhydroxyburate (PHB), polyhydroxyvalerate (PHV) and polyhydroxybutyrate-hydroxyvalerate copolymer (PHBV) polycaprolactone (PCL), Ecoflex®, an aliphatic-aromatic copolymer, Eastar Bio®, another aliphatic-aromatic copolymer, Bak® comprising polesteramides, Biomax®, which is a modified polyethylene terephathalate, Novamont® or any combination thereof. Other optional components include polyvinyl alcohol (PVOH), thermoplastic starch (TPS), polyethylene succinate (PES), poly(tetramethylene-adipate-coterephthalate (PTAT), and the like.

According to some embodiments, the PLA is a homopolymer. According to further embodiments, the PLA is copolymerized with glycolides, lactones or other monomers. One particularly attractive feature of PLA-based polymers is that they are derived from renewable agricultural products. Further, since lactic acid has an asymmetric carbon atom, it exists in several isomeric forms. The PLA used according to some embodiments of the invention includes poly-L-lactide, poly-D-lactide, poly-DL-lactide or any combination thereof.

According to some embodiments, the biodegradable sheet of the invention further comprises one or more additives. According to one embodiment, an additive is included to soften the biodegradable polymer. Such a "softener" may be selected from the group comprising Paraloid®, Sukano®, tributyl acetyl citrate (A4®) or any combination thereof.

According to some embodiments, the biodegradable sheet of the invention comprises at least one nanoclay and/or at least one nano-composite. The addition of the nanoclay and/or the nano-composite lowers the water vapor transmission rate and the oxygen transmission rate of the biodegradable sheet of the invention, thus acting as barriers in the sheet. Further, according to certain embodiments of this invention, the nanoclays and the nano-composites added to the biodegradable sheet are naturally occurring materials, and therefore, the sheets remain biodegradable. According to one embodiment, montmorillonite, vermiculite or any combination thereof are added to the composition of the biodegradable sheet.

According to one embodiment, nanoclays based on montmorrilonite with polar organophilic based surface treatment and/or nanoclays based on vermiculite, heat treated and polar organophilic base surface treated are added to the biodegradable composition in order to create a well dispersed material. According to one embodiment, the nanoclay based gas barrier is dispersed in the bulk of the biodegradable composition, preferably added during the melt compounding process. The dispersement of nanoclay platelets creates a tortuous path in the bulk of the composition, thus leading to a reduction in gas permeation rates though the biodegradable sheet produced. According to another embodiment, the nanoclay based gas barrier is implemented as an internal gas barrier layer in a multilayer biodegradable sheet, wherein the barrier layer reduces the gas permeation rate.

According to some embodiments, the nanoclay particles are surface treated so as to enable them to be homogenously dispersed in the biodegradable polymer matrix. According to some embodiments, the nanoclay particles are treated with a bifunctional moiety, wherein one functional group of the moiety is conjugated to the nanoclay particle, while the other functional group is conjugated to the biodegradable polymer. Thus, the bi-functional moiety acts as a bridge between the nanoclay particles and the biodegradable polymer. According to some embodiments, more than one bifunctional moiety is used such that the bridge between the nanoclay and the biodegradable polymer may be two or more bifunctional groups conjugated to one another. The tying of the functional group to the nanoclay or the biodegradable polymer may be by any process, including adsorption, covalent bonding, ionic bonding, etc.

According to some embodiments, before tying the bifunctional moiety to the nanoclay, the nanoclay is pre-treated to remove ions adsorbed on the surface thereof. According to one embodiment, the nanoclay is pre-treated with an acid. According to one embodiment, the nanoclay is pretreated with HCl.

According to some embodiments, the bi-functional moiety is 3-(dimethylamino)-1-propylamine (DMPA), which has a tertiary amine functional group and a primary amine functional group. According to some embodiments, nanoclay particles, possibly pre-treated nanoclay particles, are reacted with the tertiary amine of the DMPA, leaving the primary amine free for reaction. The primary amine may be further reacted with any appropriate bifunctional group, such as a bifunctional isocyanate, wherein one of the isocyanate groups is conjugated to the primary amine and the other is left free. According to some embodiments, the bifunctional isocyanate is hexamethylene diisocyanate (HDI), methylene diphenyl diisocyanate (MDI) or toluene diisocyanate (TDI). Once the first isocyanate group is conjugated to the primary amine of the DMPA, the second isocyanate group may be conjugated to any appropriate biodegradable polymer. Thus, according to the above procedure, the nanoclay is conjugated to the DMPA, which in turn is conjugated to the bifunctional isocyanate, which in turn is conjugated to the biodegradable polymer, thus allowing the homogenous dispersion of the nanoclay particles in the biodegradable polymer matrix. According to further embodiments, the primary amine is reacted with a maleic anhydride, which is further reacted with the biodegradable polymer, such that the bridge between the nanoclay and the biodegradable polymer is formed from a bifunctional moiety, such as DMPA, conjugated to an additional bi functional moiety, such as MAH.

According to further embodiments, the nanoclay particles are covalently bound to a moiety having two or more functional groups, such as triethoxysilane substituted with an isocyanate group, such that covalent bonds are formed by a reaction between the ethoxy-silane groups on the functional moiety and the siloxy groups on the nanoclay surface. The remaining isocyanate group in turn may be reacted with any appropriate biodegradable polymer, thus forming a bridge between the nanoclay particles and the biodegradable polymer, ensuring the homogeneous dispersion of the nanoclay particles throughout the biodegradable matrix.

According to further embodiments, the nanoclay particles are covalently bound to a moiety having two or more functional groups, such as aminopropyl triethoxysilane (APTES), to form covalent bonds by a condensation reaction of the ethoxy-silane groups with the siloxy groups on the nanoclay surface. The remaining functional group, e.g., a primary amine on the APTES molecule, may be further reacted with any appropriate bifunctional group, such as bifunctional isocyanate. Since the the bifunctional isocyanate have two functional groups, once reacted with the remaining functional group of the functional moiety conjugated to the nanoclay, a free functional group remains, which may be reacted with any appropriate biodegradable polymer, thus forming a bridge between the nanoclay particles and the biodegradable polymer, ensuring the homogeneous dispersion of the nanoclay particles throughout the biodegradable matrix.

According to some embodiments, the functional moiety reacts with the siloxy groups on the nanoclay surface and acts as a bridge, or anchoring moiety, between the inorganic nanoclay particles and the organic biodegradable polymer. The nanoclay particles are processed with monomer/polymer in about a 1:2, 1:3, 1:4, 1:5, 1:6 ratio, making a final nanoclay in concentrate in dispersion of 25% w/w.

According to further embodiments, functional groups on the nanoclay surface, such as siloxyl groups, may be used as initiators for a ring opening polymerization process (ROP). Thus, the nanoclay particles are reacted with ring-bearing monomers, such as L-lactide, D-lactide, D,L-lactide and epsilon-caprolacton or a combination thereof. Each ring opened has a free radical that reacts with an additional monomer in a ring opening process, thus forming polymers, in the shape of polymer brushes, on the surface of the nanoclay particles. Once the nanoclay particles are conjugated to such polymer brushes, they may be easily compounded with any appropriate biodegradable polymer such that the nanoclay particles are homogeneously dispersed throughout the biodegradable polymer matrix. Further, such polymer brushes are also considered to be biodegradable, thus, offering an exfoliation process for nanoclay particles that does not involve any compounds that are not biodegradable, ensuring that the polymeric films comprising the same are fully biodegradable.

According to some embodiments, the ROP may be performed between at any temperature between 150° C. to 180° C., possibly in the presence of a catalyst, such as an organo-metal catalyst, like but are not limited to tin tetrachloride ($SnCl_4$), stannous octoate (SnOct) and dibutyltin dilaurate (DBTL). According to further embodiments, the ROP is initiated by heating and/or the addition of a catalyst after the nanoclay particles are fully dispersed in the monomer solution.

According to some embodiments, the preparation of polymers on the nanoclay surface by any appropriate means, such as ROP, results in the formation of polymer brushes perpendicular to the nanoclay particle surface, which contributes to the stable exfoliation of the nanoclay particles, as well as to the homogenous particles dispersion of the nanoclays throughout the biodegradable polymer. According to some embodiments, the polymer brushes are composed of random copolymers of lactide and caprolactone, the lactide is with about 10% mol of the caprolactone, and the total polymers are about 75% w/w of the nanoclay concentrate. Such polymers have a transition temperature slightly below 60° C. and therefore, the polymer brushes coating the nanoclay particles may be fully molten when the polymer is melted and prepared for extrusion, allowing homogenous dispersion of the nanoclay, as well as enhanced particle orientation. Such nanoclay particles having polymer brushes on their surface are also related to herein as a nanoclay concentrate. According to some embodiments, the nanoclay concentrate is prepared by any appropriate means, not necessarily ROP.

Thus, according to some embodiments, the prepared polymeric film includes at least one layer of surface modified nanoclay, homogenously dispersed in a biodegradable polymer matrix.

According to one embodiment, the nanoclay added to the biodegradable sheet creates a tortuous structure that resists the penetration of moisture, oil, grease and gases, such as oxygen, nitrogen and carbon dioxide. According to one embodiment of the invention, the nanoclay is based on nano-kaolin. According to another embodiment, the nanoclay added to the biodegradable sheet is based on bentonite, which is an absorbent aluminium phyllosilicate. According to one embodiment, the nanoclay is based on Cloisite®. According to one embodiment, a mixture of any appropriate nanoclays may be added to the biodegradable sheet.

According to one embodiment, the nanoclay is dispersed in the bulk of the biodegradable composition, resulting in the dispersement of the nanoclay in at least one layer of the biodegradable sheet. According to some embodiments, the nanoclay is added during the melt compounding process. According to another embodiment, the nanoclay is added to the biodegradable sheet in a separate layer, together with a biodegradable polymer, thus forming a nano-composite layer. According to one embodiment, the nanoclay layer in the multilayer biodegradable sheet is an internal layer, i.e., is not exposed to the outside atmosphere.

According to one embodiment of the invention, the amount of the nanoclay is about 20-30% w/w of the nano-composite layer. According to one embodiment, the amount of the nanoclay is about 15-20% w/w of the nano-composite layer. According to one embodiment, the amount of the nanoclay is about 10-15% w/w of the nano-composite layer. According to one embodiment, the amount of the nanoclay is about 5-10% w/w of the nano-composite layer. According to one embodiment, the amount of the nanoclay is about 1-5% w/w of the nano-composite layer. According to one embodiment, the amount of the nanoclay is less than about 20% w/w of the nano-composite layer. According to one embodiment, the amount of the nanoclay is less than about 15% w/w of the nano-composite layer.

According to some embodiments, the biodegradable sheet includes a direct contact layer, e.g., which is in contact with food or drink or any other dry or wet substances. According to some embodiments of the invention, the direct contact layer comprises a hydrophobic polymer. According to some embodiments, the hydrophobic polymer is poly(epsilon-caprolactone) (PCL), polyhydroxybutyrate (PHB), polydioxanone (PDO) polyglycolic acid (PGA), polybutylene succinate (PBS), polybutylene succinate adipate (PBSA), poly lactic acid (PLA), polybutylene adipate terphtalate (PBAT), a polyhydroxyalkanoate (PHA) such as polyhydroxybutyrate (PHB), polyhydroxyvalerate (PHV), and polyhydroxybutyrate-hydroxyvalerate copolymer (PHBV); or any mixture thereof. According to one embodiment, the hydrophobic polymer is PCL.

According to some embodiments, the direct contact layer has a thickness of about 5-15 microns. According to some embodiments, the direct contact layer has a thickness of about 2-30 microns. According to some embodiments, the direct contact layer has a thickness of about 2-10 microns. According to some embodiments, the direct contact layer has a thickness of about 10-20 microns. According to some embodiments, the direct contact layer has a thickness of about 20-30 microns.

According to some embodiments, the shelf life of the biodegradable sheet is extended due to the presence of PCL, which has a degradation time of up to 24 months; therefore, the final composition can be tailored to have a degradation time of from 4 months and up to 24 months, depending on the amount of PCL.

The food packaging shelf life should be sufficient to preserve and might extend the product expiration period. For dry food content these can reach 12 months of a period. Since the degradable packaging is exposed to ambient humidity and room temperature, its barrier properties and the mechanical properties should not decrease, with in this period, above 10% of its original values.

According to some embodiments, the direct contact layer includes a mixture of hydrophobic polymers, such as PCL and a polymer having a relatively high melting temperature, such as PBSA, PBS or PLA or any combination thereof. According to some embodiments, the amount of the hydrophobic polymer in the direct contact layer is between about 5% w/w to 40% w/w. According to further embodiments, the amount of hydrophobic polymer in the direct contact layer is between about 5% w/w to 10% w/w. According to further embodiments, the amount of hydrophobic polymer in the direct contact layer is between about 10% w/w to 20% w/w. According to further embodiments, the amount of the hydrophobic polymer in the direct contact layer is between about 20% w/w to 30% w/w. According to further embodiments, the amount of hydrophobic polymer in the direct contact layer is between about 30% w/w to 40% w/w. According to some embodiments, the direct contact layer comprises between about 5% w/w to about 40% w/w PCL and between about 95-60% PBSA and/or PBS together with PLA, wherein the amount of the PLA w/w is about a third of the amount of the PBSA w/w and/or PBS w/w.

According to some embodiments, if PCL is included in the direct contact layer, the amount of the PCL in the direct contact layer is between about 5% w/w to 40% w/w. According to further embodiments, the amount of PCL in the direct contact layer is between about 5% w/w to 10% w/w. According to further embodiments, the amount of PCL in the direct contact layer is between about 10% w/w to 20% w/w. According to further embodiments, the amount of the PCL in the direct contact layer is between about 20% w/w to 30% w/w. According to further embodiments, the amount of PCL in the direct contact layer is between about 30% w/w to 40% w/w.

Without wishing to be bound to theory and according to some embodiments, the PBSA and/or PBS are compounded with the PCL and PLA and may be used as a thermal bridge between PCL and PLA, thus forming a homogenous biodegradable sheet constructed of PCL/PBS/PLA, PCL/PBSA/PLA or PCL/PBS+PBSA/PLA, such that there is no phase separation between the PCL and the PLA. According to further embodiments, a cross-linker is applied together with reactive extrusion of the materials, prior to molding or shaping them, thus allowing the construction of sheet comprising PBS and/or PBSA as a thermal bridge. According to some embodiments, the cross-linker is applied using any appropriate crosslinkers, such as maleic anhydride (MAH), 1,4-butandiol diacrylate, poly(ε-caprolactone)-dimethacrylate (PCL-dMA), any type of acrylate or diacrylate polymer or any combination thereof. According to some embodiments, the amount of the cross-linker is about 0.1-10% mol/mol. According to further embodiments, the amount of the cross-linker is about 0.5-2% mol/mol. According to some embodiments, a thermal radical initiator is used to initiate the radical polymerization of the crosslinker. According to some embodiments, such initiators include azo radical formers or peroxide radical formers, such as, azobisisobutyronitrile (AIBN) and benzyl-peroxide (BPO).

According to further embodiments, block copolymers of PCL and PLA blocks may be prepared. The prepared block copolymer may have any appropriate block molecular weight, block ratio and total molecular weight. The block copolymer may be prepared by ring opening polymerization of epsilon caprolactone, to polymerize PCL having a molecular weight of 300-6000 g/mol. The polymerization may continue by substituting the monomer feed to dimers of L-Lactide, or D-Lactide or D,L-Lactide to form triblock copolymer where the PLA chains are of molecular weight of 144-6000 g/mol at each side.

According to further embodiments, block polymers of PCL and PLA blocks may be prepared. The prepared block polymer may have any appropriate block molecular weight, block ratio and total molecular weight. The block copolymer may be prepared by an oligomer of poly(epsilon caprolactone) (PCL) with molecular weight of 300-6000 g/mol, and two or three hydroxyl end groups, initiating the dimer of L-Lactide, or D-Lactide or D,L-Lactide to form PLA chains of molecular weight of 144-6000 g/mol.

According to further embodiments, block polymers of PLA and PCL blocks may be prepared. The prepared block polymer may have any appropriate block molecular weight, block ratio and total molecular weight. The block copolymer may be prepared by ring opening polymerization of dimers of L-Lactide, or D-Lactide or D,L-Lactide to form the central polymer block with PLA of molecular weight of 144-6000 g/mol, and then substituting the monomer feed to epsilon caprolactone, to polymerize PCL with molecular weight of 300-6000 g/mol at each side. According to some embodiments, possible phase separation between polymers, such as PCL and PLA may be measured by differential scanning calorimetry (DSC) and may further be determined according to the glass transition shift. According to further embodiments, the films' degradation and expected shelf-life may be determined according to mechanical analysis, weight change, film turbidity, FT-IR Spectroscopy with Attenuated Total Reflectance (ATR), real-time degradation test and any combination thereof.

Some embodiments are directed to a single layered biodegradable sheet comprising about 10% w/w to 30% w/w PLA and 35% w/w to 75% w/w PBS and/or PBSA and 5% w/w to 55% w/w PCL. Some embodiments are directed to a single layered biodegradable sheet comprising about 15% w/w to 20% w/w PLA, 50% w/w to 60.0% w/w PBS and/or PBSA and 10.0% w/w to 30% w/w PCL. Some embodiments are directed to a single layered biodegradable sheet comprising about 20% w/w PLA, 60.0% w/w PBS and/or PBSA and 10.0% w/w PCL. Some embodiments are directed to a single layered biodegradable sheet comprising about 17.5% w/w PLA and 52.5% w/w PBS and/or PBSA and 30.0% w/w PCL. Each of the sheets disclosed above may further include about 0.5% w/w to about 5% w/w PVOH. Some embodiments are directed to a single layered biodegradable sheet comprising between about 10-30% w/w PLA and 40-60% w/w PBS and 20-40% w/w PCL. Some embodiments are directed to a single layered biodegradable sheet comprising between about 10-25% w/w PLA and 35-75% w/w PBS and 5-50% w/w PCL.

The sheet may be used as a stand-alone sheet or may form a layer in a multilayered sheet. Some embodiments are directed to a multi layered biodegradable sheet comprising at least one layer comprising about 20% w/w PLA, 60.0% w/w PBS and 20.0% w/w PCL. Some embodiments are directed to a multi layered biodegradable sheet comprising at least one layer comprising about 17.5% w/w PLA and 52.5% w/w PBS and 30.0% w/w PCL. Some embodiments are directed to a multi layered biodegradable sheet comprising at least one layer comprising between about 10-30% w/w PLA and 40-60% w/w PBS and 20-40% w/w PCL. Some embodiments are directed to a multi layered biodegradable sheet comprising at least one layer comprising between about 10-25% w/w PLA and 35-75% w/w PBS and 5-50% w/w PCL. Some embodiments are directed to a multi layered biodegradable sheet comprising at least one layer comprising about 0-20% w/w PLA, 45.0-80.0% w/w PBS, PBSA or a mixture of PBS and PBSA and 20.0%-30.0% w/w PCL. Some embodiments are directed to a multi layered biodegradable sheet comprising at least one layer comprising about 18-%-20% w/w PLA, 50.0-75.0% w/w PBS, PBSA or a mixture of PBS and PBSA and 20.0%-30.0% w/w PCL. Some embodiments are directed to a multi layered biodegradable sheet comprising at least one layer comprising about 18%-20% w/w PLA, 75.0% w/w PBS, PBSA or a mixture of PBS and PBSA and 25.0% w/w PCL. Some embodiments are directed to a single layered biodegradable sheet comprising about 20.0% w/w PLA, 60.0% w/w PBS and 20.0% w/w PCL with 0.5% w/w MAH and 0.2% AIBN. Some embodiments are directed to a single layered biodegradable sheet comprising about 17.5% w/w PLA and 52.5% w/w PBS, 30.0% w/w PCL with 0.5% w/w MAH and 0.2% AIBN. Some embodiments are directed to a single layered biodegradable sheet comprising about 15.0% w/w PLA and 45.0% w/w PBS, 40.0% w/w PCL with 0.5% w/w MAH and 0.2% AIBN. Some embodiments are directed to a single layered biodegradable sheet comprising between about 10-25% w/w PLA and 40-65% w/w PBS, 15-45% w/w PCL with 0.3-0.7% w/w MAH and 0.1-0.3% AIBN. Some embodiments are directed to a single layered biodegradable sheet comprising between about 15-20% w/w PLA and 45-60% w/w PBS, 20-40% w/w PCL with 0.4-0.6% w/w MAH and 0.15-0.25% AIBN.

Some embodiments are directed to a multi layered biodegradable sheet comprising at least one layer comprising about 20.0% w/w PLA, 60.0% w/w PBS and 20.0% w/w PCL with 0.5% w/w MAH and 0.2% w/w AIBN. Some embodiments are directed to a multi layered biodegradable sheet comprising at least one layer comprising about 17.5% w/w PLA and 52.5% w/w PBS, 30.0% w/w PCL with 0.5% w/w MAH and 0.2% w/w AIBN. Some embodiments are directed to a multi layered biodegradable sheet comprising at least one layer comprising about 15.0% w/w PLA and 45.0% w/w PBS, 40.0% w/w PCL with 0.5% w/w MAH and 0.2% AIBN. Some embodiments are directed to a multi layered biodegradable sheet comprising at least one layer comprising between about 10-25% w/w PLA and 40-65% w/w PBS, 15-45% w/w PCL with 0.3-0.7% w/w MAH and 0.1-0.3% AIBN. Some embodiments are directed to a multi layered biodegradable sheet comprising at least one layer comprising between about 10-25% w/w PLA and 35-75% w/w PBS and 5-50% w/w PCL with 0.1-2.0% w/w MAH and 0.1-0.5% AIBN Some embodiments are directed to a multi layered e.g. more than one layer biodegradable sheet comprising at least one layer comprising about 10% w/w to 30% w/w PLA and 35% w/w to 75% w/w PBS and/or PBSA and 5% w/w to 55% w/w PCL. Some embodiments are directed to a multi layered biodegradable sheet comprising at least one layer comprising about 17.5% w/w PLA and 52.5% w/w PBS and/or PBSA, 30.0% w/w PCL. Some embodiments are directed to a multi layered biodegradable sheet comprising at least one layer comprising about 15.0% w/w PLA and 45.0% w/w PBS and/or PBSA, 40.0% w/w PCL. Some embodiments are directed to a multi layered biodegradable sheet comprising at least one layer comprising about 10% w/w to 25% w/w PLA and 40% w/w to 65% w/w PBS and/or PBSA, 15-45% w/w PCL. Some embodiments are directed to a multi layered biodegradable sheet comprising at least one layer comprising about 10% w/w to 25% w/w PLA and 35% w/w to 75% w/w PBS and/or PBSA and 5% w/w to 50% w/w PCL. Each of the layers disclosed above may further include about 0.5% w/w to about 5% w/w PVOH.

Some embodiments are directed to a three-layered biodegradable sheet wherein layers 1 and 3 comprise about 31% w/w PBS, 35% w/w PBSA, 12% w/w PLA, 20% w/w PCL and 2% w/w PVOH and layer 2 is PVOH cross linked using a cross-linker such as MAH or methylenediphenyl diisocyanate (MDI). Some embodiments are directed to a multi layered biodegradable sheet comprising layers 1 and 3 prepared from a compound comprising between about 25-35% w/w PBS, 30-25% w/w PBSA, 5-20% w/w PLA, 15-25% w/w PCL and 1-3% w/w PVOH and layer 2 is PVOH cross linked using a cross-linker such as MAH or diisocyanate. According to some embodiments, layer 2 is about 100% PVOH. According to other embodiments, layer 2 comprising about 50-95% PVOH with 5-50% PBS, cross-linked.

According to some embodiments, the biodegradable sheet comprises at least one metalized, biodegradable layer, metalized with any appropriate metal, such as aluminum or aluminum dioxide. According to some embodiments, the biodegradable layer is metalized with aluminum dioxide. According to some embodiments, the biodegradable layer is metalized using direct metallization. According to some embodiments, the metalized layer may form a layer in a laminate. The laminate may be prepared using a biodegradable solvent based adhesive, a solventless adhesive or any combination thereof.

According to some embodiments, solvent based biodegradable adhesives include water based compositions of di-isocyanate or multi-isocyanate and diol or polyol. According to some embodiments, solventless adhesives include di-isocyanate or multi-isocyanate and diol or polyol (in the melted state).

According to one embodiment of the invention, one of the layers may include oxygen and moisture scavengers, which may actively attract and remove the permeated gases from the polymeric matrix and expel it. Commercial "oxygen scavengers" may be incorporated into polyethylene terephthalate (PET) or polyamides. The additives may be used at levels of about 2-8%. According to some embodiments, the additives are miscible according to some embodiments an oxidizable polymer may be used for the reaction, which may be catalyzed according to some embodiments by a transition metal. According to some embodiments the catalyst is a cobalt complex with organic molecules such as ethylenediaminetetraacetic acid (EDTA). The reaction may be triggered by humidity moving through the plastic matrix. According to some embodiments the scavengers not only remove oxygen as it ingresses into the package, but also as it egresses from the package headspace into the wall of the package. Since the dissolved oxygen in beverages tends to migrate into the package due to gradient affect, it may be likewise removed. According to some embodiments, when utilizing oxygen scavengers, the oxygen levels are close to zero for long shelf life.

According to some embodiments, the combination of oxygen scavengers and nanoclays creates a synergistic effect.

According to one embodiment, the biodegradable sheet of the invention includes at least one external layer that is a multilayer laminate, based on biodegradable blends. According to further embodiments, the biodegradable sheet of the invention includes at least one internal biodegradable nanocomposite layer.

According to some embodiments, the biodegradable sheet includes at least one internal core layer of a gas barrier material, such as polyvinyl alcohol (PVOH). According to some embodiments, the biodegradable sheet includes one, two or more internal core layers of a gas barrier material, such as PVOH. A highly polar gas barrier material, such as PVOH, exhibits weak interaction with low polarity gases, such as oxygen and carbon dioxide, which, together with the crystalline regions in the sheet, reduce the permeability rate of gases through the sheet. Although not required, the PVOH can be further modified with maleic anhydride (MAH) or with any appropriate compatibilizer or cross linker, in order to better compatibilize it with the other polymer layers. According to some embodiments, the PVOH is grafted with a biodegradable polymer. A variety of crosslinking agents may be used, these include acrylic or methacrylic functionalized monomer, having one or more functional group, and usually the crosslinker contains two reactive groups to be used for crosslinking. More specifically crosslinkers may include but are not limited to 1,4-Butanediol dimethacrylate, hexamethylene dimethacrylate, maleic anhydride, polyethylene glycol-dimethacrylate, and polycaprolactone dimethacrylate.

According to one embodiment of the invention, the biodegradable sheet includes natural hygroscopic materials including polysaccharides, such as for example, starch to be used as high polar gas barrier material, to actively absorb moisture. The starch can be incorporated into the polymer matrix as a blend, tend to phase separate, to form islands of absorbing material, which, together with the crystalline regions in the sheet, reduce the permeability rate of gases through the sheet.

According to some embodiments of the invention, the biodegradable sheet includes PVOH and a nanoclay dispersed in one or more of the layers as described above.

According to some embodiments, the biodegradable sheet comprises an external laminate layer, an internal nanocomposite layer and an internal core layer. Such a biodegradable sheet provides low permeability rate of gases.

According to one embodiment, a compatibilizer is added to the biodegradable sheet. The compatibilizer is added in order to enhance the adhesion between the different layers of the multilayer biodegradable sheet. According to one embodiment, the compatibilizer is based on PBSA grafted with maleic anhydride, which is a monomer known for grafting used mainly for modifying polyolefins. According to one embodiment, the PBSA is grafted with the maleic anhydride in a twin-screw extruder, using a continuous flow of nitrogen. According to one embodiment the drafting is initiated by an initiator, such as dicumyl peroxide, benzoyl peroxide and 2,2-azobis(isobutyronitrile). According to one embodiment, a mixture of PBSA, about 3% maleic anhydride and about 1% dicumyl peroxide is extruded in order to obtain PBSA grafted with maleic anhydride. According to one embodiment, a mixture of PBSA, maleic anhydride and 2,2-azobis(isobutyronitrile) is extruded in order to obtain PBSA grafted with maleic anhydride. In some embodiments other crosslinkers may be used.

According to one embodiment, a mixture of PVOH, maleic anhydride and 2,2-azobis(isobutyronitrile) is extruded in order to obtain PVOH grafted with maleic anhydride (MAH). According to one embodiment, a mixture of PVOH with highly branched PBS and maleic anhydride and 2,2-azobis(isobutyronitrile) (AIBN) is extruded in order to obtain PVOH grafted with maleic anhydride, compounded with PBS. According to some embodiments of the invention the weight percentage of the PVOH is in the range of 10-60% w/w over the PBS, that is in the range of 40-90% w/w. A variety of other radical initiators may be used, these include peroxides and azo-group free radical formers. More specifically, radial formers may include but are not limited to benzoyl peroxide (BPO), lauroyl peroxide (LP), azobisisobutyronitrile (AIBN), and Azobis(cyanocyclohexane), (ACHN).

According to some embodiments, the amount of maleic anhydride grafted to the PVOH is about 0.1-5.0% w/w. According to further embodiments, the amount of the 2,2-azobis(isobutyronitrile) used as an initiator is about 0.1-0.3% w/w. According to some embodiments, when the amount of the maleic anhydride is about 1.0% w/w, the amount of the 2,2-azobis(isobutyronitrile) is about 0.3% w/w and when the amount of the maleic anhydride is about 0.5% w/w, the amount of the 2,2-azobis(isobutyronitrile) is about 0.1% w/w. According to some embodiments, the ratio between the MAH and the 2,2-azobis(isobutyronitrile) is about 1:2-1:10. According to further embodiments, the amount of the 2,2-azobis(isobutyronitrile) is about 0.5-1.0% w/w. According to further embodiments, the amount of the 2,2-azobis(isobutyronitrile) is about 1.0-2.0% w/w. According to further embodiments, the amount of the 2,2-azobis(isobutyronitrile) is about 2.0-3.0% w/w. According to further embodiments, the amount of the 2,2-azobis(isobutyronitrile) is about 3.0-4.0% w/w. According to further embodiments, the amount of the 2,2-azobis(isobutyronitrile) is about 4.0-5.0% w/w.

According to one embodiment, a mixture of highly branched PVOH with highly branched PBS, PBSA, PLA or PCL and about 1% maleic anhydride and about 0.3% 2,2-azobis(isobutyronitrile) is extruded in order to obtain PVOH grafted with maleic anhydride, compounded with PBS. According to one embodiment, a mixture of PVOH with highly branched molecule of PBS or any other appropriate polymer and about 0.5% maleic anhydride and about 0.1% 2,2-azobis(isobutyronitrile) is extruded in order to obtain PVOH grafted with maleic anhydride compounded with PBS.

According to one embodiment, the amount of compatibilizer added to the PBSA layer is up to 10% w/w. According to one embodiment, the amount of compatibilizer added to the PBSA layer is up to 5% w/w. According to another embodiment, the amount of compatibilizer added to the PBSA layer is up to 4%. According to another embodiment, the amount of compatibilizer added to the PBSA layer is up to 3%. According to another embodiment, the amount of compatibilizer added to the PBSA layer is up to 2%. According to another embodiment, the amount of compatibilizer added to the PBSA layer is up to 1%. According to another embodiment, the amount of compatibilizer added to the PBSA layer is in the range of 2-4%.

According to one embodiment, the amount of compatibilizer in the PVOH layer is up to about 10% w/w. According to one embodiment, the amount of compatibilizer in the PVOH layer is up to about 5% w/w. According to another embodiment, the amount of compatibilizer in the PVOH layer is up to about 4% w/w. According to another embodiment, the amount of compatibilizer in the PVOH layer is up to about 3% w/w. According to another embodiment, the amount of compatibilizer in the PVOH layer is up to about 2% w/w. According to another embodiment, the amount of compatibilizer in the PVOH layer is up to about 1% w/w. According to another embodiment, the amount of compatibilizer in the PVOH layer is in the range of about 2-4% w/w.

According to some embodiments, the biodegradable sheet of the invention further comprises inorganic particulate fillers, fibers, organic fillers or any combination thereof, in order to decrease self-adhesion, lower the cost, and increase the modulus of elasticity (Young's modulus) of the polymer blends.

Examples of inorganic particulate fillers include, gravel, crushed rock, bauxite, granite, limestone, sandstone, glass beads, aerogels, xerogels, mica, clay, alumina, silica, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials. A wide variety of other inorganic fillers may be added to the polymer blends, including materials such as metals and metal alloys (e.g., stainless steel, iron, and copper), balls or hollow spherical materials (such as glass, polymers, and metals), filings, pellets, flakes and powders (such as microsilica) as well as any combination thereof.

Examples of organic fillers include seagel, cork, seeds, gelatins, wood flour, saw dust, milled polymeric materials, agar-based materials, native starch granules, pregelatinized and dried starch, expandable particles, as well as combination thereof. Organic fillers may also include one or more appropriate synthetic polymers.

Fibers may be added to the moldable mixture to increase the flexibility, ductility, bendability, cohesion, elongation ability, deflection ability, toughness, and fracture energy, as well as the flexural and tensile strengths of the resulting sheets and articles. Fibers that may be incorporated into the polymer blends include naturally occurring organic fibers, such as cellulosic fibers extracted from wood, plant leaves, and plant stems. In addition, inorganic fibers made from glass, graphite, silica, ceramic, rock wool, or metal materials may also be used. Preferred fibers include cotton, wood fibers (both hardwood or softwood fibers, examples of which include southern hardwood and southern pine), flax, abaca, sisal, ramie, hemp, and bagasse because they readily decompose under normal conditions. Even recycled paper fibers can be used in many cases and are extremely inexpensive and plentiful. The fibers may include one or more filaments, fabrics, mesh or mats, and which may be co-extruded, or otherwise blended with or impregnated into, the polymer blends of the present invention.

According to further embodiments, plasticizers may be added to impart desired softening and elongation properties as well as to improve processing, such as extrusion. Optional plasticizers that may be used in accordance with the present invention include, but are not limited to, soybean oil caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, polymeric plasticizers such as poly(1,6-hexamethylene adipate), and other compatible low molecular weight polymers.

According to some embodiments, lubricants, such as salts of fatty acids, e.g., magnesium stearate, may also be incorporated into the biodegradable sheets of the invention.

According to additional embodiments, the biodegradable sheets of this invention may be embossed, crimped, quilted or otherwise textured to improve their physical properties.

The biodegradable sheet of this invention is composed of any appropriate number of layers. According to one embodiment, the biodegradable sheet of this invention comprises one layer. According to another embodiment, the biodegradable sheet of this invention comprises two layers. According to another embodiment, the biodegradable sheet of this invention comprises three layers. According to another embodiment, the biodegradable sheet of this invention comprises four layers. According to another embodiment, the biodegradable sheet of this invention comprises five layers.

According to some embodiments, the biodegradable sheets of this invention have any desired thickness. According to some embodiments, the thickness of the sheets ranges from 20-300 microns. The measured thickness will typically be between 10-100% larger than the calculated thickness when the sheets are prepared from compositions that have a relatively high concentration of particulate filler particles, which can protrude from the surface of the sheet. This phenomenon is especially pronounced when significant quantities of filler particles, having a particle size diameter that is larger than the thickness of the polymer matrix, are used.

According to some embodiments, the thickness of a one layer sheet is about 40-60 microns. According to some embodiments, the thickness of a one layer sheet is about 50 microns. According to some embodiments, the thickness of a three layer sheet is about 90-110 microns. According to some embodiments, the thickness of a three layer sheet is about 100 microns. According to some embodiments, the biodegradable sheets of the invention have a low haze.

According to some embodiments, the thickness of a one layer sheet or a single layer in a multilayer sheet is about 5-60 microns. According to some embodiments, the thickness of a one layer sheet is about 5-50 microns. According to some embodiments, the thickness of a three layer sheet is about 40-110 microns. According to some embodiments, the thickness of a three layer sheet is about 40-100 microns. According to some embodiments, the biodegradable sheets of the invention have a low haze. As herein defined, low haze is defined as 40% transparency and below.

The biodegradable sheet of this invention may be prepared using any appropriate means. According to certain embodiments, the biodegradable polymers utilized in generating the layers and sheets are extruded (using mono or co-extrusion methods), blown, cast or otherwise formed into sheets for use in a wide variety of packaging materials, or they may be molded into shaped articles. According to some embodiments, known mixing, extrusion, blowing, injection molding, and blow molding apparatus known in the thermoplastic art are suitable for use in forming the biodegradable sheets of this invention. In an embodiment of the invention, the sheet may be blown into various shapes including a shape of a bottle. According to one embodiment of the invention, the biodegradable sheet is prepared by compounding the raw biopolymers and possible additives and then preparing a sheet in a cast extruder. Once the biodegradable sheet is prepared, it is post-treated by heat sealing, according to some embodiments, to join two parts of the same sheet or two separate sheets, in order to prepare pockets, pouches etc. According to further embodiments, the biodegradable sheets of this invention are coated with any appropriate coating, while ensuring that the end product remains biodegradable.

According to further embodiments, the one layered biodegradable sheet of the invention comprises about 20% w/w PLA and about 80% w/w PBS. According to further embodiments, the biodegradable sheet of the invention comprises about 20% w/w PLA, about 40% w/w PBS and about 40% w/w novamont CF. According to further embodiments, the biodegradable sheet of the invention comprises about 33% w/w PLA, about 33% w/w PBS and about 33% w/w ecoflex.

According to further embodiments, the one layered biodegradable sheet of the invention consists of about 20% w/w PLA and about 80% w/w PBS. According to further embodiments, the biodegradable sheet of the invention consists of about 20% w/w PLA, about 40% w/w PBS and about 40% w/w novamont CF. According to further embodiments, the biodegradable sheet of the invention consists of about 33% w/w PLA, about 33% w/w PBS and about 33% w/w ecoflex.

According to further embodiments, the multi-layered biodegradable sheet of the invention comprises the following three layers, wherein layer 2 is sandwiched between layers 1 and 3 so that layers 1 and 3 are on the outside of the sheet, in direct contact with the outside atmosphere, while layer 2 is positioned between them e:
Layer 1: comprising about 33.3% w/w PLA, 33.3% w/w PBS and 33.3% w/w Ecoflex;
Layer 2: comprising about 100% w/w PHA; and
Layer 3: comprising about 33.3% w/w PLA, 33.3% w/w PBS and 33.3% w/w Ecoflex.

According to further embodiments, the multi-layered biodegradable sheet of the invention comprises the following three layers:
Layer 1: comprising about 33.3% w/w PLA, 33.3% w/w PBSA and 33.3% w/w PBAT;
Layer 2: comprising about 100% w/w PBAT; and
Layer 3: comprising about 33.3% w/w PLA, 33.3% w/w PBSA and 33.3% w/w PBAT.

According to further embodiments, the multi-layered biodegradable sheet of the invention consists the following three layers:
Layer 1: consisting about 33.3% w/w PLA, 33.3% w/w PBS and 33.3% w/w Ecoflex;
Layer 2: consisting about 100% w/w PHA; and
Layer 3: consisting about 33.3% w/w PLA, 33.3% w/w PBS and 33.3% w/w Ecoflex.

According to further embodiments, the multi-layered biodegradable sheet of the invention consists the following three layers:
Layer 1: consisting about 33.3% w/w PLA, 33.3% w/w PBSA and 33.3% w/w PBAT;
Layer 2: consisting about 100% w/w PBAT; and
Layer 3: consisting about 33.3% w/w PLA, 33.3% w/w PBSA and 33.3% w/w PBAT.

According to further embodiments, the monolayer biodegradable sheet consists of about 75% PBSA and about 25% PLA. According to some embodiments, the multi-layered biodegradable sheet of the invention consists of the following three, five or more layers. According to some embodiments the external layers consist of about 25% w/w PLA and about 75% w/w PBSA. According to some embodiments, PVOH layer is included as a core layer, sandwiched between the biodegradable polymer layers and any existing nanocomposite layers. According to some embodiments, at least one layer consisting of 100% biodegradable polymers, e.g., PBSA is included. According to some embodiments, the biodegradable sheet includes at least one internal layer consisting of PBSA and about 10-15% w/w nanoclays. According to some embodiments, the biodegradable sheet includes at least one internal layer consisting of PBSA and about 5-10% w/w nanoclays. According to some embodiments, the biodegradable sheet includes at least one internal layer consisting of PBSA and about 0-5% w/w nanoclays. According to some embodiments, the biodegradable sheet includes at least one internal layer consisting of PBSA and about 15-20% w/w nanoclays. According to some embodiments, the biodegradable sheet includes at least one internal layer consisting of PBSA and about 20-25% w/w nanoclays. According to further embodiments, the PBSA may be replaced with any appropriate biodegradable polymer blend. According to further embodiments, the multi-layered biodegradable sheet of the invention consists the following three layers:
Layer 1: consisting about 25% w/w PLA and about 75% w/w PBSA;
Layer 2: consisting about 100% w/w PBSA; and
Layer 3: consisting about 25% w/w PLA and about 75% w/w PBSA.

According to further embodiments, the multi-layered biodegradable sheet of the invention consists the following three layers:
Layer 1: consisting about 75% w/w PLA and about 25% w/w PBSA;
Layer 2: consisting about 100% w/w PBSA; and
Layer 3: consisting about 75% w/w PLA and about 25% w/w PBSA.

According to one embodiment, the thickness of all three layers is the same.

According to further embodiments, the multi-layered biodegradable sheet of the invention consists the following five layers:
Layer 1: consisting about 25% w/w PLA and about 75% w/w PBSA;
Layer 2: consisting about 100% w/w PBSA;
Layer 3: consisting about 40% w/w PVOH grafted with 60% PBSA;
Layer 4: consisting about 100% w/w PBSA; and
Layer 5: consisting about 25% w/w PLA and about 75% w/w PBSA.

According to one embodiment, the thickness of layers 1 and 5 is about 30% of the total thickness of the sheet, and the thickness of layers 2 and 4 is about 15% of the total thickness of the sheet and the thickness of layer 3 is about 10% of the total sheet.

According to further embodiments, the multi-layered biodegradable sheet of the invention consists the following five layers:
Layer 1: consisting about 25% w/w PLA and about 75% w/w PBSA;
Layer 2: consisting of about 98-85% PBSA and about 2-15% w/w nanoclays;
Layer 3: consisting of about 40% w/w PVOH grafted with 60% PBSA;
Layer 4: consisting of about 98-85% PBSA and about 2-15% w/w nanoclays;
Layer 5: consisting of about 25% w/w PLA and about 75% w/w PBSA.

According to further embodiments, the multi-layered biodegradable sheet of the invention consists the following five layers:
Layer 1: consisting about 25% w/w PLA and about 75% w/w PBSA;
Layer 2: consisting of about 40% w/w PVOH, or EVOH grafted with 60% PBSA;
Layer 3: consisting of about 98-85% PBSA and about 2-15% w/w nanoclays;
Layer 4: consisting of about 40% w/w PVOH or EVOH grafted with 60% PBSA;
Layer 5: consisting of about 25% w/w PLA and about 75% w/w PBSA.

According to further embodiments, the multi-layered biodegradable sheet of the invention consists the following five layers:
Layer 1: consisting about 25% w/w PLA and about 75% w/w PBSA;
Layer 2: consisting of about 39.75% w/w PVOH or EVOH wherein each of the PVOH or EVOH is grafted with 0.5% Maleic anhydride (MAH) and 59.75% PBS or PBSA;
Layer 3: consisting of about 98-85% PBSA and about 2-15% w/w nanoclays;
Layer 4: consisting of about 39.75% w/w PVOH or EVOH wherein each of the PVOH or EVOH is grafted with 0.5% Maleic anhydride (MAH) and 59.75% PBS;
Layer 5: consisting of about 25% w/w PLA and about 75% w/w PBSA.

According to further embodiments, the multi-layered biodegradable sheet of the invention consists the following five layers:
Layer 1: consisting about 25% w/w PLA and about 75% w/w PBSA;
Layer 2: consisting of about 39.75% w/w PVOH or EVOH wherein each of the PVOH or EVOH is grafted with 0.5% Maleic anhydride (MAH) and 59.75% PBS or PBSA;
Layer 3: consisting of about 98-85% PBSA and about 2-15% w/w nanoclays;
Layer 4: consisting of about 39.75% w/w PVOH or EVOH wherein each of the PVOH or EVOH is grafted with 0.5% Maleic anhydride (MAH) and 59.75% PBS or PBSA;
Layer 5: consisting of about 25% w/w PLA and about 75% w/w PBSA.

According to further embodiments, the multi-layered biodegradable sheet of the invention consists the following five layers:
Layer 1: consisting about 25% w/w PLA, about 55% w/w PBSA and about 20% PBS;
Layer 2: consisting of about 99.5% w/w PVOH or EVOH wherein each of the PVOH or EVOH is grafted with Maleic anhydride (MAH);
Layer 3: consisting of about 98-85% PBSA and about 2-15% w/w nanoclays;
Layer 4: consisting of about 99.5% w/w PVOH or EVOH wherein each of the PVOH or EVOH is grafted with Maleic anhydride (MAH);
Layer 5: consisting about 25% w/w PLA, about 55% w/w PBSA and about 20% PBS;

According to further embodiments, the multi-layered biodegradable sheet of the invention consists the following five layers:
Layer 1: consisting about 25% w/w PLA, about 55% w/w PBSA and about 20% PBS;

Layer 2: consisting of about 99.5% w/w PVOH or EVOH wherein each of the PVOH or EVOH is grafted with Maleic anhydride (MAH);
Layer 3: consisting of about 98-85% PBSA and about 2-15% w/w nanoclays;
Layer 4: consisting of about 99.5% w/w PVOH or EVOH wherein each of the PVOH or EVOH is grafted with Maleic anhydride (MAH);
Layer 5: consisting about 25% w/w PLA, about 55% w/w PBSA and about 20% PBS;

According to further embodiments, the multi-layered biodegradable sheet of the invention consists the following five layers:
Layer 1: consisting about 25% w/w PLA, and about 75% w/w PBSA;
Layer 2: consisting of about 5-45% w/w PBSA, about 50-75% w/w PLA and about 5-20% w/w Starch;
Layer 3: consisting of about 98-85% PBSA or PBS and about 2-15% w/w nanoclays;
Layer 4: consisting of about 5-45% w/w PBSA, about 50-75% w/w PLA and about 5-20% w/w Starch;
Layer 5: consisting about 25% w/w PLA, and about 75% w/w PBSA;

According to further embodiments, the multi-layered biodegradable sheet of the invention consists the following five layers:
Layer 1: consisting about 25% w/w PLA, and about 75% w/w PBSA;
Layer 2: consisting of about 5-45% w/w PBSA, about 50-75% w/w PLA and about 5-20% w/w Starch;
Layer 3: consisting of about 98-85% PBSA and about 2-15% w/w nanoclays;
Layer 4: consisting of about 5-45% w/w PBSA, about 50-75% w/w PLA and about 5-20% w/w Starch;
Layer 5: consisting about 25% w/w PLA, and about 75% w/w PBSA;

According to further embodiments, the multi-layered biodegradable sheet of the invention consists the following five layers:
Layer 1: consisting about 25% w/w PLA, and about 75% w/w PBSA;
Layer 2: consisting of about 5-41% w/w PBSA, about 46-69% w/w PLA, about 5-18% w/w Starch, and oxygen scavengers
Layer 3: consisting of about 98-85% PBSA and about 2-15% w/w nanoclays;
Layer 4: consisting of about 5-41% w/w PBSA, about 46-69% w/w PLA, about 5-18% w/w Starch, and oxygen scavengers
Layer 5: consisting about 25% w/w PLA, and about 75% w/w PBSA; According to further embodiments, the multi-layered biodegradable sheet of the invention comprises the following asymmetrical structure of three layers, wherein layer 2 is sandwiched between layers 1 and 3 so that layer 1 is the direct food or liquid contact layer, and layer 3 is in contact with the outside atmosphere:
Layer 1: consisting of about 5-40% w/w PCL and the remaining 60%-95% portion consisting of about three quarters (75%) w/w PBS or PBSA and one quarter (25%) w/w PLA;
Layer 2: consisting of about 100% w/w PBSA; and
Layer 3: consisting of about 25% w/w PLA and about 75% w/w PBSA.

According to further embodiments, the multi-layered biodegradable sheet of the invention consists of the following asymmetrical structure of four layers:
Layer 1: consisting about 5-40% w/w PCL and the remaining 60%-95% portion consisting of about three quarters (75%) w/w PBS or PBSA and one quarter (25%) w/w PLA;
Layer 2: consisting about 25% w/w PLA and about 75% w/w PBSA.
Layer 3: consisting about 40% w/w PVOH and about 60% PBSA;
Layer 4: consisting about 25% w/w PLA and about 75% w/w PBSA.

According to further embodiments, the multi-layered biodegradable sheet of the invention consists of the following five layers:
Layer 1: consisting about 5-40% w/w PCL and the remaining 60%-95% portion consisting of about three quarters (75%) w/w PBS or PBSA and one quarter (25%) w/w PLA;
Layer 2: consisting of about 99.5% w/w PVOH or EVOH wherein each of the PVOH or EVOH is crosslinked with Maleic anhydride (MAH) and grafted to 0.5% w/w PBSA or PBS;
Layer 3: consisting of about 98-85% PBSA and about 2-15% w/w nanoclays;
Layer 4: consisting of about 99.5% w/w PVOH or EVOH wherein each of the PVOH or EVOH is crosslinked with Maleic anhydride (MAH) and grafted to 0.5% w/w PBSA or PBS; and
Layer 5: consisting 5-40% w/w PCL and the other polymeric part consists about 75% w/w PBS or PBSA and 25% w/w PLA.

According to further embodiments, the multi-layered biodegradable sheet of the invention consists the following five layers:
Layer 1: consisting about 5-40% w/w PCL and the other polymeric part consists about 75% w/w PBS or PBSA and 25% w/w PLA;
Layer 2: consisting of about 99.5-80% w/w PVOH or EVOH wherein each of the PVOH or EVOH is crosslinked with Maleic anhydride (MAH) and grafted to 0.5-20% w/w PBSA or PBS;
Layer 3: consisting of about 98-85% PBSA and about 2-15% w/w nanoclays;
Layer 4: consisting of about 99.5-80% w/w PVOH or EVOH wherein each of the PVOH or EVOH is crosslinked with Maleic anhydride (MAH) and grafted to 0.5-20% w/w PBSA or PBS; and
Layer 5: consisting 5-40% w/w PCL and the other polymeric part consists about 75% w/w PBS or PBSA and 25% w/w PLA.

According to further embodiments, the multi-layered biodegradable sheet of the invention consists the following five layers:
Layer 1: consisting about 5-40% w/w PCL and the other polymeric part consists about 75% w/w PBS or PBSA and 25% w/w PLA;
Layer 2: consisting of about 95-90% w/w PVOH or EVOH wherein each of the PVOH or EVOH is crosslinked with Maleic anhydride (MAH) and grafted to 5-10% w/w PBSA or PBS;
Layer 3: consisting of about 98-85% PBSA and about 2-15% w/w nanoclays;
Layer 4: consisting of about 95-90% w/w PVOH or EVOH wherein each of the PVOH or EVOH is crosslinked with Maleic anhydride (MAH) and grafted to 5-10% w/w PBSA or PBS; and
Layer 5: consisting 5-40% w/w PCL and the other polymeric part consists about 75% w/w PBS or PBSA and 25% w/w PLA.

Although specific examples for mono-layered, three-layered, four-layered and five-layered sheets were given herein, embodiments of the invention are directed to biodegradable sheets including any possible number of layers.

According to another embodiment, the biodegradable compositions of this invention are suitable for injection molding. Injection molding is used according to this invention to prepare any appropriate shape, including a means for removing liquid from a beverage receptacle, such as a spout, a straw, an opening covered by a cap, etc. The physical and mechanical properties of the injection molded biodegradable material according to this invention are as follows:

| | | |
|---|---|---|
| Specific Gravity | 1.0-1.5 | ASTM D792 |
| Melt volume rate (190° C./2.16 kg) [cm$^3$/10 min] | 3.0-8.0 | ASTM D1238 |
| Melt flow rate (190° C./2.16 kg) [g/10 min] | 4.0-9.0 | ASTM D1238 |
| Tensile Strength & Break, (MPa) | 30-50 | ASTM D882 |
| Tensile Modulus, (MPa) | 800-1200 | ASTM D882 |
| Tensile Elongation, % | 200-400 | ASTM D882 |

According to some embodiments of the invention, the biodegradable composition that is molded by injection is prepared from 75% PBSA and 25% PLA. The physical and mechanical properties of this composition are as follows:

| | | |
|---|---|---|
| Specific Gravity | 1.25 | ASTM D792 |
| Melt volume rate (190° C./2.16 kg) [cm$^3$/10 min] | 3.9 | ASTM D1238 |
| Melt flow rate (190° C./2.16 kg) [g/10 min] | 4.2 | ASTM D1238 |
| Tensile Strength @ Break, (MPa) | 32 | ASTM D882 |
| Tensile Modulus, (MPa) | 894 | ASTM D882 |
| Tensile Elongation, % | 339 | ASTM D882 |

The biodegradable sheet of the invention may be used for any application requiring such a sheet. According to one embodiment, the biodegradable sheet of the invention is used in the preparation of a receptacle for liquids, including water, beverages, food and liquid food matter.

According to another embodiment, the biodegradable sheets are made of two laminated layers. The first layer is an inner layer, made of 10-50µ thick PLA that is in contact with the liquid. The second layer is an outer layer, made of 50-150µ thick starch that is exposed to the air. Both layers are attached to each other by an adhesive layer, the weight of which is less that 1% of the total weight of the laminated layers. This combination is unique, due to the fact that the laminated sheet is sufficiently impermeable to hold liquids, while being sufficiently flexible to allow efficient and comfortable production of pouches. According to another embodiment, the biodegradable sheet, which is highly flexible and transparent and is suitable for carrying liquids, is made of Polylactic Acid (PLA) blended with additional biodegradable polyesters, such as: polybutylene succinate (PBS), polybutylene succinate adipate (PBSA), poly(tetramethylene adipate-coterephthalate) (PTAT), thermoplastic starch blends.

According to some embodiments, the biodegradable sheet, which is highly flexible and transparent and is suitable for carrying liquids, comprises poly caprolactone (PCL) and one or more of the polylactic acid (PLA), polybutylene succinate (PBS), polybutylene succinate adipate (PBSA).

The polylactic acids include poly(L-lactic acid), whose structural units are L-lactide acid; poly(D-lactide acid), whose structural units are D-lactic acid; poly(DL-lactic acid) which is a copolymer of L-lactic acid and D-lactic acid; and any mixture thereof.

Different combinations of the above mentioned polymers should be melt compounded using a twin-screw extruder. The polymer blends are extruded in the form of strands to form pellets. The pellets contain a physical mixture (blend) of the different polymers used. The blends are then extruded in a cast or a blow-film extruder in order to obtain films or sheets. In order to increase the barrier of the films and sheets, metalized laminates of the above described polymers can be obtained using an aluminum film or aluminum vapor deposition.

Various aspects of the invention are described in greater detail in the following Examples, which represent embodiments of this invention, and are by no means to be interpreted as limiting the scope of this invention.

EXAMPLES

Example 1: Biodegradable Sheets Comprising PCL

As disclosed hereinbelow, PBS and PBSA purchased from Mitsubishi (Japan) are referred to as PBSm and PBSAm, respectively; PBS and PBSA purchased from Showa Denko (Japan) are referred to as PBSs and PBSAs, respectively. PCL was purchased from Perstorp (Sweden), oly-D,L-lactide and (P(D,L-LA)), (amorphous) were purchased from Natureworks (USA; PVOH was purchased from Nippon (Japan); PBAT was purchased from BASF (Germany); Crosslinkers MDI and Bu-dMA were purchased from Sigma; PCL2000-dMA were synthetized in the lab, ACHN was purchased from Sigma.

1. Biodegradable compounds with PCL, PBS and optionally PLA, without or with an initiator [1,1'-azobis (cyclohexanecarbonitrile) (ACHN) at 1%] and one of the cross-linking agents [proprietary oligo PCL 2000 polymerized with dimethacrylate (dMA) 1% or the commercially available, Butyl-dMA (Bu-dMA) 1%]; were prepared. The crosslinkers were embedded into the concentrate that was added to the compound.

2. PCL-containing compounds were tested for their water absorption properties.

3. A PBS-PLA based compound, were tested with PCL.

The biodegradable films were tested for their sealing, mechanical and permeability properties.

A first set of PCL based polymer compounds was prepared according to the following table:

| PLA (19%) | PBSm (56%) | PBSs (56%) | PBSAm (19%) | PBSAs (56%) | PCL (25%) |
|---|---|---|---|---|---|
|  |  | + |  | + | + |
|  | + |  | + |  | + |
|  |  | + | + |  |  |
| + |  |  |  |  |  |

Bilayer films were prepared according to the following structure:

| Total Thickness (µm) | layer 1 | Thickness (µm) | layer2 | Thickness (µm) |
|---|---|---|---|---|
| 60 | PCL-based | 30 | PLA/PBSA* | 30 |

*Compound A (see sheet I)

A second set of PCL based polymer compounds was prepared according to the following table:

| PLA (L) (19%) | PLA (D,L) (19%) | PBSm (56%) | PBSs (56%) | PBSAm (19%) | PBSAs (19%) | PCL (25%) |
|---|---|---|---|---|---|---|
| − |   | + |   | + |   | + |
| − |   |   | + |   | + | + |
| + |   | + |   |   |   | + |
|   | + |   | + |   |   | + |
| + |   | + |   |   |   | + |
|   | + | + |   |   |   |   |

|  |  | PBSm (56%) | PBSAm (19%) | PCL (25%) | Crosslinker |
|---|---|---|---|---|---|
| 2-MDI | PCL-2 MDI | + | + | + | MDI |
| 2-pCL2k-dMA | PCL-2 PCL2k-dMA | + | + | + | PCL2000-dMA |
| 2-Bu-dMA | PCL-2 Bu-dMA | + | + | + | Bu-dMA |

Bilayer films were prepared according to the following structure:

| Total Thickness (μm) | layer 1 | Thickness (μm) | layer2 | Thickness (μm) |
|---|---|---|---|---|
| 60 | PLA/PBSA* | 30 | PCL-based | 30 |

*Compound A (see sheet I)

1. DSC testing was conducted on the PCL films rather than PCL-containing compounds
2. WVTR assay was measured using a TNO/PIRA water permeability meter or MOCON WVTR.

Sheet Manufacture

Sheet I was used as Layer 1 in the manufacture of the bilayer sheets disclosed below. A three-layered PLA/PBSA biodegradable sheet consisting of 25% w/w PLA, 75% w/w PBSA was prepared as follows:

A. Melt Extrusion Compounding Stage:

1. 100 gr PLA and 300 gr PBSA were dried overnight at a temperature of 50° C. under vacuum;
2. the dried polymers were dry blended and placed in a two screw PRISM compounder;
3. the polymers were melt extruded in the PRISM compounder set to the following profile:
   i) temperature profile: 170-175-180-185-190° C. (the Die is set to 190° C.);
   ii) screw speed: 250 rpm; and
   iii) pressure: 15-25 bar.

B) Cast Co-Extrusion Stage:

1. The melt extruded materials comprised of 400 gr PLA/PBSA compound (compound A) for each of outer layers on extruders A and C and 200 gr PBSA for internal layer on extruder B, were dried overnight at a temperature of 50° C. under vacuum on a Shini SCD-160U-120H dryer;
2. The material was placed into a Collin co-extrusion lines, and set to the following profile:
   Extruder A) 190-200-220° C.-200° C.-Adaptor; 220° C.-feedblock; Die-210° C.; screw speed: 80 rpm
   Extruder B) 190-220-230° C.-200° C.-Adaptor; 230° C.-feedblock; Die-230° C.; screw speed: 45 rpm
   Extruder C) 190-200-220° C.-200° C.-Adaptor; 220° C.-feedblock; Die-210° C.; screw speed: 80 rpm
   Head pressure 50 bar.

In some cases, only PBSm was used as a single layered sheet.

Sheet II.

A two-layered biodegradable sheet was prepared using co-extrusion of compound A (Sheet # I) and PCL based compound, consisting of about 19.0% w/w PLA, 56.0% w/w PBS and 25.0% w/w PCL ("PCL 1") that was prepared as follows.

A. Melt Extrusion Compounding Stage:

1. 190 g PLA, 560 g PBS and 250 g PCL were dried overnight at a temperature of 40° C. in a SHINI SCD-160U-120H desiccant dryer;

PCL based compound possible range includes: PCL 5-50% w/w, PBS 0-70% w/w, PBSA 0-80% and PLA 0-30%, and more specifically, PCL 5-40% w/w, PBS 30-60% w/w, PBSA 20-40% and PLA 20-30%.

2. The dried polymers were dry blended and placed in a two screw Collin compounder;
3. The polymers were melt-extruded in the compounder set to the following profile:
   1. Temperature profile: 160-175-180-185-190° C. (the Die is set to 190° C.);
   2. Screw speed: 200 rpm; and
   3. Pressure: 15-25 bar.

B. Cast Co-Extrusion Stage:

1. The melt extruded compounds (A and PCL-based compound) were dried overnight at a temperature of 40° C. in a desiccant dryer;
2. The compounds, 1 kg of compound A and 1 kg of hydrophobic compound were placed into a Collin co-extruder set to the following profile:
   1. 160-180-185° C.-185° C.-Adaptor; 185° C.-feedblock; Die-185° C.;
   2. Screw speed: 80 rpm; and Head pressure 50 bar.

The two layered Sheet # II consists of the following two layers:

Layer 1 (30 microns): consisting of about 75% w/w PBSA and about 25% w/w PLA; and Layer 2 (30 microns): consisting of about 19% w/w PLA, 56% w/w PBS and about 25% w/w PCL (PCL4 or PCL8). Sheet "PCL 12" comprises Layer 2 with PLA (L PLA) and PBSs; Sheet "PCL 14A" comprises Layer 2 with PLA (L PLA) and PBSm. Sheet "PCL 14B" comprises PBSm as layer 1 and Layer 2 with PLA (L PLA) and PBSm.

Sheet III.

A two layered biodegradable sheet was prepared using co-extrusion of compound A (Sheet # I) and the PCL-based compound, consisting of about 19.0% w/w PBSA, 56.0% w/w PBS and 25.0% w/w PCL that was prepared as follows.

A. Melt Extrusion Compounding Stage:
1. 190 g PBSA, 560 g PBS and 250 g PCL were dried overnight at a temperature of 40° C. in a SHINI SCD-160U-120H desiccant dryer;
2. The dried polymers were dry blended and placed in a two screw Collin compounder;
3. The polymers were melt-extruded in the compounder set to the following profile:
    i. Temperature profile: 160-175-180-185-190° C. (the Die is set to 190° C.);
    ii. Screw speed: 200 rpm; and
    iii. Pressure: 15-25 bar.

B. Cast Co-Extrusion Stage:
1. The melt extruded compounds (A and PCL-based) were dried overnight at a temperature of 40° C. in a desiccant dryer;
2. The compounds, 1 kg of compound A and 1 kg of hydrophobic compound were placed into a Collin co-extruder set to the following profile:
3. 160-180-185° C.-185° C.-Adaptor; 185° C.-feedblock; Die-185° C.;
4. Screw speed: 80 rpm; and Head pressure 50 bar.

The two layered Sheet # III consists of the following two layers:
Layer 1 (30 microns): consisting about 75% w/w PBSA and about 25% w/w PLA; and
Layer 2 (30 microns): consisting about 19% w/w PBSA, 56% w/w PBS and about 25% w/w PCL (PCL1 or PCL2).

Sheet "PCL 10" comprises Layer 2 with PBSs and PBSAs; Sheet "PCL 11" comprises Layer 2 with PBSm and PBSAm;

Sheet IV.

A two layered biodegradable sheet was prepared using co-extrusion of compound A (Sheet # I) and the hydrophobic compound, consisting of about 19.0% w/w amorphous P(D,L-LA), 56.0% w/w PBS and 25.0% w/w PCL that was prepared as follows.

A. Melt Extrusion Compounding Stage:
1. 190 g P(D,L-LA), 560 g PBS and 250 g PCL were dried overnight at a temperature of 40° C. in a SHINI SCD-160U-120H desiccant dryer;
2. The dried polymers were dry blended and placed in a two screw Collin compounder;
3. The polymers were melt-extruded in the compounder set to the following profile:
    i. Temperature profile: 160-175-180-185-190° C. (the Die is set to 190° C.);
    ii. Screw speed: 200 rpm; and
    iii. Pressure: 15-25 bar.

B. Cast Co-Extrusion Stage:
1. The melt extruded compounds (A and PCL-based) were dried overnight at a temperature of 40° C. in a desiccant dryer;
2. The compounds, 1 kg of compound A and 1 kg of PCL-based compound were placed into a Collin co-extruder set to the following profile:
    i. 160-180-185° C.-185° C.-Adaptor; 185° C.-feedblock; Die-185° C.;
    ii. Screw speed: 80 rpm; and Head pressure 50 bar.

The two layered Sheet # IV consists of the following two layers:
Layer 1 (30 microns): consisting about 75% w/w PBSA and about 25% w/w PLA; and
Layer 2 (30 microns): consisting about 19% w/w P(D,L-LA), 56% w/w PBS and about 25% w/w PCL (PCL5 or PCL9).

Sheet "PCL 13" comprises Layer 2 with PLA (D,L PLA) and PBSs; Sheet "PCL 15" comprises Layer 2 with PLA (D,L PLA) and PBSm.

The following procedure describes the method used to manufacture PCL-based compounds with a crosslinking agent. In particular compounds and sheets with polycaprolactone [PCL 25%], polybutylene succinate [PBS; 56%] and 19% of polylactic acid [PLA] or polybutylene succinate adipate [PBSA] with crosslinking agent [1% methylenediphenyl diisocyanate (MDI, Sigma, St. Louis, Mo.), or Butyldiacrylate (Bu-dMA; Sigma, St Louis, Mo.) 1% or TIPA-synthetized oligo PCL 2000 modified with dimethacrylate or diacrylate (PCL-2000-dMA or PCL-2000-dA) at 1%].

The PCL2000-dMA or PCL2000-dA were produced according to well established procedure, briefly described in the following protocol; An oligomer of PCL 2000 di-OH was dried and reacted with methacryloyl chloride or with acryloyl chloride, for 24 hours. The acylation reaction is occurring in a basic environment, using triethylamine (TEA) at room temperature. Post reaction, the oligomer of PCL2000-dMA or PCL2000-dA is recrystallized to purify it and dried using a vacuum oven.

Next, a concentrate of 75% crosslinker, with 25% high molecular weight PCL was made by dissolution both polymer and crosslinker in toluene, which is later evaporated. Another technique is by compounding it to make the concentrate. A similar concentrate was made for 1,4-Butanediol dimethacrylate (Bu-MA). 4,4'-methylene diphenyl diisocyanate (MDI) was used without further treatment.

Sheet V, VI, VII.

A two layered biodegradable sheet was prepared using co-extrusion of compound A (Sheet # I) and the hydrophobic compound, consisting of about 19.0% w/w PBSA, 56.0% w/w PBS and 24.0% w/w PCL and 1.0% crosslinker that was prepared as described.

A. Melt Extrusion Compounding Stage:
1. The polymers were dried overnight at a temperature of 40° C. in a SHINI SCD-160U-120H desiccant dryer;
2. 190 g PBSA, 560 g PBS and 250 g PCL were dry blended and placed in a two screw compounder;
3. The polymers were melt-extruded in the compounder set to the following profile:
    i. Temperature profile: 160-175-180-185-190° C. (the Die is set to 190° C.);
    ii. Screw speed: 200 rpm; and
    iii. Pressure: 15-25 bar.

B. Cast Co-Extrusion Stage:
1. The melt extruded compounds (A and PCL-based) were dried overnight at a temperature of 40° C. in a desiccant dryer;
2. The compounds, 1 kg of compound A and 1 kg of PCL-based compound with 1% MDI as a chain extender/crosslinker were placed into a Collin co-extruder set to the following profile:
    i. 160-190-200° C.-200° C.-Adaptor; 200° C.-feedblock; Die-195° C.;
    ii. Screw speed: 80 rpm; and Head pressure 50 bar.

The two layered Sheet # V-VII consists of the following two layers:
Layer 1 (30 microns): consisting about 75% w/w PBSA and about 25% w/w PLA; and Layer 2 (30 microns): consisting about 19% w/w PBSA, 56% w/w PBS, 24% w/w PCL and 1% MDI (PCL16).

Similarly, layer 2 consisting about 19% w/w PBSA, 56% w/w PBS, 24% w/w PCL and 1% PCL2000-dA (75% in PCL concentrate) (PCL17).

Similarly, layer 2 consisting about 19% w/w PBSA, 56% w/w PBS, 24% w/w PCL and 1% Bu-dMA (75% in PCL concentrate) (PCL18).

Sheets comprising PHA as a first polymer are prepared as follows:

PHA1:

A three layered biodegradable sheet was prepared using co-extrusion of a hydrophobic compound, consisting of about 75.0% w/w PBSA and 25.0% w/w PHA that was prepared as follows.

A. Melt Extrusion Compounding Stage:
 1. 750 g PBSA and 250 g PHA were dried overnight at a temperature of 40° C. in a SHINI SCD-160U-120H desiccant dryer;
 2. The dried polymers were dry blended and placed in a two screw compounder;
 3. The polymers were melt-extruded in the compounder set to the following profile:
  i. Temperature profile: 160-175-180-185-190° C. (the Die is set to 190° C.);
  ii. Screw speed: 200 rpm; and
  iii. Pressure: 15-25 bar.
B. Cast Co-Extrusion Stage:
 1. The melt extruded of PHA-based were dried overnight at a temperature of 40° C. in a desiccant dryer;
 2. The compound, 1.0 kg of PHA-based compound and 0.5 PBAT were placed into a Collin co-extruder set to the following profile:
  i. 160-180-185° C.-185° C.-Adaptor; 185° C.-feedblock; Die-185° C.;
  ii. Screw speed: 80 rpm; and Head pressure 50 bar.

The three layered Sheet # VIII consists of the following three layers:

Layer 1 and 3 (20 microns each): consisting about 75.0% w/w PBSA and 25.0% w/w PHA; and Layer 2 (20 microns): PBAT.

PHA2.

A three layered biodegradable sheet was prepared using co-extrusion of a hydrophobic compound, consisting of about 75.0% w/w PHA and 25.0% w/w PCL that was prepared as follows.

A. Melt extrusion compounding stage:
 1. 750 g PHA and 250 g PCL were dried overnight at a temperature of 40° C. in a SHINI SCD-160U-120H desiccant dryer;
 2. The dried polymers were dry blended and placed in a two screw compounder;
 3. The polymers were melt-extruded in the compounder set to the following profile:
  i. Temperature profile: 160-175-180-185-190° C. (the Die is set to 190° C.);
  ii. Screw speed: 200 rpm; and
  iii. Pressure: 15-25 bar.
B. Cast Co-Extrusion Stage:
 1. The melt extruded of PHA-PCL-based were dried overnight at a temperature of 40° C. in a desiccant dryer;
 2. The compound, PHA-PCL-based compound and PBAT were placed into a Collin co-extruder set to the following profile:
  i. 160-180-185° C.-185° C.-Adaptor; 185° C.-feedblock; Die-185° C.;
  ii. Screw speed: 80 rpm; and Head pressure 50 bar.

The three layered Sheet #9 consists of the following three layers:

Layer 1 and 3 (20 microns each): consisting about 75.0% w/w PHA and 25.0% w/w PCL; and Layer 2 (20 microns): PBAT.

PHA3.

A three layered biodegradable sheet was prepared using co-extrusion of a hydrophobic compound, consisting of about PHA and PBAT that was prepared as follows. Cast co-extrusion stage:
 1. The melt extruded of PHA were dried overnight at a temperature of 40° C. in a desiccant dryer;
 2. The PHA and PBAT were placed into a Collin co-extruder set to the following profile:
  i. 160-180-185° C.-185° C.-Adaptor; 185° C.-feedblock; Die-185° C.;
  ii. Screw speed: 80 rpm; and Head pressure 50 bar.

The three layered Sheet #10 consists of the following three layers:

Layer 1 and 3 (20 microns each): PHA; and Layer 2 (20 microns): PBAT.

3. Outcome Measures:

A. DSC was performed using DSC 4000 form Perkin Elmer, according to ASTM D3418 Transition Temperatures and Enthalpies of Fusion and Crystallization of Polymers by Differential Scanning calorimetry.

B. The crystallinity of the polymer was measured using X-ray diffractometer D8 Advance of Bruker AXS C. WVTR was performed using MOCON WVTR according to ASTM F1249 Standard Test Method for Water Vapor Transmission Rate Through Plastic Film and Sheeting Using a Modulated Infrared Sensor D. Sealing strength was assayed using heat seal tester HST-H3 from Lab-think, according to ASTM F2029 Standard Practices for Making Heatseals for Determination of Heatsealability of Flexible Webs as Measured by Seal Strength, and using tensile tester LR10K plus, from LLYOD instruments E. Mechanical parameters were evaluated using tensile tester LR10K plus, from LLYOD instruments, according to ASTM D882 Tensile Properties of thin Plastic Sheeting.

Results

1. Differential Scanning Calorimetry (DSC) on Polymeric Compounds

The Differential scanning calorimetry (DSC) analysis was used as a tool for both estimation of the glass transition temperature (Tg) shift, and for each polymer in its specific melting temperature (Tm) the estimation of its crystallinity percentage (% Xc). The data is displayed in Table 1a and 1b.

TABLE 1a

DSC analysis summary, the Tg, Tm and % Xc for commercial polymers

| % polymer | Material | Tg [C] | Tm [C] | Hm [J/g] for 100% cryst | Hm measured [J/g] | % Xc |
|---|---|---|---|---|---|---|
| 100% | PBSAs | −32.0 | 93.6 | 120.0 | 42.8 | 36% |
| 100% | PBSAm | −45.0 | 89.8 | 120.0 | 36.0 | 30% |
| 100% | P(L-LA) | 63.9 | 156.6 | 93.6 | 28.4 | 30% |
| 100% | P(D,L-LA) | 63.9 | | | | |
| 100% | PCL | −60.0 | 61.2 | 139.5 | 41.8 | 30% |
| 100% | PBSs | −32.0 | 117.9 | 110.3 | 69.6 | 63% |
| 100% | PBSm | | | | | |

TABLE 1b

DSC analysis summary, the Tg, Tm and % Xc for compounds disclosed herein

| | % polymer | Material | Tg [C] | Tm [C] | Hm [J/g] for 100% cryst | Hm measured [J/g] | % Xc |
|---|---|---|---|---|---|---|---|
| PCL 10: | 25% | PCL | | 62.2 | 139.5 | 18.1 | 13% |
| PBSs/PBSAs/ | 19% | PBSAs | | | 120.0 | | 0% |
| PCL | 56% | PBSs | −37.2 | 114.5 | 110.3 | 49.2 | 45% |
| PCL 11: | 25% | PCL | | 62.0 | 139.5 | 15.8 | 11% |
| PBSm/PBSAm/ | 19% | PBSAm | −43.5 | | 120.0 | | 0% |
| PCL | 56% | PBSm | | 116.9 | 110.3 | 47.9 | 43% |
| PCL 12: | 25% | PCL | | 64.4 | 139.5 | 17.8 | 13% |
| P(L-LA)/PBSs/ | 56% | PBSs | −33.8 | 115.0 | 110.3 | 34.5 | 31% |
| PCL | 19% | PLA | | 152.8 | 93.6 | 4.5 | 5% |
| PCL 13: | 25% | PCL | | 62.2 | 139.5 | 17.2 | 12% |
| P(D,L-LA)/PBSs/ | 56% | PBSs | −33.8 | 114.6 | 110.3 | 37.9 | 34% |
| PCL | 19% | PLA | | | 93.6 | — | |
| PCL 14: | 25% | PCL | | 65.7 | 139.5 | 22.6 | 16% |
| P(L-LA)/PBSm/ | 56% | PBSm | −30.9 | 119.5 | 110.3 | 44.7 | 41% |
| PCL | 19% | PLA | | 154.0 | 93.6 | 4.0 | 4% |
| PCL 15: | 25% | PCL | | 64.4 | 139.5 | 16.2 | 12% |
| P(D,L-LA)/PBSm/ | 56% | PBSm | −33.3 | 118.9 | 110.3 | 34.4 | 31% |
| PCL | 19% | PLA | | | 93.6 | — | |
| PCL 16: | 25% | PCL | | 62.8 | 139.5 | 18.7 | 13% |
| PBSm/PBSAm/ | 19% | PBSAm | | | 120.0 | | 0% |
| PCL + MDI | 56% | PBSm | −37.3 | 114.8 | 110.3 | 44.6 | 40% |
| PCL 17: | 25% | PCL | | 57.1 | 139.5 | 11.5 | 8% |
| PBSm/PBSAm/ | 19% | PBSAm | | | 120.0 | | 0% |
| PCL + PCL2k-dMA | 56% | PBSm | −42.3 | 115.5 | 110.3 | 28.1 | 26% |
| PCL 18: | 25% | PCL | | 62.3 | 139.5 | 19.4 | 14% |
| PBSm/PBSAm/ | 19% | PBSAm | | | 120.0 | | 0% |
| PCL + Bu-dMA | 56% | PBSm | −37.9 | 117.4 | 110.3 | 52.8 | 48% |

The Tg shift is being used to identify the matrix homogeneity, meaning, as far as it gets from base Tg's towards its weighted arithmetic mean, the more homogenous the polymer compound is.

The thermal bridge is defined as bridging between the high difference of the melting points of PLA (+160 C) and PCL (+60 C).

Figure 6:
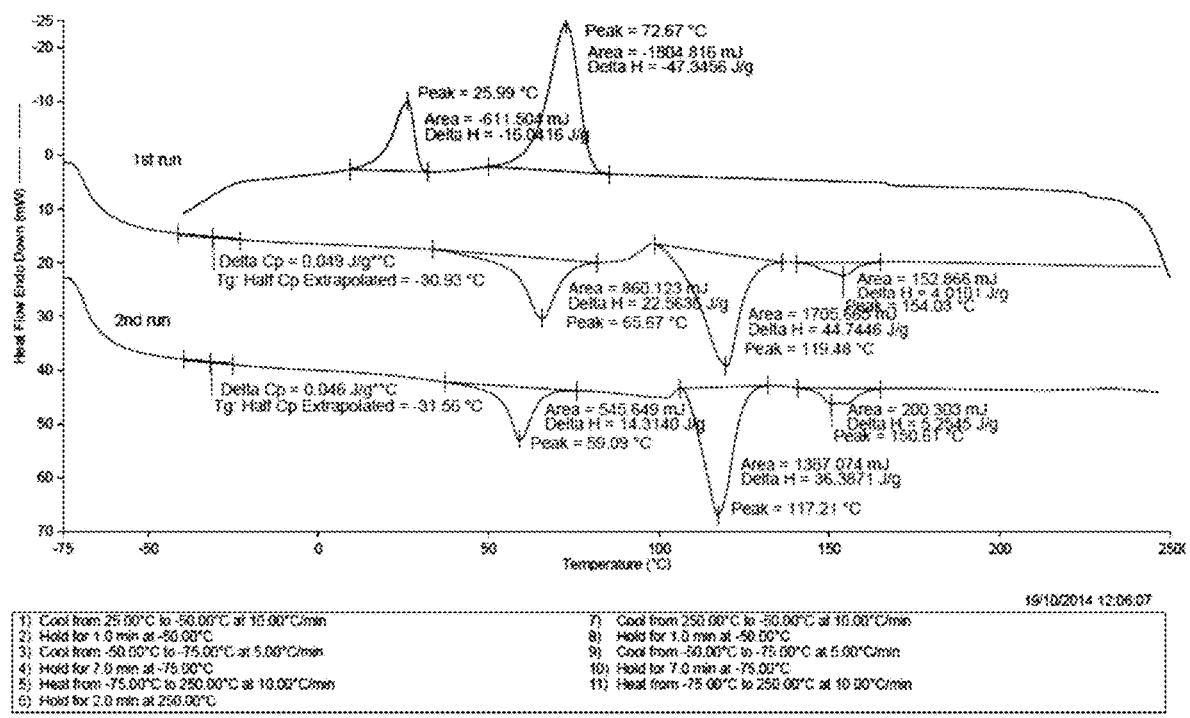
FIG. 6 presents a differential scanning calorimetry (DSC) thermogram for a polymer compound containing PCL, PBS and PLA.

FIG. 6 presents a differential scanning calorimetry (DSC) thermogram for a polymer compound containing PCL, PBS and PLA. Each polymer is characterized with its unique melting point (Tm) were PCL has a Tm=+65° C., PBS Tm=+119° C. and PLA Tm=+154° C. The glass transition temperature (Tg) for the pure polymer is for PCL Tg=−60° C., PBS Tg=−30° C. and PLA Tg=+60° C. (data not shown). As a homogenous polymer compound is produced, the Tg shift for the compound to −31° C.

When these polymers are processed by extrusion, once the melt exiting the die it is fast cooled (quenched) the polymer tends for phase-separate. The phase separation can cause mechanical failure, and unacceptable permeability parameters, due to the differences in the polymers film in different regions.

The thermal bridge is performing as thermal inter-phase, and enabling mutual melting of these polymers. Therefore the final polymer composition is more homogeneous, with lower to non-phase separation.

2. XRD Crystallinity

The crystallinity of the polymer compounds was measured using X-ray diffractometer D8 Advance of Bruker AXS, and the calculation of the relative degree of the crystallinity was according to the equation of the degree of crystallinity as previously described (Shujun W., Jinglin Y., and Wenyuan G., Use of X-ray Diffractometry (XRD) for Identification of Fritillaria according to Geographical Origin, American Journal of Biochemistry and Biotechnology, 2005; 1(4): 207-211) is as follows:

$$Xc = Ac/(Ac+Aa)$$

Where:

$Xc$=refers to the degree of crystallinity $Ac$=refers to the crystallized area on the X-ray diffractogram $Aa$=refers to the amorphous area on the X-ray diffractogram Table 2: the XRD measured % crystallinity of the individual components and compounds

TABLE 2

| Sample Name | Measured % Crystallinity |
|---|---|
| PCL | 36.8 |
| PBSs | 33.5 |
| PBSm | 28.6 |
| PBSAm | 18.0 |
| PCL-11 | 28.5 |
| PCL-12 | 22.1 |
| PCL-13 | 24.9 |
| PCL-14 | 26.3 |
| PCL-15 | 21.1 |
| PCL-16 | 25.6 |

From the XRD data, we can say that the "a" grades of PBS and PBSA are better than the "b" grades for mixing of the polymer compound, and allowing enhanced crystallinity.

3. WVTR Results of the Sheets Disclosed Herein are Shown in Table 3.

TABLE 3

| | Measured Thickness (microns (u)) | WVTR [g/(m$^2$*d)] |
|---|---|---|
| PCL-10 | 59.9 | 280 |
| PCL-12 | 59.8 | 159 |
| PCL-13 | 56.0 | 130 |
| PCL-14 A | 56.5 | 120 |
| PCL-15 | 57.2 | 120 |
| PCL-16 | 57.9 | 308 |

From the WVTR results, the different PBS and PBSA contribute to differing barrier properties.

The better barrier is achieved when PLA is included in the matrix.

The MDI as a chain extender reduces the barrier to water.

4. Heat Sealing Properties:

Table 4 shows the window (range) of sealing temperatures for the generated sheets.

TABLE 4

| TIPA barriers description (60 μm)/Sealing Temperature (° C.) | 75 | 80 | 85 | 90 | 95 | 100 | 105 | 110 | Heat sealing window | Temperature Range |
|---|---|---|---|---|---|---|---|---|---|---|
| PLA/PBSA Sheet ("sheet I") | 16.9 | 26.5 | 27.7 | | | | | | 75-85 | 10 |
| PCL 10—sheet I/PBSs-PBSAs-PCL | 1.6 | 2.3 | 5.3 | 11.5 | 14.9 | 19.6 | | | 90-100 | 10 |
| PCL 11—sheet IPBSm-PBSAm-PCL | 2.6 | 4.4 | 12.2 | 13.1 | 23.0 | 24.4 | 25.0 | | 85-105 | 20 |
| PCL 12—sheet I/PLA (L)-PBSs-PCL | 1.1 | 2.8 | 5.6 | 8.9 | 18.3 | 25.7 | | | 95-100 | 5 |
| PCL 13—sheet I/PLA(D,L)-PBSs-PCL | 14.5 | 17.7 | 22.7 | 22.8 | 24.7 | 24.3 | 25.4 | | 75-105 | 30 |
| PCL 14A—sheet I/PLA(L)-PBSm-PCL | 3.4 | 4.5 | 11.2 | 19.3 | 20.0 | 23.3 | 27.5 | 29.1 | 90-110 | 20 |
| PCL 14B—PBSm/PLA(L)-PBSm-PCL | 1.4 | 2.5 | 4.1 | 8.1 | 13.5 | 24.8 | 27.8 | | 95-105 | 10 |
| PCL 15—sheet I/PLA(D,L)-PBSm-PCL | 13.2 | 18.1 | 21.8 | 21.9 | 24.8 | 25.8 | 27.8 | | 75-105 | 30 |
| PCL 16—sheet I/ PBSm-PBSAm-PCL w/MDI | 5.0 | 1.7 | 2.4 | 7.4 | 15.6 | 19.9 | 29.9 | | 95-105 | 10 |
| PCL 17—sheet I/PBSm-PBSAm-PCL w/PCL2k-dMA | | 1.0 | | | 10.2 | 17.7 | 25.4 | | 95-105 | 10 |
| PCL 18—sheet I/PBSm-PBSAm-PCL w/Bu-dMA | 0.8 | 1.6 | 8.6 | 8.9 | 20.8 | | | | 95 | 0 |

5. Mechanical Properties

Table 5a presents mechanical properties in film machine direction

TABLE 5a

| Sample name | Machine Direction | Statistics | Stress at Upper Yield (MPa) | Percentage Strain at Upper Yield | Young's Modulus (MPa) | Stress at Break (MPa) | Percentage Strain at Break |
|---|---|---|---|---|---|---|---|
| PCL 10 | MD | Average | 21 | 10 | 817 | 19 | 35 |
| | | STDEV | 1 | 2 | 141 | 2 | 16 |
| | | Cv | 6% | 21% | 17% | 10% | 47% |
| | | Median | 21 | 10 | 798 | 19 | 29 |
| PCL 11 | MD | Average | 21 | 9 | 860 | 22 | 241 |
| | | STDEV | 1 | 1 | 219 | 5 | 85 |
| | | Cv | 5% | 11% | 25% | 24% | 35% |
| | | Median | 22 | 9 | 826 | 20 | 260 |

TABLE 5a-continued

| Sample name | Machine Direction | Statistics | Stress at Upper Yield (MPa) | Percentage Strain at Upper Yield | Young's Modulus (MPa) | Stress at Break (MPa) | Percentage Strain at Break |
|---|---|---|---|---|---|---|---|
| PCL 12 | MD | Average | 26 | 4 | 1,143 | 21 | 17 |
| | | STDEV | 1 | 1 | 214 | 2 | 4 |
| | | Cv | 6% | 17% | 19% | 8% | 23% |
| | | Median | 25 | 4 | 1,088 | 20 | 17 |
| PCL 13 | MD | Average | 27 | 4 | 1,159 | 21 | 14 |
| | | STDEV | 1 | 1 | 138 | 1 | 4 |
| | | Cv | 3% | 15% | 12% | 4% | 28% |
| | | Median | 26 | 4 | 1,123 | 21 | 14 |
| PCL 14A | MD | Average | 28 | 4 | 1,271 | 23 | 13 |
| | | STDEV | 2 | 0 | 171 | 2 | 3 |
| | | Cv | 7% | 6% | 13% | 9% | 26% |
| | | Median | 27 | 3 | 1,264 | 22 | 13 |
| PCL 15 | MD | Average | 27 | 4 | 1,200 | 22 | 13 |
| | | STDEV | 1 | 0 | 143 | 1 | 3 |
| | | Cv | 4% | 13% | 12% | 3% | 21% |
| | | Median | 27 | 4 | 1,179 | 22 | 13 |
| PCL 16 | MD | Average | 22 | 13 | 780 | 21 | 128 |
| | | STDEV | 1 | 3 | 149 | 3 | 53 |
| | | Cv | 4% | 22% | 19% | 16% | 41% |
| | | Median | 22 | 13 | 759 | 21 | 127 |
| PCL 17 | MD | Average | 21 | 11 | 815 | 18 | 22 |
| | | STDEV | 1 | 2 | 147 | 2 | 5 |
| | | Cv | 6% | 19% | 18% | 9% | 22% |
| | | Median | 21 | 10 | 813 | 18 | 20 |
| PCL 18 | MD | Average | 22 | 9 | 937 | 19 | 32 |
| | | STDEV | 1 | 1 | 151 | 1 | 11 |
| | | Cv | 4% | 15% | 16% | 4% | 36% |
| | | Median | 22 | 9 | 914 | 19 | 28 |

Table 5b presents mechanical properties Mechanical properties in trans machine direction (TD).

TABLE 5b

| Sample name | Machine Direction | Statistics | Stress at Upper Yield (MPa) | Percentage Strain at Upper Yield | Young's Modulus (MPa) | Stress at Break (MPa) | Percentage Strain at Break |
|---|---|---|---|---|---|---|---|
| PCL 10 | TD | Average | 16 | 5 | 589 | 17 | 6 |
| | | STDEV | | | 59 | 1 | 0 |
| | | Cv | | | 10% | 9% | 6% |
| | | Median | 16 | 5 | 582 | 17 | 6 |
| PCL 11 | TD | Average | 16 | 5 | 673 | 16 | 6 |
| | | STDEV | | | 146 | 2 | 1 |
| | | Cv | | | 22% | 10% | 21% |
| | | Median | 16 | 5 | 635 | 17 | 6 |
| PCL 12 | TD | Average | | | 888 | 19 | 4 |
| | | STDEV | | | 184 | 1 | 0 |
| | | Cv | | | 21% | 7% | 8% |
| | | Median | | | 874 | 20 | 4 |
| PCL 13 | TD | Average | | | 890 | 20 | 4 |
| | | STDEV | | | 138 | 2 | 0 |
| | | Cv | | | 16% | 9% | 9% |
| | | Median | | | 864 | 21 | 4 |
| PCL 14A | TD | Average | | | 1,043 | 18 | 5 |
| | | STDEV | | | 416 | 5 | 1 |
| | | Cv | | | 40% | 29% | 14% |
| | | Median | | | 931 | 19 | 4 |
| PCL 15 | TD | Average | | | 996 | 20 | 5 |
| | | STDEV | | | 172 | 2 | 1 |
| | | Cv | | | 17% | 9% | 15% |
| | | Median | | | 966 | 21 | 4 |
| PCL 16 | TD | Average | | | 753 | 18 | 6 |
| | | STDEV | | | 177 | 2 | 0 |
| | | Cv | | | 23% | 11% | 7% |
| | | Median | | | 741 | 19 | 6 |
| PCL 17 | TD | Average | | | 741 | 19 | 6 |
| | | STDEV | | | 119 | 2 | 1 |
| | | Cv | | | 16% | 8% | 11% |
| | | Median | | | 764 | 19 | 6 |

TABLE 5b-continued

| Sample name | Machine Direction | Statistics | Stress at Upper Yield (MPa) | Percentage Strain at Upper Yield | Young's Modulus (MPa) | Stress at Break (MPa) | Percentage Strain at Break |
|---|---|---|---|---|---|---|---|
| PCL 18 | TD | Average | 18 | 5 | 721 | 16 | 5 |
|  |  | STDEV |  |  | 117 | 3 | 0 |
|  |  | Cv |  |  | 16% | 17% | 7% |
|  |  | Median | 18 | 5 | 699 | 17 | 5 |

From the mechanical properties of the films, it is noted that high elasticity modulus is achieved for all compositions, with and without PLA. The added crosslinkers contribute mostly to higher strain at break.

CONCLUSIONS

From the DSC analysis, the thermal bridge performs as thermal interphase, and enables mutual melting of these polymers. Therefore, the final polymer composition is more homogeneous, with lower to non-phase separation.

From the XRD data, the PBS and PBSA "a" grades are better for mixing of the polymer compound, and allowing enhanced polymer crystallinity.

From the WVTR results, the PBS and PBSA "a" grades contribute to better barrier properties.

The better barrier is achieved when PLA is included in the matrix.

The MDI as a chain extender reduces the barrier to water.

From the heat sealing properties, the highest sealing temperature window is achieved for the compounds contains PLA and mostly for the amorphous P(D,L-LA). The cross linkers limits the sealing window to too narrow window.

From the mechanical properties of the films, high elasticity modulus is achieved for all compositions, with and without PLA. The added crosslinkers contribute mostly to higher strain at break.

Example 2: Single Layered Biodegradable Sheets

All of the single layered sheets related to herein were 15-120 microns thick.

Sheet #1: A single layered biodegradable sheet consisting of 33.3% w/w PLA, 33.3% w/w PBS and 33.3% w/w Ecoflex was prepared as follows:
A. Melt Extrusion Compounding Stage:
1. 166.7 gr PLA, 166.7 gr PBS and 166.7 gr Ecoflex were dried overnight at a temperature of 50° C. under vacuum;
2. the dried polymers were dry blended and placed in a two screw PRISM compounder;
3. the polymers were melt extruded in the PRISM compounder set to the following profile:
i) temperature profile: 170-175-180-185-190° C. (the Die is set to 190° C.);
ii) screw speed: 250 rpm; and
iii) pressure: 15-25 bar.
B. Cast Extrusion Stage:
1. the melt extruded material was dried overnight at a temperature of 50° C. under vacuum;
2. the material was placed into a Randcastle Extruder set to the following profile:
i) 170-180-190° C.-180° C.-Adaptor; 185° C.-feedblock; Die-185° C.;
ii) screw speed: 80 rpm; and
iii) head pressure 590 bar.

The measured physical properties of Sheet #1 were as follows: Stress at Maximum Load was 25 Mpa, the Strain at Break was 415% and Young's Modulus was 679 Mpa.

Sheet #2: A single layered biodegradable sheet consisting of 20% w/w PLA and 80% w/w PBS was prepared using the same procedure described above for Sheet #1, wherein the amounts of the polymers used were 100 gr PLA and 400 gr PBS. The measured physical properties of Sheet #2 were as follows: Stress at Maximum Load was 47 Mpa, the Strain at Break was 731% and Young's Modulus was 569 Mpa.

Sheet #3: A single layered biodegradable sheet consisting of 20% w/w PLA, 40% w/w PBS and 40% Novamont CF was prepared using the same procedure described above for Sheet #1, wherein the amounts of the polymers used were 100 gr PLA, 200 gr PBS and 200 gr Novamont. The measured physical properties of Sheet #3 were as follows: Stress at Maximum Load was 33 Mpa, the Strain at Break was 579% and Young's Modulus was 603 Mpa.

Sheet #4: A single layered biodegradable sheet consisting of 60% w/w PLA and 40% w/w PBS was prepared using the same procedure described above for Sheet #1, wherein the amounts of the polymers used were 300 gr PLA and 200 gr PBS. The measured physical properties of Sheet #4 were as follows: Stress at Maximum Load was 40 Mpa, the Strain at Break was 240% and Young's Modulus was 1274 Mpa.

Sheet #5: A single layered biodegradable sheet consisting of 55% w/w PLA and 45% w/w PBS was prepared using the same procedure described above for Sheet #1, wherein the amounts of the polymers used were 275 gr PLA and 225 gr PBS. The measured physical properties of Sheet #5 were as follows: Stress at Maximum Load was 45 Mpa, the Strain at Break was 4% and Young's Modulus was 1414 Mpa.

As evident from their physical properties, as detailed above, Sheets #1-3 are advantageous one layered biodegradable sheets according to this invention. Further, as detailed above, although the composition of Sheets #4 and #5 is very similar, they highly differ in their physical properties, particularly in their strain at break. Therefore, it is obviously necessary to perform many experiments in order reach the desired physical properties.

Example 3: Three-Layered Biodegradable Sheets

All of the three layered sheets related to herein were 100 microns thick.

Sheet #6: A three layered biodegradable sheet was prepared according to the procedure described above for Sheet #1, wherein the weight of each layer constitutes a third of the weight of the final sheet. The three layered Sheet #6 consists of the following three layers:

Layer 1: 33.3% w/w PLA, 33.3% w/w PBS and 33.3% w/w Ecoflex
Layer 2: 100% w/w PHA
Layer 3: 33.3% w/w PLA, 33.3% w/w PBS and 33.3% w/w Ecoflex
The measured physical properties of Sheet #6 were as follows: Stress at Maximum Load was 20 Mpa, the Strain at Break was 558% and Young's Modulus was 675 Mpa.

Sheet #7: A three layered biodegradable sheet was prepared according to the procedure described above for Sheet #1, wherein the weight of each layer constitutes a third of the weight of the final sheet. The three layered Sheet #7 consists of the following three layers:
Layer 1: 33.3% w/w PLA, 33.3% w/w PBSA and 33.3% w/w PBAT
Layer 2: 100% w/w PBAT
Layer 3: 33.3% w/w PLA, 33.3% w/w PBSA and 33.3% w/w PBAT
The measured physical properties of Sheet #7 were as follows: Stress at Maximum Load was 30 Mpa, the Strain at Break was 618% and Young's Modulus was 391 Mpa.

Sheet #8: A three layered biodegradable sheet was prepared according to the procedure described above for Sheet #1, wherein the weight of each layer constitutes a third of the weight of the final sheet. The three layered Sheet #8 consists of the following three layers:
Layer 1: 100% w/w PBS
Layer 2: 60% w/w PLA and 40% w/w PBS
Layer 3: 100% w/w PBS
The measured physical properties of Sheet #8 were as follows: Stress at Maximum Load was 44 Mpa, the Strain at Break was 4.1% and Young's Modulus was 1374 Mpa.

Sheet #9: A three layered biodegradable sheet was prepared according to the procedure described above for Sheet #1, wherein the weight of each layer constitutes a third of the weight of the final sheet. The three layered Sheet #9 consists of the following three layers:
Layer 1: 100% w/w Ecoflex
Layer 2: 50% w/w PLA and 50% w/w PBAT
Layer 3: 100% w/w Ecoflex
The measured physical properties of Sheet #9 were as follows: Stress at Maximum Load was 38 Mpa, the Strain at Break was 559% and Young's Modulus was 837 Mpa.

As evident from their physical properties, as detailed above, Sheets #6-7 are advantageous three layered biodegradable sheets according to this invention.

In all of the above sheets, layer 2 is sandwiched between layers 1 and 3 so that layers 1 and 3 are on the outside of the three layered biodegradable sheet and have contact with the outside atmosphere and layer 2 is positions between them so that it does not contact the outside atmosphere.

Example 4: Manufacture of Multilayer Sheets for Reference

Sheets #1-#9 were manufactured for comparative assays.
Melt Extrusion Reactive Compounding Stage:
37.5 kg of PBS and 25 kg of PVOH were dried on a Shini SCD-160U-120H dryer, for 8 hours prior to use. The dried polymers were dry blended and mixed with 100.0 gram of maleic anhydride (MAH), and 50.2 grams of Azobisisobutyronitrile (AIBN). The mixture was placed in a two screw PILOT compounder at a temperature of 150-190° C., screw speed of 300-450 RPM, and a pressure of 20-45 bar. Thus produced is a compound of PVOH grafted with MAH, and slightly crosslinked with PBS that is also grafted with the MAH. This compound is related to herein as PVOH-g-PBS.

The PVOH-g-PBS compound is pelletized and dried before any following process. The PVOH-g-PBS was used as central layer in three layer sheets or as layers two and four in five layered sheets, using cast co-extrusion extruder, as detailed below.
Cast Co-Extrusion Stage:
1. The melt extruded materials were dried overnight at a temperature of 50° C. on a Shini SCD-160U-120H dryer;
2. The material were placed into a Collin co-extrusion lines, and set to the following profile:
Extruder A) 190-200-220° C.-200° C.-Adaptor; 220° C.-feedblock; Die-210° C.; screw speed: 80 rpm
Extruder B) 190-220-230° C.-200° C.-Adaptor; 230° C.-feedblock; Die-230° C.; screw speed: 45 rpm
Extruder C) 190-200-220° C.-200° C.-Adaptor; 220° C.-feedblock; Die-210° C.; screw speed: 80 rpm
Head pressure 50 bar.
The polymer melt is coextruded into a multi-layer manifolds and a film die, and collected using a roll mill. The following multi layered sheets were produced using the equipment as detailed below:

Sheet #1:
A three layered biodegradable film with hygroscopic oxygen and a water barrier compound:
Layers 1 and 3 of sheet #1 are prepared from a compound of PBSA/PLA having 75/25% w/w of the two polymers, respectively, which was produced using a polymer compounder by dry mixing the different polymers and blending the polymers in a molten state to form a compound.
The middle layer (layer 2) of Sheet #1 is prepared from the PVOH-g-PBS compound, produced as detailed above. The final three layered polymer sheet was produced according to the cast co-extrusion stage, as detailed above.
The measured physical properties of Sheet #1 were as follows: Tensile strength at break was 26 Mpa, the Strain at Break was 136% and Young's Modulus was 770 Mpa.

Sheet #2:
A three layered biodegradable film with hygroscopic oxygen and a water barrier compound:
Layers 1 and 3 of Sheet #2 were prepared from a compound of PBSA/PLA having 75/25% w/w of the two polymers, respectively, which were produced similarly to layers 1 and 3 of Sheet #1, as detailed above. Sheet #2 further comprises a middle layer (layer 2) prepared from a compound of PVOH that was not further treated. The final polymer sheet was produced according to the cast co-extrusion stage, as detailed above.
The measured physical properties of Sheet #2 were as follows: Tensile strength at break was 28 Mpa, the Strain at Break was 139% and Young's Modulus was 1263 Mpa.

Sheet #3:
A three layered film, comprising layers 1 and 3 of compound of PBSA/PLA with 75/25% w/w, produced similarly to the procedure detailed for Sheet #1, and a middle layer (layer 2) prepared from a compound of PBS. The final polymer sheet was produced according to the cast co-extrusion stage, as detailed above.
The measured physical properties of Sheet #3 were as follows: Tensile strength at break was 33 Mpa, the Strain at Break was 214% and Young's Modulus was 619 Mpa.

Sheet #4:
A three layered film, wherein layers 1 and 3 are prepared from a compound of PBSA/PLA having a 75/25% w/w ratio of the two polymers, respectively, and a middle layer (layer 2) prepared from a compound of PBSA. The final polymer sheet was produced according to the cast co-extrusion stage, as detailed above.

The measured physical properties of Sheet #4 were as follows: Tensile strength at break was 28 Mpa, the Strain at Break was 203% and Young's Modulus was 426 Mpa.

Sheet #5:

A five layered film, wherein layers 1 and 5 are prepared from a compound of PBSA/PLA having a polymer ratio of 75/25% w/w, respectively, which was prepared similarly to layers 1 and 3 sheet #1. Layers 2, 3 and 4 of Sheet #5 were prepared from a compound of PVOH-g-PBS, prepared using the same procedure described above regarding layer 2 of Sheet #1.

The measured physical properties of Sheet #5 were as follows: Tensile strength at break was 34 Mpa, the Strain at Break was 100% and Young's Modulus was 1009 Mpa.

Sheet #6:

Five layered biodegradable film with hygroscopic oxygen and water barrier compound.

A five layered film, wherein layers 1 and 5 are prepared from a compound of PBSA/PLA with a polymer ratio of 75/25% w/w, respectively, which were produced similarly to layers 1 and 3 of sheet #1. Layers 2 and 4 of Sheet #6 were prepared from a compound of PVOH-g-PBS that was prepared using the same procedure described above for Sheet #1. Layer 3 of Sheet #6 was prepared from a compound of PVOH without further treatment. The final polymer sheet was produced according to the cast co-extrusion stage, as detailed above. The measured physical properties of Sheet #6 were as follows: Tensile strength at break was 42 Mpa, the Strain at Break was 160% and Young's Modulus was 1509 Mpa.

Sheet #7:

A five layered film, wherein layers 1 and 5 were prepared from compound of PBSA/PLA with a polymers ratio of 75/25% w/w, respectively, which were produced similarly to layers 1 and 3 of Sheet #1. Layers 2 and 4 were prepared from a compound of PBSA/PLA having a polymer ratio of 75/25% w/w, respectively, and the middle layer (layer 3) was prepared from a compound of PVOH without further treatment. The final polymer sheet was produced according to the cast co-extrusion, as detailed above.

The measured physical properties of Sheet #7 were as follows: Tensile strength at break was 38 Mpa, the Strain at Break was 197% and Young's Modulus was 1430 Mpa.

Sheet #8:

A five layered film, wherein layers 1 and 5 were prepared from a compound of PBSA/PLA having a polymer ratio of 75/25% w/w, respectively, produced similarly to layers 1 and 3 of Sheet #1. Layers 2, and 4 of Sheet 8 were prepared from a compound of PVOH-g-PBS, prepared using the same procedure described above for Sheet #1. Layer 3 of Sheet #8 was prepared from a compound of PBS, without further treatment. The final polymer sheet was produced according to the cast co-extrusion stage, as detailed above.

The measured physical properties of Sheet #8 were as follows: Tensile strength at break was 33 Mpa, the Strain at Break was 53% and Young's Modulus was 700 Mpa.

Sheet #9:

A five layered film, where layers 1 and 5 were prepared from a compound of PBSA/PLA having a polymer ration of 75/25% w/w, respectively, produced similarly to layers 1 and 3 of Sheet #1. Layers 2 and 4 of Sheet #9 were prepared form a compound of PVOH-g-PBS, and the middle layer of Sheet #9, layer 3, was prepared from a compound of PBSA, without further treatment. The final polymer sheet was produced according to the cast co-extrusion stage, as detailed above.

The measured physical properties of Sheet #9 were as follows: Tensile strength at break was 23 Mpa, the Strain at Break was 180% and Young's Modulus was 603 Mpa.

Example 5: Five-Layered Biodegradable Sheets

All of the five layered sheets (#10412) disclosed hereinbelow were about 100 microns thick. In all of the example hereinbelow, the "tie layer" refers to a commercially available adhesive serving as a tie layer.

Sheet #10:

A five layered biodegradable sheet was prepared according to the procedure described above for Sheet #1, wherein the weight of each layer is defined as its functionality of the final sheet. The five layered Sheet #10 consisted of the following layers:

Layers 1 and 5, each is 35% of the total thickness and consists of: 20% w/w PLA, 55% w/w PBS and 25% w/w PCL Layers 2 and 4, each is 8% of the total thickness and consists of 100% w/w tie layer Layer 3 is 13% of the total thickness and consists of 100% w/w PVOH The measured physical properties of Sheet #10 were as follows: Stress at Maximum Load was 22 Mpa, the Strain at Break was 72% and Young's Modulus was 1300 Mpa.

The barrier properties of sheet #10 were as follows:

| Barrier properties | | |
|---|---|---|
| WVTR [g/(m2 · d)] | 125.0 | ASTM E96 |
| OTR [cm3/(m2 · d · bar)] | <0.02 | ASTM D3985 |

Sheet #11:

A five layered biodegradable sheet was prepared according to the procedure described above for Sheet #1, wherein the weight of each layer is defined as its functionality of the final sheet. The five layered Sheet #11 consisted of the following layers:

Layer 1 and 5, each is 35% of the total thickness and consists of: 20% w/w PBSA, 55% w/w PBS and 25% w/w PCL Layer 2 and 4, each is 8% of the total thickness and consists of: 100% w/w tie layer Layer 3 is 13% of the total thickness and consists of: 100% w/w PVOH The measured physical properties of Sheet #11 were as follows: Stress at Maximum Load was 17 Mpa, the Strain at Break was 25% and Young's Modulus was 600 Mpa.

Sheet #12:

A five layered biodegradable sheet was prepared according to the procedure described above for Sheet #1, wherein the weight of each layer is defined as its functionality of the final sheet. The five layered Sheet #12 consisted of the following three layers:

Layer 1 and 5, each is 35% of the total thickness and consists of: 20% w/w PLA, 55% w/w PBS and 25% w/w PCL Layer 2 and 4, each is 8% of the total thickness and consists of: 20% w/w PLA, 50% w/w PBS and 30% w/w PCL Layer 3 is 13% of the total thickness and consists of: 70% w/w PVOH and 30% PCL The measured physical properties of Sheet #12 were as follows: Stress at Maximum Load was 16 Mpa, the Strain at Break was 20% and Young's Modulus was 1400 Mpa.

As evident from their physical properties, as detailed above, Sheets #10-12 are advantageous five layered biodegradable sheets according to this invention.

In all of the above sheets, layers 2, 3 and 4 are sandwiched between layers 1 and 5 so that layers 1 and 5 are on the outside of the five layered biodegradable sheet and have contact with the outside atmosphere or food/liquid and layers 2, 3 and 4 are positioned between them and do not contact the outside atmosphere or food/liquid.

All of the above sheets were prepared for heatseal and the treatment and evaluation of heatseal strength data for the purpose of determining heat sealability of flexible barrier materials. The practice is restricted to sealing with a machine employing hot-bar jaws, with controlled temperature, pressure and sealing time. The film structure, thickness and composition affect significantly on the heat sealability. All the reported films demonstrated a wide sealing temperature range, with an outcome of strong sealing force, in the range of 11.2 to 37.2 N/25 mm. Heat sealing data are shown in Table 6 where a temperature range of from 80° C. to 140° C. is given.

TABLE 6

| Heat sealing load at temperature range | | | | | | | | | | | | | | |
|---|---|---|---|---|---|---|---|---|---|---|---|---|---|---|
| Load at Maximum Load (N/25 mm) | 80 | 85 | 90 | 95 | 100 | 105 | 110 | 115 | 120 | 125 | 130 | 135 | 140 | Heat seal | Range |
| SHEET 10 | 25 | 30 | 28 | 29 | 35 | 31 | 28 | 29 | 27 | 37 | 30 | 26 | 27 | 80-140 | 60 |
| SHEET 11 | 20 | 21 | 25 | 29 | 27 | 29 | 33 | 29 | 29 | 28 | 32 | 29 | 27 | 80-140 | 60 |
| SHEET 12 | 28 | 27 | 29 | 31 | 28 | 30 | 32 | 29 | 33 | 28 | 32 | 28 | 30 | 80-140 | 60 |

The analysis was performed according to ASTM F2029-08 Standard Practices for Making Heatseals for Determination of Heat sealability of Flexible Webs as Measured by Seal Strength.

Example 6: Physical, Mechanical, Thermal and Barrier Properties of Monolayer, Three-Layered and Five-Layered Biodegradable Sheets Sheets #13-#16 are provided as comparative examples.

Sheet #13:

A monolayered biodegradable sheet consisting of 25% w/w PLA and 75% w/w PBSA was prepared using the same procedure described above for Sheet #1, wherein the amounts of the polymers used were 125 gr PLA and 375 gr PBS. The measured physical, mechanical, thermal and barrier properties of Sheet #13 were as follows:

| Physical Properties | | |
|---|---|---|
| Specific Gravity | 1.25 | ASTM D792 |
| Melt volume rate (190° C./2.16 kg) [cm3/10 min] | 3.9 | ASTM D1238 |
| Melt flow rate (190° C./2.16 kg) [g/10 min] | 4.2 | ASTM D1238 |

| Mechanical Properties | | |
|---|---|---|
| Tensile Strength @ Break, (MPa) | 32 | ASTM D882 |
| Tensile Modulus, (MPa) | 894 | ASTM D882 |
| Tensile Elongation, % | 339 | ASTM D882 |
| Notched Izod Impact, (J/m) | 536 | ASTM D256 |

| Thermal properties | | |
|---|---|---|
| Heat distortion temperature HDT [° C./18.5 kg/cm²] | 45 | ASTM D648 |

| Barrier properties | | |
|---|---|---|
| OTR (oxygen transmittance from bottle) | 0.3 cc/pack/day | |

Sheet #14:

A three layered biodegradable sheet was prepared according to the procedure described above for Sheet #1, wherein the weight of each layer constitutes a third of the weight of the final sheet. The three layered Sheet #14 consists of the following three layers:

Layer 1: consisting about 25% w/w PLA and about 75% w/w PBSA;
Layer 2: consisting about 100% w/w PBSA; and
Layer 3: consisting about 25% w/w PLA and about 75% w/w PBSA.

The measured physical, mechanical and barrier properties of sheet #14 were as follows:

| Physical Properties | |
|---|---|
| Light transmittance (%) | 88 |

| Mechanical Properties | | |
|---|---|---|
| Tensile Strength @ Break, MD (MPa) | 24 | ASTM D882 |
| Tensile Strength @ Break, TD (MPa) | 22 | ASTM D882 |
| Tensile Modulus, MD (MPa) | 527 | ASTM D882 |
| Tensile Modulus, TD (MPa) | 392 | ASTM D882 |
| Tensile Elongation, MD % | 319 | ASTM D882 |
| Tensile Elongation TD % | 463 | ASTM D882 |

| Barrier properties | | |
|---|---|---|
| WVTR [water transmittance, g/(m2 · d)] | 48.4 | ASTM E96 |
| OTR [cm3/(m2 · d · bar)] | 54.1 | ASTM D3985 |

Sheet #15:

A five layered biodegradable sheet was prepared according to the procedure described above for Sheet #1, wherein the thickness of each of layers 1 and 5 constitutes about 30% of the total thickness, the thickness of each of layers 2 and 4 constitutes about 15% of the thickness final sheet, and the thickness of layer 3 constitutes about 10% of the thickness of the final sheet. It is noted that since the materials have approximately the same density, the weight ratio is about the same as the thickness ratio. The five layered Sheet #15 consists of the following five layers:

Layer 1: consisting about 25% w/w PLA and about 75% w/w PBSA;
Layer 2: consisting about 100% w/w PBSA;
Layer 3: consisting about 100% w/w PVOH;
Layer 4: consisting about 100% w/w PBSA; and
Layer 5: consisting about 25% w/w PLA and about 75% w/w PBSA.

The measured physical, mechanical and barrier properties of sheet #15 were as follows:

| Physical Properties | |
|---|---|
| Light transmittance (%) | 88 |

| Mechanical Properties | | |
|---|---|---|
| Tensile Strength @ Break, MD (MPa) | 32 | ASTM D882 |
| Tensile Strength @ Break, TD (MPa) | 27 | ASTM D882 |
| Tensile Modulus, MD (MPa) | 464 | ASTM D882 |
| Tensile Modulus, TD (MPa) | 596 | ASTM D882 |
| Tensile Elongation, MD % | 687 | ASTM D882 |
| Tensile Elongation, TD % | 447 | ASTM D882 |

| Barrier properties | | |
|---|---|---|
| WVTR [g/(m2 · d)] | 57.0 | ASTM E96 |
| OTR [cm3/(m2 · d · bar)] | 2.2 | ASTM D3985 |

Sheet #16:

A five layered biodegradable sheet was prepared according to the procedure described above for Sheet #1, wherein the thickness of each of layers 1 and 5 constitutes about 30% of the total thickness, the thickness of each of layers 2 and 4 constitutes about 15% of the thickness final sheet, and the thickness of layer 3 constitutes about 10% of the thickness of the final sheet. It is noted that since the materials have approximately the same density, the weight ratio is about the same as the thickness ratio The five layered Sheet #16 consists of the following five layers:

Layer 1: consisting about 25% w/w PLA and about 75% w/w PBSA;
Layer 2: consisting of PBSA and about 20% w/w nano-kaolin;
Layer 3: consisting about 100% w/w PVOH;
Layer 4: consisting of PBSA and about 20% w/w nano-kaolin; and
Layer 5: consisting about 25% w/w PLA and about 75% w/w PBSA.

The barrier properties of sheet #16 were as follows:

| Barrier properties | | |
|---|---|---|
| WVTR [g/(m2 · d)] | 30.0 | ASTM E96 |
| OTR [cm3/(m2 · d · bar)] | 2.0 | ASTM D3985 |

As evident from the above results, the addition of PVOH to the biodegradable sheet lowers the OTR and the further addition of nanoclays lowers the WVTR.

Example 7: Biodegradability

Sheet #17:

A three layered biodegradable sheet was prepared according to the procedure described above for Sheet #1, wherein the weight of each layer constitutes a third of the weight of the final sheet. The three layered Sheet #17 consists of the following three layers:

Layer 1: consisting about 75% w/w PLA and about 25% w/w PBSA;
Layer 2: consisting about 100% w/w PBSA; and
Layer 3: consisting about 75% w/w PLA and about 25% w/w PBSA.

According to ISO 14855-2 the reference material used was microcrystalline cellulose. The graph presented in FIG. 1 shows the percentage degree of degradation of Sheet #17 (columns N1 and N2) in comparison to the reference (columns N3 and N4). Other than the sheet in columns N1 and N2 and the microcrystalline cellulose in columns N3 and N4, the columns were filled with compost. Throughout this test, the temperature of the columns was kept at 58° C.

Example 8: Mechanical Properties of Disclosed Sheets

Table 7a-c: Summary of the mechanical properties for the multilayered polymer sheets.

TABLE 7a

| Sheet # | layer 1 | layer 2 | layer 3 | layer 4 | layer 5 | Tensile Strength @ Break, MD (MPa) ASTM D882 |
|---|---|---|---|---|---|---|
| 1 | PBSA/PLA | PVOH-g-PBS | PBSA/PLA | | | 26 |
| 2 | PBSA/PLA | PVOH | PBSA/PLA | | | 28 |
| 3 | PBSA/PLA | PBS | PBSA/PLA | | | 33 |
| 4 | PBSA/PLA | PBSA | PBSA/PLA | | | 28 |
| 5 | PBSA/PLA | PVOH-g-PBS | PVOH-g-PBS | PVOH-g-PBS | PBSA/PLA | 34 |
| 6 | PBSA/PLA | PVOH-g-PBS | PVOH | PVOH-g-PBS | PBSA/PLA | 42 |
| 7 | PBSA/PLA | PBSA/PLA | PVOH | PBSA/PLA | PBSA/PLA | 38 |
| 8 | PBSA/PLA | PVOH-g-PBS | PBS | PVOH-g-PBS | PBSA/PLA | 33 |
| 9 | PBSA/PLA | PVOH-g-PBS | PBSA | PVOH-g-PBS | PBSA/PLA | 23 |
| 10 | PBSA/PLA/PCL | Tie | PVOH | Tie | PBSA/PLA/PCL | 22 |
| 11 | PBSA/PBS/PCL | Tie | PVOH | Tie | PBSA/PBS/PCL | 23 |
| 12 | PBSA/PLA/PCL | PBSA/PLA/PCL | PVOH/PCL | PBSA/PLA/PCL | PBSA/PLA/PCL | 23 |

TABLE 7b

| Sheet # | layer 1 | layer 2 | layer 3 | layer 4 | layer 5 | Tensile Elongation, MD % ASTM D882 |
|---|---|---|---|---|---|---|
| 1 | PBSA/PLA | PVOH-g-PBS | PBSA/PLA | | | 136 |
| 2 | PBSA/PLA | PVOH | PBSA/PLA | | | 139 |
| 3 | PBSA/PLA | PBS | PBSA/PLA | | | 214 |
| 4 | PBSA/PLA | PBSA | PBSA/PLA | | | 203 |
| 5 | PBSA/PLA | PVOH-g-PBS | PVOH-g-PBS | PVOH-g-PBS | PBSA/PLA | 100 |
| 6 | PBSA/PLA | PVOH-g-PBS | PVOH | PVOH-g-PBS | PBSA/PLA | 159 |
| 7 | PBSA/PLA | PBSA/PLA | PVOH | PBSA/PLA | PBSA/PLA | 197 |
| 8 | PBSA/PLA | PVOH-g-PBS | PBS | PVOH-g-PBS | PBSA/PLA | 53 |
| 9 | PBSA/PLA | PVOH-g-PBS | PBSA | PVOH-g-PBS | PBSA/PLA | 180 |
| 10 | PBSA/PLA/PCL | Tie | PVOH | Tie | PBSA/PLA/PCL | 72 |
| 11 | PBSA/PBS/PCL | Tie | PVOH | Tie | PBSA/PBS/PCL | 119 |
| 12 | PBSA/PLA/PCL | PBSA/PLA/PCL | PVOH/PCL | PBSA/PLA/PCL | PBSA/PLA/PCL | 58 |

TABLE 7c

| Sheet # | layer 1 | layer 2 | layer 3 | layer 4 | layer 5 | Tensile Modulus, MD (MPa) ASTM D882 |
|---|---|---|---|---|---|---|
| 1 | PBSA/PLA | PVOH-g-PBS | PBSA/PLA | | | 771 |
| 2 | PBSA/PLA | PVOH | PBSA/PLA | | | 1263 |

TABLE 7c-continued

| Sheet # | layer 1 | layer 2 | layer 3 | layer 4 | layer 5 | Tensile Modulus, MD (MPa) ASTM D882 |
|---|---|---|---|---|---|---|
| 3 | PBSA/PLA | PBS | PBSA/PLA | | | 619 |
| 4 | PBSA/PLA | PBSA | PBSA/PLA | | | 426 |
| 5 | PBSA/PLA | PVOH-g-PBS | PVOH-g-PBS | PVOH-g-PBS | PBSA/PLA | 1009 |
| 6 | PBSA/PLA | PVOH-g-PBS | PVOH | PVOH-g-PBS | PBSA/PLA | 1509 |
| 7 | PBSA/PLA | PBSA/PLA | PVOH | PBSA/PLA | PBSA/PLA | 1429 |
| 8 | PBSA/PLA | PVOH-g-PBS | PBS | PVOH-g-PBS | PBSA/PLA | 700 |
| 9 | PBSA/PLA | PVOH-g-PBS | PBSA | PVOH-g-PBS | PBSA/PLA | 603 |
| 10 | PBSA/PLA/PCL | Tie | PVOH | Tie | PBSA/PLA/PCL | 1425 |
| 11 | PBSA/PBS/PCL | Tie | PVOH | Tie | PBSA/PBS/PCL | 1296 |
| 12 | PBSA/PLA/PCL | PBSA/PLA/PCL | PVOH/PCL | PBSA/PLA/PCL | PBSA/PLA/PCL | 1351 |

Tables 7a-c demonstrates the mechanical properties of the multilayered polymer sheets (Sheets #1-#12, as detailed above). While the tensile strength (22-42 MPa) remains similar for all compositions, the tensile modulus is decreasing with the use of the PVOH-g-PBS, making the final films more flexible. It is noted that Table 1 and the results above summarize the mechanical properties of the films, based on average of five samples of each film. Note that when embedding the PVOH compound, the tensile modulus is above 1200 MPa, which makes the polymer film brittle. When using the PVOH-g-PBS compound, there is only minor decrease in the tensile strength, the tensile elongation remains high, and the tensile modulus decrease to 600-1000 MPa, which makes the film more flexible and less rigid.

Figure 2A:
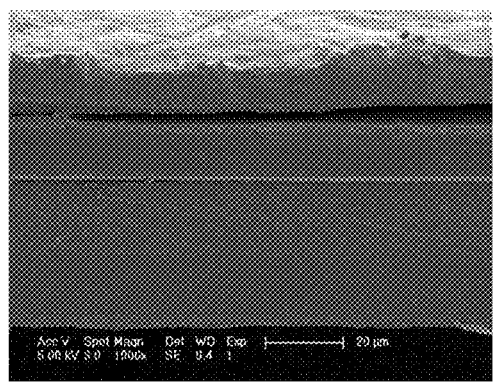
FIGS. 2A and 2B are SEM micrographs of Sheets #7 and #5 of Example 5, respectively.
Figure 2B:
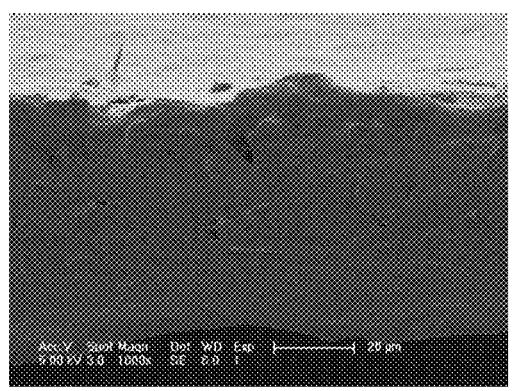

In order to demonstrate the benefits of the PVOH-g-PBS layer, which acts both as a tie layer (acting so as to inhibit the separation of the various layers of the film) and as a barrier layer, Scanning electron Microscope (SEM) analysis was performed using polymer sheet sections, that were sputter coated with Pd/Au for 60 seconds. The samples were analyzed using Sirion FEI High Resolution Scanning Electron Microscope. The results are presented in FIGS. 2A and 2B, wherein FIG. 2A is a micrograph of Sheet #7 of Example 5 and FIG. 2B is a micrograph of Sheet #5 of Example 5. as detailed above, the middle layer of Sheet #7 is a compound of PVOH, while the middle layer of Sheet #5 is a PVOH-g-PBS compound. As shown in FIGS. 2A and 2B, Sheet #7 demonstrated de-lamination of the dry film, while Sheet #5 demonstrated no de-lamination of the dry film. Other results have shown that the PVOH-g-PBS layer prevents de-lamination in both dry and wet conditions.

Example 9: Oxygen Transmission Rate (OTR) Measurement

The oxygen transmission rate (OTR) measurement was performed according to ASTM D3985-05(2010)e1: Standard Test Method for Oxygen Gas Transmission Rate Through Plastic Film and Sheeting using a coulometric sensor (MOCON OXYGEN PERMEABILITY METER, OXTRAN). The water vapor transmission rate (WVTR) was measured using a TNO/PIRA water permeability meter. The sheets related to in Example 6 are the same sheets related to in Example 5.

Sheet 1:
The OTR value for 60 micron film thickness was 256 [$cm^3/(m^2 \cdot d \cdot bar)$] at 25° C.
The WVTR value for 60 micron film thickness was 301 [$g/(m^2 \cdot d)$] at 90% RH, at 38° C.

Sheet 2:
The OTR value for 60 micron film thickness was 0.082 [$cm^3/(m^2 \cdot d \cdot bar)$] at 25° C.
The WVTR value for 60 micron film thickness was 289 [$g/(m^2 \cdot d)$] at 90% RH, at 38° C.

Sheet 3:
The OTR value for 60 micron film thickness was 487 [$cm^3/(m^2 \cdot d \cdot bar)$] at 25° C.
The WVTR value for 60 micron film thickness was 397 [$g/(m^2 \cdot d)$] at 90% RH, at 38° C.

Sheet 4:
The OTR value for 60 micron film thickness was 402 [$cm^3/(m^2 \cdot d \cdot bar)$] at 25° C.
The WVTR value for 60 micron film thickness was 432 [$g/(m^2 \cdot d)$] at 90% RH, at 38° C.

Sheet 5:
The OTR value for 60 micron film thickness was calculated to be 190 [$cm^3/(m^2 \cdot d \cdot bar)$] at 25° C.
The WVTR value for 60 micron film thickness was 367 [$g/(m^2 \cdot d)$] at 90% RH, at 38° C.

Sheet 6:
The OTR value for 60 micron film thickness was calculated to be 0.409 [$cm^3/(m^2 \cdot d \cdot bar)$] at 25° C.
The WVTR value for 60 micron film thickness was 352 [$g/(m^2 \cdot d)$] at 90% RH, at 38° C.

Sheet 7:
The OTR value for 60 micron film thickness was calculated to be 0.41 [$cm^3/(m^2 \cdot d \cdot bar)$] at 25° C.
The WVTR value for 60 micron film thickness was 307 [$g/(m^2 \cdot d)$] at 90% RH, at 38° C.

Sheet 8:
The OTR value for 60 micron film thickness was 374 [$cm^3/(m^2 \cdot d \cdot bar)$] at 25° C.
The WVTR value for 60 micron film thickness was 339 [$g/(m^2 \cdot d)$] at 90% RH, at 38° C.

Sheet 9:
The OTR value for 60 micron film thickness was 329 [$cm^3/(m^2 \cdot d \cdot bar)$] at 25° C.
The WVTR value for 60 micron film thickness was 328 [$g/(m^2 \cdot d)$] at 90% RH, at 38° C.

Sheet 10: The OTR value for 60 micron film thickness was <0.02 [$cm^3/(m^2 \cdot d \cdot bar)$] at 25° C.

Sheet 11:
The OTR value for 60 micron film thickness was <0.02 [$cm^3/(m^2 \cdot d \cdot bar)$] at 25° C.

Sheet 12:

The OTR value for 60 micron film thickness was <0.02 [cm³/(m²·d·bar)] at 25° C.

Water absorption was measured according to ASTM D570-98(2010)e1 standard test method for water absorption of plastics, modified for thin films. Water absorption for sheet #1 was 3.1% with STDEV of 0.5%. When Sheet #2 was tested for water absorption, the film failed due to layer separation and it was unmeasurable under wet conditions.

Sheets #6 and #7, failed within 24 hours immersed in water, due to layer separation. The water absorption for sheet #5 was 8.5% with STDEV of 0.8%. The water absorption for sheet #8 was 4.8% with STDEV of 0.5%. The results of sheets #3, #4 and #9 are detailed in Table 2 below.

Unlike sheets having a PVOH compound core layers, sheets having a POVH-g-PBS compound core layer present swelling and no de-lamination, keeping the structure stable even under wet conditions. The outer layers of those films are hydrophobic polymers, and therefore the inner core (tie) layer enables good interaction between layers and prevents de-lamination.

Tables 8a-c: Permeability properties of the polymer sheets, OTR and WVTR, and water absorption of the polymer sheets TABLE 8a

| Sheet # | layer 1 | layer 2 | layer 3 | layer 4 | layer 5 | OTR [cm3/(m2·d·bar)] ASTM D3985 |
|---|---|---|---|---|---|---|
| 1 | PBSA/PLA | PVOH-g-PBS | PBSA/PLA | | | 256 |
| 2 | PBSA/PLA | PVOH | PBSA/PLA | | | 0.082 |
| 3 | PBSA/PLA | PBS | PBSA/PLA | | | 487 |
| 4 | PBSA/PLA | PBSA | PBSA/PLA | | | 402 |
| 5 | PBSA/PLA | PVOH-g-PBS | PVOH-g-PBS | PVOH-g-PBS | PBSA/PLA | |
| 6 | PBSA/PLA | PVOH-g-PBS | PVOH | PVOH-g-PBS | PBSA/PLA | |
| 7 | PBSA/PLA | PBSA/PLA | PVOH | PBSA/PLA | PBSA/PLA | |
| 8 | PBSA/PLA | PVOH-g-PBS | PBS | PVOH-g-PBS | PBSA/PLA | 374 |
| 9 | PBSA/PLA | PVOH-g-PBS | PBSA | PVOH-g-PBS | PBSA/PLA | 329 |
| 10 | PBSA/PLA/PCL | Tie | PVOH | Tie | PBSA/PLA/PCL | <0.02 |
| 11 | PBSA/PBS/PCL | Tie | PVOH | Tie | PBSA/PBS/PCL | <0.02 |
| 12 | PBSA/PLA/PCL | PBSA/PLA/PCL | PVOH/PCL | PBSA/PLA/PCL | PBSA/PLA/PCL | <0.02 |

TABLE 8b

| Sheet # | layer 1 | layer 2 | layer 3 | layer 4 | layer 5 | WVTR [g/(m2·d)] ASTM E96 |
|---|---|---|---|---|---|---|
| 1 | PBSA/PLA | PVOH-g-PBS | PBSA/PLA | | | 301 |
| 2 | PBSA/PLA | PVOH | PBSA/PLA | | | 289 |
| 3 | PBSA/PLA | PBS | PBSA/PLA | | | 397 |
| 4 | PBSA/PLA | PBSA | PBSA/PLA | | | 432 |
| 5 | PBSA/PLA | PVOH-g-PBS | PVOH-g-PBS | PVOH-g-PBS | PBSA/PLA | 367 |
| 6 | PBSA/PLA | PVOH-g-PBS | PVOH | PVOH-g-PBS | PBSA/PLA | 352 |
| 7 | PBSA/PLA | PBSA/PLA | PVOH | PBSA/PLA | PBSA/PLA | 307 |
| 8 | PBSA/PLA | PVOH-g-PBS | PBS | PVOH-g-PBS | PBSA/PLA | 339 |
| 9 | PBSA/PLA | PVOH-g-PBS | PBSA | PVOH-g-PBS | PBSA/PLA | 328 |
| 10 | PBSA/PLA/PCL | Tie | PVOH | Tie | PBSA/PLA/PCL | 135 |
| 11 | PBSA/PBS/PCL | Tie | PVOH | Tie | PBSA/PBS/PCL | 125 |
| 12 | PBSA/PLA/PCL | PBSA/PLA/PCL | PVOH/PCL | PBSA/PLA/PCL | PBSA/PLA/PCL | 130 |

TABLE 8c

| Sheet # | layer 1 | layer 2 | layer 3 | layer 4 | layer 5 | Water absorption [%] ASTM D570 |
|---|---|---|---|---|---|---|
| 1 | PBSA/PLA | PVOH-g-PBS | PBSA/PLA | | | 3.1 ± 0.5% |
| 2 | PBSA/PLA | PVOH | PBSA/PLA | | | Failed |
| 3 | PBSA/PLA | PBS | PBSA/PLA | | | −0.2 ± 0.1% |
| 4 | PBSA/PLA | PBSA | PBSA/PLA | | | −0.1 ± 0.0% |
| 5 | PBSA/PLA | PVOH-g-PBS | PVOH-g-PBS | PVOH-g-PBS | PBSA/PLA | 8.5 ± 0.8% |
| 6 | PBSA/PLA | PVOH-g-PBS | PVOH | PVOH-g-PBS | PBSA/PLA | Failed |
| 7 | PBSA/PLA | PBSA/PLA | PVOH | PBSA/PLA | PBSA/PLA | Failed |
| 8 | PBSA/PLA | PVOH-g-PBS | PBS | PVOH-g-PBS | PBSA/PLA | 4.8 ± 0.5% |

TABLE 8c-continued

| Sheet # | layer 1 | layer 2 | layer 3 | layer 4 | layer 5 | Water absorption [%] ASTM D570 |
|---|---|---|---|---|---|---|
| 9 | PBSA/PLA | PVOH-g-PBS | PBSA | PVOH-g-PBS | PBSA/PLA | 5.0 ± 0.5% |
| 10 | PBSA/PLA/PCL | Tie | PVOH | Tie | PBSA/PLA/PCL | Failed |
| 11 | PBSA/PBS/PCL | Tie | PVOH | Tie | PBSA/PBS/PCL | Failed |
| 12 | PBSA/PLA/PCL | PBSA/PLA/PCL | PVOH/PCL | PBSA/PLA/PCL | PBSA/PLA/PCL | Failed |

Tables 8a-c demonstrates the OTR and WVTR of the multi layered films (Sheets #1-#12). Note that the OTR and WVTR of the films comprising a PVOH compound layer are lower than the corresponding values of all other sheets, and therefore, such sheets are appropriate for humid conditions. However, in the water absorption analysis, films comprising a PVOH compound layer failed due to selling and delamination. Films comprising a PVOH-g-PBS compound layer do not delaminate and significantly the sheet barrier properties.

Example 10: Multilayer Sheets with Barrier

Sheet #18:
A three layered biodegradable film with hydrophobically modified clay nano-particles for barrier compound.

A three layered film, wherein layers 1 and 3 are prepared from a compound of PBSA/PLA having a polymer ratio of 75/25% w/w, respectively, produced similarly to layers 1 and 3 of Sheet #1 of Example 5. Layer 2 is prepared from compound of PBSA with surface modified clay nano-particles. The final polymer sheet was produced according to the cast co-extrusion stage, as detailed above in Example 5.

The clay nano particles were processed in order to comply it with the biodegradable matrix/biodegradable sheet/film, and to assure the homogenous dispersion of the nanoclay in the polymer melt prepared while producing the sheets. Initially, the clay was treated in a chemical hood, to exfoliate the particles, as described below.

Nano Clay Exfoliation Stage:
the following nano clay particles were used

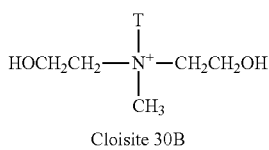

Cloisite 30B

Exfoliated clay molecule, wherein T is tallow (~65% C18, ~30% C16, ~5% C14) and the anion is chloride.

The above nano-clay particles were initially dispersed in 100 ml toluene, with 100 microliter HCl 1M for 10 minutes, removing cations, such as $Na^+$ or $Ca^2$, under magnetic stirring. The particles were then washed with Dimethylformamide (DMF) three times. 100 ml of 3-(Dimethylamino)-1-propylamine (DMPA) were added with 150 ml DMF. Next, the treated clay particles are organically modified, using conjugation molecule, as Described Hereunder.

Conjugation of Bifunctional Isocyanate:
10 ml hexamethylene diisocyanate (HDI) was conjugated to DMPA on the nanoclay surface. The free HDI isocyanate, reacted with the 10 grams of PBSA hydroxyl end group in the presence of Stannous(II)octoate (SnOct):

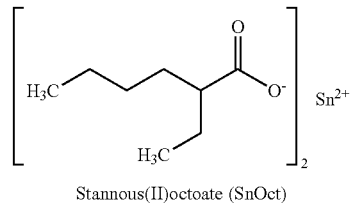

Stannous(II)octoate (SnOct)

The final polymer sheet was produced according to the cast co-extrusion stage of Example 5, as detailed above.

Sheet #19:
A three layered biodegradable film with hydrophobically modified clay nano-particles for barrier compound A three layered film, wherein layers 1 and 3 are prepared from a compound of PBSA/PLA having a polymer ratio of 75/25% w/w, respectively, produced similarly to layers 1 and 3 of Sheet #1 (Example 4), and a middle layer comprising a compound of 40% w/w nanoclay concentrate compounded with 60% w/w PBS. The final polymer sheet was produced according to the cast co-extrusion, as detailed above in Example 4. The clay nano particles were processed in order to comply it with the biodegradable matrix/biodegradable sheet/film, and to assure the homogenous dispersion of the nanoclay in the polymer melt prepared while producing the sheets.

Initially, the clay was treated in a chemical hood, to exfoliate the particles, and were further processed as follows:

Hydrophobically Modified Clay Nano Particles Using Ring Opening Polymerization (Preparing Nanoclay Concentrate)

epsilon-caprolacton and L-lactide were polymerized by ring opening polymerization (ROP). 100 grams of Cloisite C30B were introduced into a 1 liter flask. 400 gram of epsilon-caprolacton, and 50.8 grams of L-lactide, to make random copolymer of poly(caprolacton-co-L-lactide) (PCLA), were added to the flask and mechanically stirred until all the clay was fully dispersed. 28.5 grams of SnOct were added with 300 ml of DMF and 100 ml of Dioxane. The flask was connected to a reflux condenser and cooled to 0° C. The flask was then heated to 160° C., in a silicone oil bath for 8 hours, under mechanical stirring. Post reaction, 100 ml of Dioxane was added, and the solution of nano clay with poly(caprolacton-co-L-lactide) (PCLA) was precipitated into beaker with 1000 ml petroleum ether 40-60 C. The solid precipitation was collected, and dried initially in the hood, overnight, and later in a vacuum oven, to remove all solvent residues. The solid precipitation prepared is a nanoclay concentrate having 25% w/w of nanoclay particles. In order for the final middle layer of the sheet to have 10% nanoclay particles, the middle layer was prepared from 40% of the nanoclay concentrate and 60% of the biodegradable polymer.

A dry mix with of 6.0 kg PBS and 4.0 kg of nanoclay-PCLA concentrate, prepared as detailed above, were compounded using a double arm sigma blade mixer with an extrusion screw (mixtruder). The mixer container was heated to 230° C., and the blades mixed the polymers for 10 minutes. The screw and pump head were heated to 220° C.

Cast Co-Extrusion Stage:
1. The melt extruded materials were dried overnight at a temperature of 50° C. on a Shini SCD-160U-120H dryer;
2. The material were placed into a Collin co-extrusion lines, and set to the following profile:
Extruder A) 190-200-220° C.-200° C.-Adaptor; 220° C.-feedblock; Die-210° C.; screw speed: 80 rpm
Extruder B) 150-160-180° C.-180° C.-Adaptor; 185° C.-feedblock; Die-185° C.; screw speed: 45 rpm
Extruder C) 190-200-220° C.-200° C.-Adaptor; 220° C.-feedblock; Die-210° C.; screw speed: 80 rpm
Head pressure 50 bar.

The measured physical properties of Sheet #11 were as follows: Tensile strength at break was 26 Mpa, the Strain at Break was 190% and Young's Modulus was 821 Mpa.

Sheet #20:
A three layered biodegradable film with hydrophobically modified clay nano-particles for barrier compound.

A three layered film, wherein layers 1 and 3 are prepared from a compound of PBSA/PLA having a polymer ratio of 75/25% w/w, respectively, produced similar to layers 1 and 3 of Sheet #1 (Example 4). Layer 2 was prepared from a compound of 40% w/w nanoclay concentrate, prepared using the same procedure described above for Sheet #11, compounded with 60% w/w PBSA. The final polymer sheet was produced according to the cast co-extrusion stage, as detailed in Example 4. The clay nano particles were processed in order to comply it with the biodegradable matrix/biodegradable sheet/film, and to assure the homogenous dispersion of the nanoclay in the polymer melt prepared while producing the sheets.

The clay nano particles were treated and conjugated with the PCLA polymer as detailed regarding Sheet #19.

The measured physical properties of Sheet #12 were as follows: Tensile strength at break was 24 Mpa, the Strain at Break was 193% and Young's Modulus was 509 Mpa.

Sheet #21:
A five layered biodegradable film with hydrophobically modified clay nano-particles for barrier compound, and hygroscopic oxygen and water barrier A five layered film, wherein layers 1 and 5 were prepared from a compound of PBSA/PLA having a polymer ratio of 75/25% w/w, respectively, produced similarly to layers 1 and 3 of Sheet #1 (Example 4). Layers 2 and 4 were prepared from a compound of PVOH-g-PBS, prepared using the same procedure described above for Sheet #1 (Example 4). Layer 3 was prepared from a compound of 40% w/w nanoclay concentrate, using the same procedure described above for Sheet #19, in a compound with 60% w/w PBS.

The measured physical properties of Sheet #13 were as follows: Tensile strength at break was 30 Mpa, the Strain at Break was 109% and Young's Modulus was 623 Mpa.

Tables 9a-c: Summary of the mechanical properties for the multilayered polymer sheets. The details of Sheets #3, #4, and #8 are detailed in Example 4 above.

TABLE 9a

| Sheet # | layer 1 | layer 2 | layer 3 | layer 4 | layer 5 | Tensile Strength @ Break, MD (MPa) ASTM D882 |
|---|---|---|---|---|---|---|
| 19 | PBSA/PLA | PBS NC-PCLA | PBSA/PLA | | | 26 |
| 3 | PBSA/PLA | PBS | PBSA/PLA | | | 33 |
| 20 | PBSA/PLA | PBSA NC-PCLA | PBSA/PLA | | | 22 |
| 4 | PBSA/PLA | PBSA | PBSA/PLA | | | 28 |
| 21 | PBSA/PLA | PVOH-g-PBS | PBS NC-PCLA | PVOH-g-PBS | PBSA/PLA | 30 |
| 8 | PBSA/PLA | PVOH-g-PBS | PBS | PVOH-g-PBS | PBSA/PLA | 33 |

TABLE 9b

| Sheet # | layer 1 | layer 2 | layer 3 | layer 4 | layer 5 | Tensile Elongation, MD % ASTM D882 |
|---|---|---|---|---|---|---|
| 19 | PBSA/PLA | PBS NC-PCLA | PBSA/PLA | | | 190 |
| 3 | PBSA/PLA | PBS | PBSA/PLA | | | 214 |
| 20 | PBSA/PLA | PBSA NC-PCLA | PBSA/PLA | | | 241 |
| 4 | PBSA/PLA | PBSA | PBSA/PLA | | | 203 |
| 13 | PBSA/PLA | PVOH-g-PBS | PBS NC-PCLA | PVOH-g-PBS | PBSA/PLA | 109 |
| 21 | PBSA/PLA | PVOH-g-PBS | PBS | PVOH-g-PBS | PBSA/PLA | 53 |

TABLE 9c

| Sheet # | layer 1 | layer 2 | layer 3 | layer 4 | layer 5 | Tensile Modulus, MD (MPa) ASTM D882 |
|---|---|---|---|---|---|---|
| 19 | PBSA/PLA | PBS NC-PCLA | PBSA/PLA | | | 821 |
| 3 | PBSA/PLA | PBS | PBSA/PLA | | | 619 |
| 20 | PBSA/PLA | PBSA NC-PCLA | PBSA/PLA | | | 627 |
| 4 | PBSA/PLA | PBSA | PBSA/PLA | | | 426 |
| 21 | PBSA/PLA | PVOH-g-PBS | PBS NC-PCLA | PVOH-g-PBS | PBSA/PLA | 623 |
| 8 | PBSA/PLA | PVOH-g-PBS | PBS | PVOH-g-PBS | PBSA/PLA | 700 |

As shown in tables 9a-c, the composite materials forming the polymer and clay nano-particles compound, enhance the mechanical properties of the sheet, without significantly decreasing the tensile strength (range of 24-33 MPa for all the compounds) thereof. Further, the tensile modulus is increased (426-700 for compound without the nanoclay-PCLA (NC-PCLA), and 509-821 MPa for NC-PCLA containing compound). The outcome is that for a similar application a thinner wall thickness is required.

Example 11: OTR and WVTR

The oxygen transmission rate (OTR) was measured according to ASTM D3985-05(201O)e1: Standard Test Method for Oxygen Gas Transmission Rate Through Plastic Film and Sheeting using a coulometric sensor. The equipment used was MOCON OXYGEN PERMEABILITY METER, OXTRAN. The water vapor transmission rate (WVTR) was measured using a TNO/PIRA water permeability meter.

Sheet 19:

The measured oxygen transmission rate (OTR) (ASTM D3985-05(2010)e1) The OTR value for 60 micron film thickness was 464 [cm$^3$/(m$^2$·d·bar)] at 25° C. The WVTR value for 60 micron film thickness was 330 [g/(m$^2$·d)] at 90% RH, at 38° C.

Sheet 20:

The OTR value for 60 micron film thickness was 544 [cm$^3$/(m$^2$·d·bar)] at 25° C.

The WVTR value for 60 micron film thickness was 340 [g/(m$^2$·d)] at 90% RH, at 38° C.

Sheet 21:

The OTR value for 60 micron film thickness was 282 [cm$^3$/(m$^2$·d·bar)] at 25° C.

The WVTR value for 60 micron film thickness was 335 [g/(m$^2$·d)] at 90% RH, at 38° C.

Tables 10 a and b: Permeability properties of the multi layered polymer sheets, OTR and WVTR.

TABLE 10a

| Sheet # | layer 1 | layer 2 | layer 3 | layer 4 | layer 5 | OTR [cm3/(m2 · d · bar)] ASTM D3985 |
|---|---|---|---|---|---|---|
| 19 | PBSA/PLA | PBS NC-PCLA | PBSA/PLA | | | 464 |
| 3 | PBSA/PLA | PBS | PBSA/PLA | | | 487 |
| 20 | PBSA/PLA | PBSA NC-PCLA | PBSA/PLA | | | 375 |
| 4 | PBSA/PLA | PBSA | PBSA/PLA | | | 402 |
| 21 | PBSA/PLA | PVOH-g-PBS | PBS NC-PCLA | PVOH-g-PBS | PBSA/PLA | 282 |
| 8 | PBSA/PLA | PVOH-g-PBS | PBS | PVOH-g-PBS | PBSA/PLA | 374 |

TABLE 10b

| Sheet # | layer 1 | layer 2 | layer 3 | layer 4 | layer 5 | WVTR [g/(m2 · d)] ASTM E96 |
|---|---|---|---|---|---|---|
| 19 | PBSA/PLA | PBS NC-PCLA | PBSA/PLA | | | 330 |
| 3 | PBSA/PLA | PBS | PBSA/PLA | | | 397 |
| 20 | PBSA/PLA | PBSA NC-PCLA | PBSA/PLA | | | |
| 4 | PBSA/PLA | PBSA | PBSA/PLA | | | 432 |
| 21 | PBSA/PLA | PVOH-g-PBS | PBS NC-PCLA | PVOH-g-PBS | PBSA/PLA | 335 |
| 8 | PBSA/PLA | PVOH-g-PBS | PBS | PVOH-g-PBS | PBSA/PLA | 339 |

Tables 10 a and b summarizes the OTR and WVTR of the multilayered sheets. The nano clay-PCLA particles, acting as a passive barrier, enable reduction of the OTR between about 5-25%, and the WVTR by about 20%, both in three and in the five layer sheets. The five layered sheets enable the combination of a compound of PVOH-g-PBS, that functions both as oxygen and water barrier/scavenger, and as a tie layer that is both is compatible with its neighbor layers, with the core layer comprising the nanoclay particles. In addition, such films are stable even under wet conditions.

Example 12: Scanning Electron Microscope (SEM) Analysis

Figure 3:
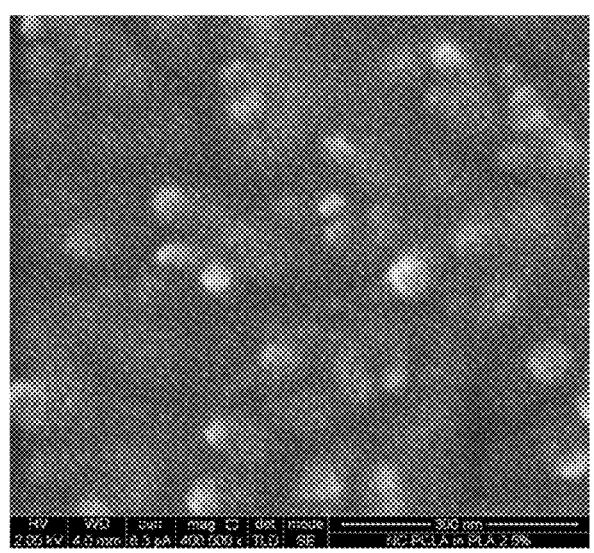
FIG. 3 is a SEM micrograph of nanoclay-PCLA dispersed in a PLA matrix.

The nanoclay particles treated with ROP, as detailed above, were dispersed homogenously in the polymer matrix as demonstrated in the SEM micrograph in FIG. 3 due to their unique surface polymerization with the PCLA polymer and a sheet (Sheet #20) was prepared therefrom, as detailed above The polymer low melting point, of 60° C., enables good dispersion of the conjugated clay particles in the polymer melt, and therefore it actually acts as a plasticizer. In addition, the polymers formed perpendicular to the clay surface are biodegradable polyesters that enable full degradation, to the dispersed particles. The out coming sheet containing the nanoclay particles is homogenous and uniform. In order to generate the SEM micrograph, the polymer sheet was lyophilized, sectioned and sputter coated with Pd/Au. Extra high resolution scanning electron microscope, Magellan 400 L, was used to analyze the clay nano particle dispersion.

Example 13: Additional Treatments of Nanoclay Particles

Procedure A:
The clay nano particles were processed in order to comply it with the biodegradable matrix/biodegradable sheet/film, and to assure the homogenous dispersion of the nanoclay in the polymer melt prepared while producing the sheets.
The nano clay particles are initially treated with acid as described in respect to Sheet #10 above.
Next, the treated clay particles are organically modified, using conjugation molecule, as follows:
Conjugation of a Heterobifunctional Molecule Stage:
isocyanatoproyl-triethoxysilane (ICN-TES)(20 ml/10 g NC), was reacted with the nanoclay surface siloxyl groups, for 36 hours at 80° C. in dry toluene (20 ml) under magnetic stirring. Next, 10 grams of isocyanate were reacted with the polymer hydroxyl end group, with added 0.2 gram of SnOct at 80° C., for 4 hours.

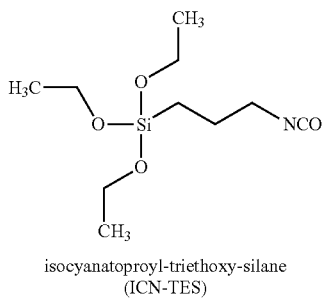

isocyanatoproyl-triethoxy-silane (ICN-TES)

Procedure B:
The clay nano particles were processed in order to comply it with the biodegradable matrix/biodegradable sheet/film, and to assure the homogenous dispersion of the nanoclay in the polymer melt prepared while producing the sheets.
The nano clay particles are initially treated with acid as described in regarding Sheet #18 above.
Next, the treated clay particles were organically modified, using conjugation molecule, as follows:
Conjugation of a Heterobifunctional Molecule Stage:
3-aminopropyl)triethoxysilane (APTES) (20 ml/10 g NC) was reacted for 36 hours at 80° C. in dry Dioxane (20 ml) under magnetic stirring, prepared using the same procedure described above for ICN-TES. Next, hexmethylene diisocyanate (HDI) was reacted with APTES in dry dioxane, at 40° C., under magnetic stirring with 100 micro-liter of SnOct. Next, the isocyanate group reacted with the polymer's hydroxyl end group, in the presence of the SnOct, at 80° C., for 4 hours.

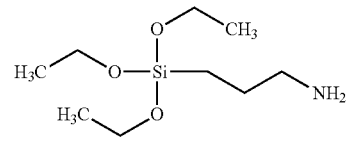

3-aminopropyl)triethoxysilane (APTES)—reacts with the nanoclay surface siloxyl group

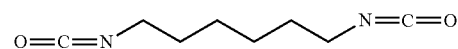

hexmethylene diisocyanate (HDI)—reacts with the free amino group.

Example 14: Single Layered Biodegradable Sheets

All of the single layered sheets related to herein were 50 microns thick.
Sheet #22:
A single layer biodegradable sheet consisting of about 25.0% w/w PLA and about 75.0% w/w PBSA was prepared as follows:
A. Melt Extrusion Compounding Stage:
1. 250 gr PLA and 750 gr PBSA were dried overnight at a temperature of 50° C. in a SHINI SCD-160U-120H desiccant dryer;
2. The dried polymers were dry blended and placed in a two screw Collin compounder;
3. The polymers were melt-extruded in the compounder set to the following profile:
  1. Temperature profile: 175-180-185-185-190° C. (the Die is set to 190° C.);
  2. Screw speed: 200 rpm; and
  3. Pressure: 15-25 bar.
B. Cast Extrusion Stage:
1. The melt extruded compounds were dried overnight at a temperature of 40° C. in a desiccant dryer;

2. The material was placed into a Randcastle Extruder set to the following profile:
1. 170-180-185° C.-185° C.-Adaptor; 185° C.-feedblock; Die-185° C.;
2. Screw speed: 80 rpm; and
3. Head pressure 450 bar.

The measured physical properties of Sheet #14 were as follows: Stress at Maximum Load was 23 MPa, the Strain at Break was 166% and Young's Modulus was 899 MPa on the film machine direction (MD), and Stress at Maximum Load was 23 MPa, the Strain at Break was 44% and Young's Modulus was 830 MPa on the film transverse direction (TD) (See Table 11 below).

Sheet #23:

A single layer biodegradable sheet consisting of about 20.0% w/w PLA, 60.0% w/w PBS and 20.0% w/w PCL was prepared as follows:

A. Melt Extrusion Compounding Stage:
1. 200 gr PLA, 600 gr PBS and 200 gr PCL were dried overnight at a temperature of 40° C. in a SHINI SCD-160U-120H desiccant dryer;
2. The dried polymers were dry blended and placed in a two screw Collin compounder;
3. The polymers were melt-extruded in the compounder set to the following profile:
4. Temperature profile: 160-175-180-185-190° C. (the Die is set to 190° C.);
5. Screw speed: 200 rpm; and
6. Pressure: 15-25 bar.

B. Cast Extrusion Stage:
1. The melt extruded compounds were dried overnight at a temperature of 40° C. in a desiccant dryer;
2. The material was placed into a Randcastle Extruder set to the following profile:
4. 160-180-185° C.-185° C.-Adaptor; 185° C.-feedblock; Die-185° C.;
5. Screw speed: 80 rpm; and
6. Head pressure 450 bar.

The measured physical properties of Sheet #23 were as follows: Stress at Maximum Load was 28 MPa, the Strain at Break was 40% and Young's Modulus was 984 MPa on the film machine direction (MD), and Stress at Maximum Load was 23 MPa, the Strain at Break was 147% and Young's Modulus was 666 MPa on the film transverse direction (TD) (See Table 11 below).

Sheet #24:

A single layered biodegradable sheet consisting of about 17.5% w/w PLA and 52.5% w/w PBS and 30.0% w/w PCL was prepared using the same procedure described above for Sheet #15, wherein the amounts of the polymers used were 175 gr PLA, 525 gr PBS and 300 gr PCL. The measured physical properties of Sheet #16 were as follows: Stress at Maximum Load was 31 MPa, the Strain at Break was 123% and Young's Modulus was 1006 MPa on the film machine direction (MD), and Stress at Maximum Load was 19 MPa, the Strain at Break was 32% and Young's Modulus was 572 MPa on the film transverse direction (TD) (see Table 5 below).

Sheet #25:

A single layered biodegradable sheet consisting of 100% PCL was prepared using the same procedure described above for Sheet #23, wherein the amounts of the polymers used were 1000 gr PCL. The measured physical properties of Sheet #17 were as follows: Stress at Maximum Load was 9 MPa, the Strain at Break was 270% and Young's Modulus was 293 MPa on the film machine direction (MD), and Stress at Maximum Load was 9 MPa, the Strain at Break was 521% and Young's Modulus was 445 MPa on the film transverse direction (TD) (see Table 11 below).

Table 11 below describes the mechanical properties of sheets #22-25, in the film machine direction (MD) and transverse direction (TD). The represented data is an average and a standard deviation for five samples of each sheet. The tests were performed according to ASTM D882: Standard Test Method for Tensile Properties of Thin Plastic Sheeting.

TABLE 11

| Sheet # | sample | Direction | Stress at Peak (MPa) | STDEV | Strain at Break (%) | STDEV | Modulus (MPa) | STDEV |
| --- | --- | --- | --- | --- | --- | --- | --- | --- |
| 22 | PBSA 75% PLA 25% | MD | 23 | 1 | 166 | 30 | 899 | 95 |
| 23 | PCL 20% | MD | 28 | 2 | 40 | 6 | 984 | 127 |
| 24 | PCL 30% | MD | 31 | 7 | 123 | 37 | 1006 | 162 |
| 25 | PCL 100% | MD | 9 | 1 | 270 | 71 | 293 | 78 |
| 22 | PBSA 75% PLA 25% | TD | 23 | 1 | 44 | 30 | 830 | 75 |
| 23 | PCL 20% | TD | 23 | 2 | 147 | 18 | 666 | 19 |
| 24 | PCL 30% | TD | 19 | 1 | 32 | 8 | 572 | 44 |
| 25 | PCL 100% | TD | 9 | 1 | 521 | 1 | 445 | 49 |

The PCL containing compound contributes to higher mechanical properties, as compared to the reference sheet #22, and also with referring to the 100% PCL (sheet #25). The PCL low mechanical performance compensates by the substituting the PBSA with PBS, that act as a thermal bridge for a making a more homogeneous compound, enhancing the overall mechanical properties.

Example 15: Barrier Properties of Monolayer Biodegradable Sheets

Sheet #22:

The reference sheet of monolayered biodegradable sheet consisting of 25% w/w PLA and 75% w/w PBSA was prepared using the same procedure described above, wherein the amounts of the polymers used were 250 gr PLA and 750 gr PBSA. The measured barrier properties of Sheet #22 were as follows:

| Barrier properties | | |
|---|---|---|
| water vapor transmittance rate (WVTR) [g/(m2 · d)] | 263 | ASTM E96 |
| oxygen transmittance rate (OTR) [cm3/(m2 · d · bar)] | 347 | ASTM D3985 |

Sheet #23:

A monolayered biodegradable sheet described above was measured for its barrier properties as follows:

| Barrier properties | | |
|---|---|---|
| water vapor transmittance rate (WVTR) [g/(m2 · d)] | 186 | ASTM E96 |
| oxygen transmittance rate (OTR) [cm3/(m2 · d · bar)] | 265 | ASTM D3985 |

Sheet #24:

A monolayered biodegradable sheet described above was measured for its barrier properties as follows:

| Barrier properties | | |
|---|---|---|
| water vapor transmittance rate (WVTR) [g/(m2 · d)] | 102 | ASTM E96 |
| oxygen transmittance rate (OTR) [cm3/(m2 · d · bar)] | 203 | ASTM D3985 |

Sheet #25:

A monolayered biodegradable sheet consisting of 100% PCL as described above was measured for its barrier properties as follows:

| Barrier properties | | |
|---|---|---|
| water vapor transmittance rate (WVTR) [g/(m2 · d)] | 693 | ASTM E96 |
| oxygen transmittance rate (OTR) [cm3/(m2 · d · bar)] | 3870 | ASTM D3985 |

Table 12 below provides the measured barrier properties of the polymer sheets, including a reference, sheet #22 of PBS/PLA compound, compounds of 20% and 30% PCL and a second reference of 100% PCL.

TABLE 12

| Sheet # | 60 micron film | WVTR [gr/m² · day] | OTR [cc/m² · day · atm] |
|---|---|---|---|
| 22 | PBSA/PLA compound | 263 | 347 |
| 23 | PCL 20% | 186 | 265 |
| 24 | PCL 30% | 102 | 203 |
| 25 | PCL 100% | 693 | 3870 |

Example 16: Degradation Rate of Biodegradable Sheets

The degradation time calculation is based on the assumption that the hydrolytic reaction is the limiting step of overall degradation process; therefore the effect of PCL, having a degradation time of up to 24 months, is to extend the shelf life of the polymer sheet. A degradation experiment is currently running based on this theoretical calculation.

$$\text{Degradation time} = \sum_{i=0}^{n} (Dt_1 \times P_1)$$

$Dt_1$ is the theoretical degradation time of each component and the compound, and $P_1$ is its weight fraction. The theoretical values for the polymers are: PLA: 3-12 months, based on its crystallinity of semi-crystalline poly(L-Lactide), poly (D-Lactide) or the amorphous poly (D,L-Lactide). PBS: 3-4 months, and PCL: 24 months.

Figure 4:
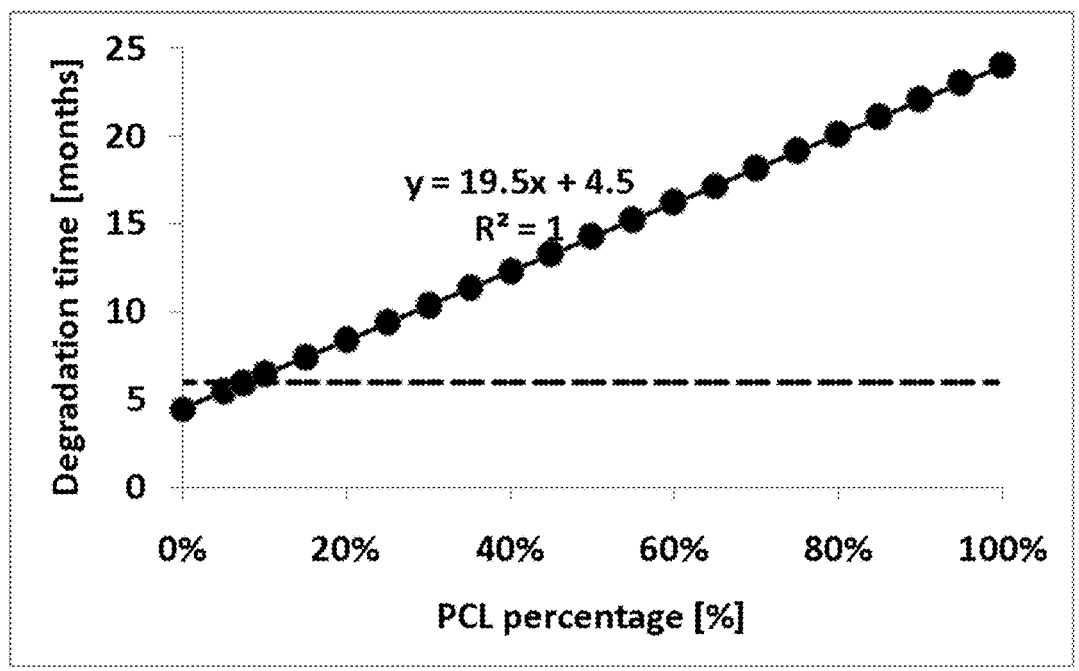
FIG. 4 presents a graph describing the theoretical degradation time calculation of PCL containing compounds.

FIG. 4 present a graph describing the theoretical degradation time calculation of PCL containing compounds. Note that for degradation time if up to 6 months, the PCL concentration is 7.5% or less.

Example 17: Enhanced Mechanical Properties and Barrier Properties Through Thermal Bridging and Compound Crosslinking In some cases, the PCL containing compounds were crosslinked using maleic anhydride, as a hydrophilic crosslinker. In addition hydrophobic crosslinkers were synthesized for this purpose, including butanediol-dimethacrylate (Bu-dMA), hexanediol-dimethacrylate (Hx-dMA), and tailor-made oligomers of biodegradable polymers of molecular weight of 300-35,000 g/mol. These include among others: PCL900-tri-OH, modified to PCL900-tri-methacrylate or acrylate to form three functional crosslinkers with its three (meth)acrylic groups (PCL900-tri-MA or PCL900-tri-A, respectively) or PCL 2000-di-OH, modified to PCL2000-dimethacrylate or acrylate to form two functional crosslinker with its two (meth)acrylic groups (PCL 2000-di-MA or PCL 2000-di-A, respectively).

The effect of crosslinking agent on the phase separation was demonstrated using differential scanning calorimetry (DSC) to track the glass transition temperature (Tg). A shift of the Tg of the native PCL from −60° C., to higher values, was shown and was used to demonstrate the ability of the polymer mixture to mix better, and therefore to reduce the phase separation by averaging the Tg. The PBS is used as a thermal bridge, and is related to the melting temperature (Tm) of the polymers, referring to the compounding of PCL (Tg=−60° C., Tm=+60° C.) with PLA (Tg=+60° C., Tm=+160° C.) and with PBS (Tg=−35° C., Tm=+115° C.). To further reduce the phase separation, a crosslinker is added, thus raising the glass transition temperature.

Figure 5:
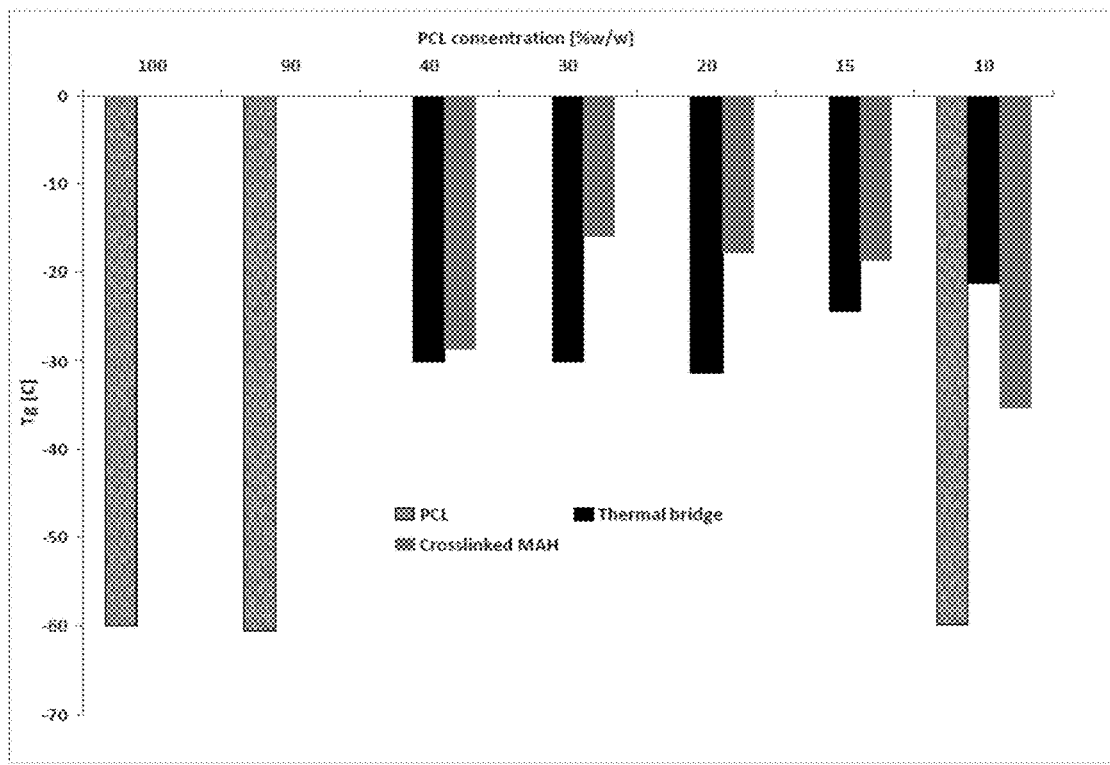
FIG. 5 presents a graph describing the glass transition temperature (Tg) of the tested compounds, as a function of PCL concentration with and without the addition of a thermal bridging polymer, or the addition of a crosslinker.

As shown in FIG. 5, in compounds of 100%, 90% and 10% w/w PCL, the Tg is similar to pure PCL, at −60° C. When PBS, used as a thermal bridge, is added, the Tg increases to higher values of −30.1° C., −30.0° C., −31.4° C., −24.4° C. and −21.2° C. for PCL concentrations of 40%, 30%, 20%, 15% and 10% w/w, respectively. Once adding a crosslinking agent to the system, such as 0.5% w/w maleic anhydride (MAH) with a radical former such as Azobisisobutyronitrile (AIBN), the Tg further increases, to values of −28.6° C., −15.9° C., −17.8° C. −18.6° C. for PCL concentrations of 40%, 30%, 20% and 15% w/w, respectively.

It is noted that the gases permeability permeation in PCL-containing biodegradable films, is also affected by the crosslinkers addition, as presented below:

Sheet #26-MAH:

A single layer biodegradable sheet consisting of about 20.0% w/w PLA, 60.0% w/w PBS and 20.0% w/w PCL with 0.5% w/w MAH and 0.2% AIBN was prepared as follows:

A. Melt Extrusion Compounding Stage:
The polymers were dried overnight at a temperature of 40° C. in a SHINI SCD-160U-120H desiccant dryer;
1. 200 gr PLA, 600 gr PBS, 200 gr PCL, with 5 gr of MAH, and 2 g AIBN were melt extruded in the compounder set to the following profile:
   7. Temperature profile: 160-175-180-185-190° C. (the Die is set to 190° C.);
   8. Screw speed: 200 rpm; and
   9. Pressure: 15-25 bar.

B. Cast Extrusion Stage:
The melt extruded compounds were dried overnight at a temperature of 40° C. in a desiccant dryer;
The material was placed into a Randcastle Extruder set to the following profile:
160-180-185° C.-185° C.-Adaptor; 185° C.-feedblock; Die-185° C.;
Screw speed: 80 rpm; and
Head pressure 450 bar.
The sheet barrier properties were as follows:

| Barrier properties | | |
|---|---|---|
| water vapor transmittance rate (WVTR) [g/(m2 · d)] | 350 | ASTM E96 |
| oxygen transmittance rate (OTR) [cm3/(m2 · d · bar)] | 240 | ASTM D3985 |

Sheet #27-MAH:
A single layered biodegradable sheet consisting of about 17.5% w/w PLA and 52.5% w/w PBS, 30.0% w/w PCL with 0.5% w/w MAH and 0.2% AIBN was prepared using the same procedure described above for Sheet #26-MAH, wherein the amounts of the polymers used were 175 gr PLA, 525 gr PBS and 300 gr PCL with 5 gr of MAH, and 2 g AIBN were melt extruded.
The sheet barrier properties were as follows:

| Barrier properties | | |
|---|---|---|
| water vapor transmittance rate (WVTR) [g/(m2 · d)] | 106 | ASTM E96 |
| oxygen transmittance rate (OTR) [cm3/(m2 · d · bar)] | 163 | ASTM D3985 |

Sheet #28-MAH:
A single layered biodegradable sheet consisting of about 15.0% w/w PLA and 45.0% w/w PBS, 40.0% w/w PCL with 0.5% w/w MAH and 0.2% AIBN was prepared using the same procedure described above for Sheet #26-MAH, wherein the amounts of the polymers used were 150 gr PLA, 450 gr PBS and 400 gr PCL with 5 gr of MAH, and 2 g AIBN were melt extruded.
The sheet barrier properties were as follows:

| Barrier properties | | |
|---|---|---|
| water vapor transmittance rate (WVTR) [g/(m2 · d)] | 55 | ASTM E96 |
| oxygen transmittance rate (OTR) [cm3/(m2 · d · bar)] | 120 | ASTM D3985 |

Table 13 below presents the measured barrier properties of the polymer sheets, of compounds of 20%, 30% and 40% PCL crosslinked using MAH and AIBN.

TABLE 13

| Sheet # | 60 micron film | WVTR [gr/m2 · day] | OTR [cc/m2 · day · atm] |
|---|---|---|---|
| 22 | PBSA/PLA compound | 263 | 347 |
| 23 | PCL 20% | 186 | 265 |
| 24 | PCL 30% | 102 | 203 |
| 26-MAH | PCL 20% MAH | 350 | 240 |
| 27-MAH | PCL 30% MAH | 106 | 163 |
| 28-MAH | PCL 40% MAH | 55 | 120 |
| 25 | PCL 100% | 693 | 3870 |

Example 18: Enhanced Mechanical Properties and Barrier Properties of Biodegradable Polymer Sheet, Using Hydrophobic Crosslinkers Due to the results of the PCL containing compounds more efforts are being invested to determine the ultimate polymers concentration point of improved mechanical properties, with the optimal barrier properties, in terms of PCL concentration, in addition to adjusting the crosslinking agent. By incorporating a hydrophobic crosslinker, a more uniform polymer matrix would appear. Short oligomers of PCL based crosslinkers, which are converted to a functional end group for crosslinking, enabling them to react during extrusion are being synthesized. The crosslinkers include butanediol-dimethacrylate, hexanediol-dimethacrylate, and tailor-made oligomers of PCL900-tri-OH, modified to PCL900-tri-methacrylate (PCL900-tri-MA) or PCL 2000 di-OH, forming PCL-di-MA.

Example 19: Extended Shelf Life, Enhanced Mechanical Properties and High Barrier Properties of Biodegradable Polymer Sheet, Using Hydrophobic Crosslinkers A two layered film, having an inner and outer layer, was prepared, wherein the film is used such that the inner layer is in contact with the material stored within the film while the outer layer is in contact with the surrounding atmosphere. The inner layer was prepared of a compound comprising 20% PCL, 40% PBSA, 40% PBS, which was prepared using the hydrophobic crosslinker PCL2000-dMA. This inner layer was prepared so as to provide enhanced water resistance and good welding properties. The outer layer was prepared from a compound of 25% PLA and 75% PBSA. A second two layered film was prepared having an inner layer prepared from a compound of 20% PCL, 40% PBSA, 20% PBS and 20% PLA crosslinked with the hydrophobic crosslink, PCL2000-dMA. This inner layer was prepared so as to provide enhanced water resistance and good welding properties. The outer layer was prepared from a compound of 25% PLA and 75% PBSA.

A three layered film was prepared having an inner layer prepared from a compound of 20% PCL, 40% PBSA, 40% PBS that was crosslinked with the hydrophobic crosslinker PCL2000-dMA. This inner layer was prepared so as to provide enhanced water resistance and good welding properties. The middle layer was prepared from a compound of 25% PLA and 75% PBSA and the outer layer was prepared from a compound 20% PCL, 60% PBS and 20% PLA crosslinked with the hydrophobic crosslinker, PCL2000-dMA. This outer layer was designed so as to provide enhanced water resistance, extended shelf like and the desired mechanical properties.

A three layered film was prepared having an inner layer prepared from a compound of PBAT or PBSA in order to provide enhanced welding properties. The middle layer was prepared from a compound of 25% PLA and 75% PBSA and the outer layer was prepared from a compound of 20% PCL, 60% PBS and 20% PLA crosslinked with the hydrophobic crosslinker PCL2000-dMA, in order to provide enhanced water resistant together with the desired mechanical properties.

A three layered film was prepared having an inner layer prepared from a compound of 20% PCL, 40% PBSA, 40% PBS, crosslinked with the hydrophobic crosslinker PCL2000-dMA, designed for enhanced water resistance and good welding properties. The middle layer was prepared from a compound of 25% PLA and 75% PBSA and the outer layer was prepared from a compound of 75% PBS and 25% PLA, in order to provide enhanced mechanical properties.

Example 20: Extended Shelf Life, Enhanced Mechanical Properties and High Barrier Properties of Biodegradable Polymer Sheet, Using Metalized Degradable Laminates A two layered film, having an inner and outer layer, was prepared, wherein the film is used such that the inner layer is in contact with the material stored within the film while the outer layer is in contact with the surrounding atmosphere. The inner layer was prepared from a compound of 20% PCL, 40% PBSA, 40% PBS, crosslinked with the hydrophobic crosslinker PCL2000-dMA. The inner layer was designed so as to provide enhanced water resistance and good welding properties. The outer layer was prepared as a laminate of a compound of 25% PLA and 75% PBSA metalized with aluminum dioxide (AlOx), wherein the adhesive for the lamination was either based on a biodegradable solvent or was a solventless adhesive or any combination thereof.

Another two layered film was prepared such that the inner layer was a compound of 20% PCL, 40% PBSA, 20% PBS and 20% PLA, crosslinked with the hydrophobic crosslinker PCL2000-dMA, so as to provide enhanced water resistance and good welding properties. The outer layer was prepared as a laminate of a compound of 25% PLA and 75% PBSA metalized with aluminum dioxide (AlOx), wherein the adhesive for the lamination was either based on a biodegradable solvent or was a solventless adhesive.

A three layered film was prepared having an inner layer prepared from a compound of 20% PCL, 40% PBSA, 40% PBS, crosslinked with the hydrophobic crosslinker PCL2000-dMA, in order to provide enhanced water resistance and good welding properties. The middle layer was prepared as a laminate of a compound of 25% PLA and 75% PBSA metalized with aluminum dioxide (AlOx), wherein the adhesive for the lamination was either based on a biodegradable solvent or was a solventless adhesive. The outer layer was prepared from a compound of 20% PCL, 60% PBS and 20% PLA, crosslinked with the hydrophobic crosslinker PCL2000-dMA, in order to provide enhanced water resistance and enhanced mechanical properties.

A three layered film was prepared having an inner layer prepared from a compound of PBAT or PBSA, in order to provide enhanced welding properties. The middle layer was prepared as a laminate of a compound of 25% PLA and 75% PBSA metalized with aluminum dioxide (AlOx), wherein the adhesive for the lamination was either based on a biodegradable solvent or was a solventless adhesive. The outer layer was prepared from a compound of 20% PCL, 60% PBS and 20% PLA, crosslinked with the hydrophobic crosslinker PCL2000-dMA, in order to provide enhanced water resistance as well as enhanced mechanical properties.

A three layered film was prepared having an inner layer prepared from a compound of 20% PCL, 40% PBSA, 40% PBS, crosslinked with the hydrophobic crosslinker PCL2000-dMA, in order to provide enhanced water resistance and good welding properties. The middle layer was prepared as a laminate of a compound of 25% PLA and 75% PBSA metalized with aluminum dioxide (AlOx), wherein the adhesive for the lamination was either based on a biodegradable solvent or was a solventless adhesive, in order to provide enhanced barrier properties as well as enhanced mechanical properties. The outer layer was prepared from a compound of 75% PBS and 25% PLA, in order to provide enhanced mechanical properties.

Example 21: Biodegradable Compounds for Films with Enhanced Barrier Properties as Well as Enhanced Mechanical Properties A compound comprising 40% PVOH, 20% PCL, 20% PBS and 20% PBSA, was prepared with the addition of the bi-functional crosslinker 1% maleic anhydride (MAH) and the free radical former 1,1'-Azobis(cyanocyclohexane) (ACHN). The MAH was reacted during the compounding process by condensation of the anhydride group with two hydroxyls of the PVOH. In addition, the free radical former conjugated the MAH by reacting its double bond with the reacting polymers, to form graft crosslinking.

A compound comprising 75% PBSA and 25% PLA, was prepared with the crosslinking agent 1% methylenediphenyl diisocyanate (MDI), used as a chain extender, in order to provide enhanced mechanical properties.

A compound comprising 40% PVOH, 20% PCL, 20% PBS and 20% PBSA, was prepared with the addition of the bi-functional crosslinker 1% wt/wt Maleic anhydride (MAH) and 0.5% wt/wt of the free radical former 1,1'-Azobis(cyanocyclohexane) (ACHN) and an additional 1% wt/wt of the chain extender methylenediphenyl diisocyanate (MDI). The MAH was reacted during the compounding process by condensation of the anhydride group with two hydroxyls of the PVOH. In addition, the free radical former conjugated the MAH through reacting its double bond with the reacting polymers, to form graft crosslinking. The additional reaction of the free hydroxyl of the PVOH, or polyester end groups, conjugated with the MDI, which forms a urethane bond, and therefore high crosslinking density, provides enhanced barrier properties as well as enhanced mechanical properties.

Example 22: Three Layered Sheet with Multifunctional Properties

A compound of 31% w/w PBS, 35% w/w PBSA, 12% w/w PLA, 20% w/w PCL and 2% w/w polyvinyl alcohol (PVOH) was prepared, wherein the PBS, PBSA, PLA, PCL are used as the hydrophobic components of the sheet with enhanced barrier properties, and mechanical properties, such that the PCL provides a higher hydrophobicity and extended shelf life. The PVOH is used as a hydroxyl carrier to further react the compound with its neighbor layer of crosslinked PVOH, and therefore allows it to function also as a tie layer.

Sheet #21 is composed of layer 1 and 3 of a compound comprising about 31% w/w PBS, 35% w/w PBSA, 12% w/w PLA, 20% w/w PCL and 2% w/w PVOH and layer 2 is 99.5% PVOH cross linked using 0.5% w/w of a cross-linker such as MAH or diisocyanate.

The combination of layers 1 and 3 with PVOH at layer 2, provides optimal barrier properties both for OTR and WVTR, and further, prolongs shelf-life of the sheets. In addition, the generated biodegradable tie layer prevents sheet delamination due to PVOH layer swelling.

Example 23: Five Layered Sheet with Multifunctional Properties

A five layered sheet was prepared, wherein the layers 1 and 5 were prepared as compounds of about 75% PBSA and 25% PLA. Layers 2 and 4 were prepared from a compound of about 31% w/w PBS, 35% w/w PBSA, 12% w/w PLA, 20% w/w PCL and 2% w/w polyvinyl alcohol (PVOH), wherein the PBS, PBSA, PLA, PCL were used as the hydrophobic components of the sheet with enhanced barrier properties, and mechanical properties, such that the PCL provides a higher hydrophobicity and extended shelf life. The PVOH was used as a hydroxyl carrier to further react the compound with its neighbor layer of crosslinked PVOH, and therefore allows it to function also as a tie layer.

The middle layer (layer 3) was prepared from about 99.5% w/w PVOH cross linked using 0.5% w/w of a cross-linker, such as MAH or MDI.

The combination of layers 2 and 4 with the almost pure crosslinked PVOH at layer 3, provides optimal barrier properties both for OTR and WVTR, and further, prolongs shelf-life of the sheets. In addition, the generated biodegradable tie layers (layers 2 and 4) prevents sheet delamination that may occur due to PVOH layer swelling.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Example 24: Seven Layered Sheet with Multifunctional Properties

A seven layered sheet was prepared, wherein the layers 1 and 7 were prepared as compounds of about 25% PCL, 55% PBS and 20% PLA. Layers 2 and 6 are of 100% PBAT for high impact. Layers 3 and 5 were prepared from a compound of about 31% w/w PBS, 35% w/w PBSA, 12% w/w PLA, 20% w/w PCL and 2% w/w polyvinyl alcohol (PVOH), wherein the PBS, PBSA, PLA, PCL were used as the hydrophobic components of the sheet with enhanced barrier properties, and mechanical properties, such that the PCL provides a higher hydrophobicity and extended shelf life. The PVOH was used as a hydroxyl carrier to further react the compound with its neighbor layer of crosslinked PVOH, and therefore allows it to function also as a tie layer.

The middle layer (layer 4) was prepared from about 70% w/w to 90% w/w PVOH and 1% w/w to 30% w/w of PLA or PBS, or PBSA, or PBAT, or PCL, the combination prevents delamination in both dry and wet conditions.

The combination of super hydrophobic layers at 1 and 7 with the PVOH at layer 4, provides optimal barrier properties both for WVTR and OTR respectively, and further, prolongs shelf-life of the sheets. In addition, the generated biodegradable tie layers (layers 3 and 5) prevents sheet delamination that may occur due to PVOH layer swelling.

What is claimed is:

1. A three layered biodegradable sheet, comprising a first layer, a second layer and a third layer,
    wherein at least one of said first layer or said third layer comprises about 100% w/w PBS or about 100% w/w PBSA;
    wherein said second layer comprises a first hydrophobic polymer selected from the group consisting of poly (epsilon-caprolactone) (PCL), a polyhydroxyalkanoate (PHA) and a mixture thereof, and a second hydrophobic polymer selected from the group consisting of polybutylene succinate (PBS), polybutylene succinate adipate (PBSA), poly lactic acid (PLA), polybutylene adipate terephthalate (PBAT), polydioxanone (PDO), polyglycolic acid (PGA) and any mixture thereof,
    wherein said first hydrophobic polymer is present in said second layer in an amount of about 30% w/w; and
    wherein said second layer is situated between said first layer and said third layer.

2. The biodegradable sheet according to claim 1, wherein the first hydrophobic polymer is PCL.

3. The biodegradable sheet of claim 1, wherein said second hydrophobic polymer is selected from the group consisting of PLA, PBS, PBSA and PBAT.

4. The biodegradable sheet of claim 1, wherein said second hydrophobic polymer comprises PLA.

5. The biodegradable sheet of claim 1, wherein said first hydrophobic polymer comprises PCL and said second hydrophobic polymer comprises PLA.

6. The biodegradable sheet of claim 1, wherein said second hydrophobic polymer is a mixture of PBS and PBSA, a mixture of PBS and PLA, a mixture of PBSA and PLA or a mixture of PBAT and PLA.

7. The biodegradable sheet of claim 1, wherein at least one of said first layer and said third layer comprises about 100% w/w PBSA.

8. The biodegradable sheet of claim 7, wherein each of said first layer and said third layer comprises about 100% w/w PBSA.

9. The biodegradable sheet of claim 8, wherein said first hydrophobic polymer comprises PCL and said second hydrophobic polymer comprises PLA.

10. The biodegradable sheet of claim 1, wherein at least one of said first layer and said third layer comprises about 100% w/w PBS.

11. The biodegradable sheet of claim 10, wherein each of said first layer and said third layer comprises about 100% w/w PBS.

* * * * *